(12) United States Patent
Young

(10) Patent No.: US 12,400,503 B2
(45) Date of Patent: Aug. 26, 2025

(54) USER INTERFACES FOR SHARING AN ELECTRONIC KEY

(71) Applicant: Apple Inc., Cupertino, CA (US)

(72) Inventor: Trevor W. Young, Livermore, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 17/949,042

(22) Filed: Sep. 20, 2022

(65) Prior Publication Data

US 2023/0394899 A1    Dec. 7, 2023

Related U.S. Application Data

(60) Provisional application No. 63/349,088, filed on Jun. 4, 2022.

(51) Int. Cl.
*G06F 3/0484* (2022.01)
*G06Q 20/36* (2012.01)
*G07C 9/20* (2020.01)

(52) U.S. Cl.
CPC .............. *G07C 9/20* (2020.01); *G06F 3/0484* (2013.01); *G06Q 20/36* (2013.01)

(58) Field of Classification Search
None
See application file for complete search history.

(56) References Cited

U.S. PATENT DOCUMENTS

| | | | |
|---|---|---|---|
| 2,013,027 A | 9/1935 | Branch | |
| 8,353,448 B1 | 1/2013 | Miller et al. | |
| 8,381,969 B1 | 2/2013 | Miller et al. | |
| 8,466,875 B2 | 6/2013 | Nakada et al. | |
| 8,720,771 B2 | 5/2014 | Mackinnon Keith | |
| 8,943,187 B1 * | 1/2015 | Saylor | G07C 9/00857 709/225 |
| 9,324,067 B2 | 4/2016 | Van Os et al. | |
| 9,348,492 B1 | 5/2016 | Penilla et al. | |
| 9,485,251 B2 | 11/2016 | White et al. | |
| 9,608,970 B1 * | 3/2017 | Gehret | H04W 12/04 |
| 9,961,408 B2 | 5/2018 | Mickelsen et al. | |
| 10,057,227 B1 | 8/2018 | Hess et al. | |
| 10,108,909 B2 | 10/2018 | Sulavik et al. | |
| 10,163,105 B1 | 12/2018 | Ziraknejad et al. | |
| 10,164,975 B1 | 12/2018 | Son et al. | |
| 10,192,217 B1 | 1/2019 | Ellis et al. | |
| 10,234,953 B1 | 3/2019 | Li et al. | |
| 10,242,351 B1 | 3/2019 | Wilson et al. | |

(Continued)

FOREIGN PATENT DOCUMENTS

AU    2021100511 A4    4/2021
AU    2021213717 A1    2/2022

(Continued)

OTHER PUBLICATIONS

Decision to Grant received for European Patent Application No. 21731662.9, mailed on Sep. 12, 2024, 4 pages.

(Continued)

*Primary Examiner* — Rayeez R Chowdhury
(74) *Attorney, Agent, or Firm* — DLA Piper LLP (US)

(57) ABSTRACT

The present disclosure generally relates to user interfaces for sharing and/or re-sharing an electronic key that is provisioned onto an electronic wallet of a computer system.

54 Claims, 28 Drawing Sheets

(56) References Cited

U.S. PATENT DOCUMENTS

| | | | |
|---|---|---|---|
| 10,275,956 B1* | 4/2019 | Gehret | H04L 67/01 |
| 10,282,727 B2 | 5/2019 | Van Os et al. | |
| 10,332,104 B2 | 6/2019 | Prakash et al. | |
| 10,339,521 B1 | 7/2019 | Bodkin et al. | |
| 10,366,387 B2 | 7/2019 | Aabye et al. | |
| 10,373,395 B1 | 8/2019 | Harned et al. | |
| 10,503,912 B1 | 12/2019 | Kerr | |
| 10,621,575 B1 | 4/2020 | Belleville et al. | |
| 10,701,067 B1* | 6/2020 | Ziraknejad | H04W 12/63 |
| 10,769,625 B2 | 9/2020 | Pandiarajan et al. | |
| 10,776,779 B1 | 9/2020 | Ellis et al. | |
| 10,803,400 B2 | 10/2020 | Sindia et al. | |
| 10,853,791 B1 | 12/2020 | Ellis et al. | |
| 10,878,437 B2 | 12/2020 | Ye et al. | |
| 11,026,085 B2 | 6/2021 | Grange et al. | |
| 11,080,700 B2 | 8/2021 | Ortiz et al. | |
| 11,127,013 B1 | 9/2021 | Boyd et al. | |
| 11,134,294 B2 | 9/2021 | Lee et al. | |
| 11,157,918 B1 | 10/2021 | Ellison et al. | |
| 11,182,774 B1 | 11/2021 | Boyd et al. | |
| 11,206,544 B2 | 12/2021 | Boyd et al. | |
| 11,312,207 B1 | 4/2022 | Sanders et al. | |
| 11,488,140 B2 | 11/2022 | Bhuptani et al. | |
| 11,615,199 B1 | 3/2023 | Poder et al. | |
| 11,748,507 B2 | 9/2023 | Cool et al. | |
| 2002/0120867 A1 | 8/2002 | Mitchell et al. | |
| 2005/0074126 A1 | 4/2005 | Stanko | |
| 2005/0099275 A1 | 5/2005 | Kamdar et al. | |
| 2005/0177867 A1 | 8/2005 | Toutonghi | |
| 2006/0255906 A1 | 11/2006 | Ghabra et al. | |
| 2008/0041936 A1 | 2/2008 | Vawter | |
| 2008/0048022 A1 | 2/2008 | Vawter | |
| 2008/0214150 A1 | 9/2008 | Ramer et al. | |
| 2009/0320125 A1 | 12/2009 | Pleasant et al. | |
| 2010/0026503 A1 | 2/2010 | Proefke et al. | |
| 2010/0075656 A1 | 3/2010 | Howarter et al. | |
| 2011/0077983 A1 | 3/2011 | Hua et al. | |
| 2011/0113363 A1 | 5/2011 | Hunt et al. | |
| 2011/0126003 A1 | 5/2011 | Engert | |
| 2011/0131494 A1 | 6/2011 | Ono et al. | |
| 2011/0165859 A1 | 7/2011 | Wengrovitz | |
| 2011/0202988 A1 | 8/2011 | Otranen et al. | |
| 2011/0282785 A1 | 11/2011 | Chin | |
| 2012/0129493 A1 | 5/2012 | Vasudevan | |
| 2012/0200390 A1 | 8/2012 | Saravanan | |
| 2012/0323664 A1 | 12/2012 | Klems | |
| 2013/0024371 A1 | 1/2013 | Hariramani et al. | |
| 2013/0046600 A1 | 2/2013 | Coppinger | |
| 2013/0073459 A1 | 3/2013 | Zacarias et al. | |
| 2013/0263211 A1 | 10/2013 | Neuman et al. | |
| 2013/0275008 A1 | 10/2013 | Breed | |
| 2013/0304642 A1 | 11/2013 | Campos | |
| 2014/0047331 A1 | 2/2014 | Feldman et al. | |
| 2014/0129053 A1 | 5/2014 | Kleve et al. | |
| 2014/0244494 A1 | 8/2014 | Davis et al. | |
| 2014/0244495 A1 | 8/2014 | Davis et al. | |
| 2014/0244514 A1 | 8/2014 | Rodriguez et al. | |
| 2014/0258110 A1 | 9/2014 | Davis et al. | |
| 2014/0279519 A1 | 9/2014 | Mattes et al. | |
| 2014/0304173 A1 | 10/2014 | Ernsdorff | |
| 2014/0365466 A1 | 12/2014 | Chu et al. | |
| 2015/0053757 A1 | 2/2015 | Williams et al. | |
| 2015/0074774 A1 | 3/2015 | Nema et al. | |
| 2015/0081346 A1 | 3/2015 | Charles | |
| 2015/0178721 A1 | 6/2015 | Pandiarajan et al. | |
| 2015/0210287 A1 | 7/2015 | Penilla et al. | |
| 2015/0271175 A1 | 9/2015 | Je et al. | |
| 2015/0278780 A1 | 10/2015 | Vaidyanathan et al. | |
| 2015/0294515 A1 | 10/2015 | Bergdale et al. | |
| 2015/0324791 A1 | 11/2015 | Khan | |
| 2015/0348001 A1 | 12/2015 | Van Os et al. | |
| 2016/0018525 A1 | 1/2016 | Lanzagorta | |
| 2016/0055511 A1 | 2/2016 | Chidella et al. | |
| 2016/0057138 A1 | 2/2016 | Hoyos et al. | |
| 2016/0070447 A1 | 3/2016 | Righter et al. | |
| 2016/0072794 A1 | 3/2016 | Engert | |
| 2016/0078143 A1 | 3/2016 | Huang et al. | |
| 2016/0078581 A1 | 3/2016 | Maher | |
| 2016/0134599 A1 | 5/2016 | Ross et al. | |
| 2016/0180332 A1 | 6/2016 | Wilczynski | |
| 2016/0252978 A1 | 9/2016 | Yoo et al. | |
| 2016/0259497 A1 | 9/2016 | Foss et al. | |
| 2016/0294831 A1 | 10/2016 | Borunda et al. | |
| 2016/0295005 A1 | 10/2016 | Schussmann et al. | |
| 2016/0300054 A1 | 10/2016 | Turgeman et al. | |
| 2016/0357752 A1 | 12/2016 | Yang et al. | |
| 2016/0373458 A1 | 12/2016 | Moreton et al. | |
| 2017/0032485 A1 | 2/2017 | Vemury | |
| 2017/0053470 A1 | 2/2017 | Bergerhoff et al. | |
| 2017/0091765 A1 | 3/2017 | Lloyd et al. | |
| 2017/0103388 A1 | 4/2017 | Pillai et al. | |
| 2017/0109901 A1 | 4/2017 | Raj | |
| 2017/0120864 A1 | 5/2017 | Fischer et al. | |
| 2017/0124312 A1 | 5/2017 | Inoue | |
| 2017/0140642 A1 | 5/2017 | Kim | |
| 2017/0151928 A1 | 6/2017 | Kang et al. | |
| 2017/0169528 A1 | 6/2017 | Kundu et al. | |
| 2017/0213211 A1 | 7/2017 | Sibert et al. | |
| 2017/0243200 A1 | 8/2017 | Vaidyanathan et al. | |
| 2017/0248946 A1 | 8/2017 | Ogura et al. | |
| 2017/0249791 A1* | 8/2017 | Woo | B60R 25/24 |
| 2017/0286648 A1 | 10/2017 | Yamaguchi et al. | |
| 2017/0286656 A1 | 10/2017 | Kohli | |
| 2017/0339151 A1 | 11/2017 | Van Os et al. | |
| 2017/0343200 A1 | 11/2017 | Lai et al. | |
| 2017/0357520 A1 | 12/2017 | De Vries et al. | |
| 2017/0357973 A1 | 12/2017 | Van Os et al. | |
| 2018/0013769 A1 | 1/2018 | Robinson et al. | |
| 2018/0018595 A1 | 1/2018 | Scott et al. | |
| 2018/0018664 A1 | 1/2018 | Purves et al. | |
| 2018/0029560 A1 | 2/2018 | Mohaupt et al. | |
| 2018/0033034 A1 | 2/2018 | Ye et al. | |
| 2018/0041503 A1 | 2/2018 | Lindemann | |
| 2018/0103414 A1 | 4/2018 | Golsch | |
| 2018/0108031 A1 | 4/2018 | Jones et al. | |
| 2018/0130044 A1 | 5/2018 | Gage et al. | |
| 2018/0165655 A1 | 6/2018 | Marcelle et al. | |
| 2018/0165676 A1 | 6/2018 | Bhatt et al. | |
| 2018/0167387 A1 | 6/2018 | Bhatt et al. | |
| 2018/0186333 A1 | 7/2018 | Santiano et al. | |
| 2018/0191501 A1 | 7/2018 | Lindemann | |
| 2018/0195874 A1 | 7/2018 | Andrew et al. | |
| 2018/0198909 A1 | 7/2018 | Milstein | |
| 2018/0260553 A1 | 9/2018 | Hoyos et al. | |
| 2018/0265095 A1 | 9/2018 | Joe et al. | |
| 2018/0276657 A1 | 9/2018 | Cho et al. | |
| 2018/0322488 A1 | 11/2018 | Arana et al. | |
| 2018/0335928 A1 | 11/2018 | Van Os et al. | |
| 2018/0336327 A1 | 11/2018 | Wallace et al. | |
| 2018/0349581 A1 | 12/2018 | Ramalingam | |
| 2018/0357846 A1 | 12/2018 | Chen | |
| 2018/0367946 A1 | 12/2018 | Best | |
| 2019/0043148 A1 | 2/2019 | Vemury | |
| 2019/0057412 A1 | 2/2019 | Bhattacharjee et al. | |
| 2019/0061687 A1 | 2/2019 | Khalil | |
| 2019/0080070 A1 | 3/2019 | Van Os et al. | |
| 2019/0080189 A1 | 3/2019 | Van Os et al. | |
| 2019/0092279 A1 | 3/2019 | Jarvis et al. | |
| 2019/0163876 A1 | 5/2019 | Remme et al. | |
| 2019/0164165 A1 | 5/2019 | Ithabathula | |
| 2019/0168036 A1 | 6/2019 | Conboy | |
| 2019/0168410 A1 | 6/2019 | Conboy | |
| 2019/0171998 A1 | 6/2019 | Conboy | |
| 2019/0172149 A1 | 6/2019 | Conboy | |
| 2019/0172161 A1 | 6/2019 | Conboy | |
| 2019/0180021 A1* | 6/2019 | Mukundala | G07C 9/00309 |
| 2019/0197527 A1 | 6/2019 | Agarwalla et al. | |
| 2019/0213525 A1 | 7/2019 | Haci et al. | |
| 2019/0220662 A1 | 7/2019 | Shenouda Dawoud | |
| 2019/0263356 A1 | 8/2019 | Golsch et al. | |
| 2019/0287111 A1 | 9/2019 | Cvetkovich et al. | |
| 2019/0304216 A1 | 10/2019 | Mendelson et al. | |
| 2019/0305949 A1 | 10/2019 | Hamel et al. | |
| 2019/0327228 A1 | 10/2019 | Pantfoerder et al. | |

(56) References Cited

U.S. PATENT DOCUMENTS

| | | |
|---|---|---|
| 2019/0355191 A1 | 11/2019 | Jones et al. |
| 2019/0364020 A1 | 11/2019 | Wardell et al. |
| 2019/0370781 A1 | 12/2019 | Van Os et al. |
| 2020/0020196 A1 | 1/2020 | Petersen et al. |
| 2020/0029173 A1 | 1/2020 | Pang et al. |
| 2020/0052905 A1 | 2/2020 | Mathias et al. |
| 2020/0065822 A1 | 2/2020 | Lin et al. |
| 2020/0079320 A1 | 3/2020 | Lacoss-Arnold |
| 2020/0126052 A1 | 4/2020 | Deliwala et al. |
| 2020/0211031 A1 | 7/2020 | Patil |
| 2020/0269811 A1 | 8/2020 | Kim et al. |
| 2020/0320653 A1 | 10/2020 | Hastings et al. |
| 2020/0349244 A1 | 11/2020 | Kim et al. |
| 2020/0387686 A1 | 12/2020 | Jhang et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0089635 A1 | 3/2021 | Weeresinghe |
| 2021/0127233 A1 | 4/2021 | Santavicca et al. |
| 2021/0229630 A1 | 7/2021 | Kramar et al. |
| 2021/0266500 A1 | 8/2021 | Taylor et al. |
| 2021/0287768 A1 | 9/2021 | Craig et al. |
| 2021/0319468 A1 | 10/2021 | Zhu et al. |
| 2021/0319862 A1 | 10/2021 | Boyd et al. |
| 2021/0321263 A1 | 10/2021 | Boyd et al. |
| 2021/0373744 A1 | 12/2021 | Miller et al. |
| 2021/0373745 A1 | 12/2021 | Chang |
| 2021/0374714 A1 | 12/2021 | Chang |
| 2021/0374750 A1 | 12/2021 | Miller et al. |
| 2021/0377742 A1 | 12/2021 | Boyd et al. |
| 2021/0392125 A1 | 12/2021 | Bryson |
| 2022/0135001 A1 | 5/2022 | Alsina et al. |
| 2022/0277295 A1 | 9/2022 | Robinson-Morgan et al. |
| 2022/0332285 A1 | 10/2022 | Sanders et al. |
| 2022/0391481 A1 | 12/2022 | Villanueva Gaviola et al. |
| 2022/0391482 A1 | 12/2022 | Villanueva Gaviola et al. |
| 2023/0039942 A1 | 2/2023 | Young et al. |
| 2023/0045850 A1 | 2/2023 | Sammoura et al. |
| 2023/0089689 A1 | 3/2023 | Pons Bordes et al. |
| 2023/0234537 A1 | 7/2023 | Kramar et al. |
| 2024/0036713 A1 | 2/2024 | Chang |
| 2024/0104188 A1 | 3/2024 | Villanueva Gaviola et al. |
| 2024/0147243 A1 | 5/2024 | Villanueva Gaviola et al. |
| 2024/0198960 A1 | 6/2024 | Kramar et al. |
| 2024/0253419 A1 | 8/2024 | Sanders et al. |
| 2025/0142343 A1 | 5/2025 | Villanueva Gaviola et al. |

FOREIGN PATENT DOCUMENTS

| | | |
|---|---|---|
| CA | 103886460 A | 6/2014 |
| CN | 101689188 A | 3/2010 |
| CN | 103635923 A | 3/2014 |
| CN | 105099694 A | 11/2015 |
| CN | 105190659 A | 12/2015 |
| CN | 105321067 A | 2/2016 |
| CN | 105338066 A | 2/2016 |
| CN | 105787755 A | 7/2016 |
| CN | 106157125 A | 11/2016 |
| CN | 106453341 A | 2/2017 |
| CN | 107609865 A | 1/2018 |
| CN | 108064393 A | 5/2018 |
| CN | 109353309 A | 2/2019 |
| CN | 109949120 A | 6/2019 |
| CN | 110086609 A | 8/2019 |
| CN | 110135872 A | 8/2019 |
| CN | 110197059 A | 9/2019 |
| CN | 112819475 A | 5/2021 |
| EP | 2981115 A2 | 2/2016 |
| EP | 3460692 A1 | 3/2019 |
| EP | 3476670 A1 | 5/2019 |
| EP | 3926888 A1 | 12/2021 |
| JP | 2004-213362 A | 7/2004 |
| JP | 2010-86327 A | 4/2010 |
| JP | 2012-508930 A | 4/2012 |
| JP | 2013-37568 A | 2/2013 |
| JP | 2013-257878 A | 12/2013 |
| JP | 2014-44719 A | 3/2014 |
| JP | 2016-133969 A | 7/2016 |
| JP | 2016-526211 A | 9/2016 |
| JP | 2018-501680 A | 1/2018 |
| JP | 2018-136886 A | 8/2018 |
| JP | 2018-156283 A | 10/2018 |
| JP | 2019-46122 A | 3/2019 |
| JP | 2019-95880 A | 6/2019 |
| JP | 2019-149167 A | 9/2019 |
| JP | 2019-191753 A | 10/2019 |
| JP | 2019-197332 A | 11/2019 |
| JP | 2019-535931 A | 12/2019 |
| KR | 10-2013-0035286 A | 4/2013 |
| KR | 10-2013-0131956 A | 12/2013 |
| KR | 10-1509596 B1 | 4/2015 |
| KR | 10-2015-0066892 A | 6/2015 |
| KR | 10-1684188 B1 | 12/2016 |
| KR | 10-2062919 B1 | 1/2020 |
| KR | 10-2020-0108515 A | 9/2020 |
| WO | 2008/157016 A1 | 12/2008 |
| WO | 2013/003210 A3 | 2/2013 |
| WO | 2014/134180 A2 | 9/2014 |
| WO | 2014/146186 A1 | 9/2014 |
| WO | 2015/153154 A1 | 10/2015 |
| WO | 2015/184353 A1 | 12/2015 |
| WO | 2015/194135 A1 | 12/2015 |
| WO | 2016/128569 A1 | 8/2016 |
| WO | 2017/078635 A1 | 5/2017 |
| WO | 2017/218490 A1 | 12/2017 |
| WO | 2018/048703 A1 | 3/2018 |
| WO | 2018/071674 A1 | 4/2018 |
| WO | 2018/074504 A1 | 4/2018 |
| WO | 2018/081317 A1 | 5/2018 |
| WO | 2018/160863 A1 | 9/2018 |
| WO | 2019/069129 A1 | 4/2019 |
| WO | 2019/191213 A1 | 10/2019 |
| WO | 2020/197694 A1 | 10/2020 |
| WO | 2021/038298 A2 | 3/2021 |

OTHER PUBLICATIONS

Non-Final Office Action received for U.S. Appl. No. 17/951,818, mailed on Sep. 9, 2024, 30 pages.
Notice of Allowance received for Chinese Patent Application No. 202311569957.3, mailed on Sep. 2, 2024, 5 pages (1 page of English Translation and 4 pages of Official Copy).
Result of Consultation received for European Patent Application No. 21707473.1, mailed on Sep. 6, 2024, 3 pages.
Summons to Attend Oral Proceedings received for European Patent Application No. 22732745.9, mailed on Sep. 3, 2024, 11 pages.
Intention to Grant received for European Patent Application No. 21731662.9, mailed on May 3, 2024, 9 pages.
Notice of Allowance received for Korean Patent Application No. 10-2023-7033718, mailed on Apr. 18, 2024, 7 pages (2 pages of English Translation and 5 pages of Official Copy).
Office Action received for Australian Patent Application No. 2023200021, mailed on Apr. 24, 2024, 4 pages.
Office Action received for Japanese Patent Application No. 2023-200980, mailed on Apr. 22, 2024, 8 pages (4 pages of English Translation and 4 pages of Official Copy).
Applicant-Initiated Interview Summary received for U.S. Appl. No. 17/375,767. mailed on Dec. 22, 2023, 2 pages.
Final Office Action received for U.S. Appl. No. 17/222,568, mailed on Dec. 14, 2023, 92 pages.
International Preliminary Report on Patentability received for PCT Patent Application No. PCT/US2022/030567, mailed on Dec. 21, 2023, 18 pages.
Notice of Allowance received for Japanese Patent Application No. 2022-573404, mailed on Dec. 11, 2023, 4 pages (1 page of English Translation and 3 pages of Official Copy).
Office Action received for Japanese Patent Application No. 2023-528157, mailed on Dec. 8, 2023, 4 pages (2 pages of English Translation and 2 pages of Official Copy).

(56) References Cited

OTHER PUBLICATIONS

Office Action received for Korean Patent Application No. 10-2023-7033718, mailed on Dec. 4, 2023, 5 pages (2 pages of English Translation and 3 pages of Official Copy).
Notice of Allowance received for Korean Patent Application No. 10-2024-0100836, mailed on Oct. 14, 2024, 7 pages (2 pages of English Translation and 5 pages of Official Copy).
Notice of Allowance received for U.S. Appl. No. 18/404,058, mailed on Oct. 9, 2024, 12 pages.
Applicant Initiated Interview Summary received for U.S. Appl. No. 17/030,260, mailed on Jan. 7, 2022, 2 pages.
Applicant-Initiated Interview Summary received for U.S. Appl. No. 17/030,256, mailed on Feb. 23, 2022, 2 pages.
Applicant-Initiated Interview Summary received for U.S. Appl. No. 17/030,256, mailed on Jun. 17, 2022, 2 pages.
Applicant-Initiated Interview Summary received for U.S. Appl. No. 17/030,257, mailed on Aug. 29, 2022, 5 pages.
Applicant-Initiated Interview Summary received for U.S. Appl. No. 17/030,257, mailed on Feb. 7, 2022, 5 pages.
Applicant-Initiated Interview Summary received for U.S. Appl. No. 17/030,259, mailed on Nov. 19, 2021, 18 pages.
Applicant-Initiated Interview Summary received for U.S. Appl. No. 17/030,260, mailed on May 5, 2022, 2 pages.
Applicant-Initiated Interview Summary received for U.S. Appl. No. 17/077,820, mailed on Oct. 6, 2022, 2 pages.
Certificate of Examination received for Australian Patent Application No. 2021100511, mailed on Nov. 5, 2021, 2 pages.
Corrected Notice of Allowance received for U.S. Appl. No. 17/030,259, mailed on Apr. 4, 2022, 2 pages.
Corrected Notice of Allowance received for U.S. Appl. No. 17/030,259, mailed on Jan. 5, 2022, 2 pages.
Corrected Notice of Allowance received for U.S. Appl. No. 17/484,306, mailed on Mar. 30, 2022, 4 pages.
Decision to Grant received for Danish Patent Application No. PA202170032, mailed on Feb. 1, 2022, 2 pages.
Final Office Action received for U.S. Appl. No. 17/030,256, mailed on Mar. 14, 2022, 20 pages.
Final Office Action received for U.S. Appl. No. 17/030,260, mailed on Mar. 9, 2022, 42 pages.
Intention to Grant received for Danish Patent Application No. PA202170032, mailed on Oct. 6, 2021, 2 pages.
International Preliminary Report on Patentability received for PCT Patent Application No. PCT/US2021/015123, mailed on Aug. 11, 2022, 14 pages.
International Search Report and Written Opinion received for PCT Patent Application No. PCT/US2021/015123, mailed on Aug. 9, 2021, 20 pages.
International Search Report and Written Opinion received for PCT Patent Application No. PCT/US2022/025365, mailed on Sep. 27, 2022, 16 pages.
International Search Report and Written Opinion received for PCT Patent Application No. PCT/US2021/033051, mailed on Oct. 29, 2021, 20 pages.
International Search Report and Written Opinion received for PCT Patent Application No. PCT/US2021/057325, mailed on Jan. 5, 2022, 14 pages.
Invitation to Pay Addition Fees received for PCT Patent Application No. PCT/US2021/015123, mailed on Jun. 16, 2021, 12 pages.
Invitation to Pay Additional Fees received for PCT Patent Application No. PCT/US2021/033051, mailed on Aug. 26, 2021, 10 pages.
Invitation to Pay Additional Fees received for PCT Patent Application No. PCT/US2022/025365, mailed on Aug. 4, 2022, 9 pages.
Juan, "Everything you can do with Wechat QR codes in 2019", Available online at: https://qpsoftware.net/blog/wechat-qr-code, Jul. 1, 2019, 13 pages.
Linelovers, "4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.
Lurey, C., "Keeper fortifies industry best security architecture with integrated two-factor codes", Online available at :-<URL: https://www.keepersecurity.com/blog/2019/08/29/keeper-fortifies-industry-best-securityarchitecture-with-integrated-two-factor-codes/>, Aug. 29, 2019, 8 pages.
Mack, Brandon, "How Do Snapchat's Snapcodes Work?", Available online at: https://blackatlascreative.com/blog/how-do-snapchats-snapcodes-work/, Nov. 10, 2015, 10 pages.
"Meet Your Model 3", Available Online at: https://www.tesla.com/support/meet-your-tesla/model-3#keys, 2021, 3 pages.
Non-Final Office Action received for U.S. Appl. No. 17/030,256, mailed on Jan. 18, 2022, 20 pages.
Non-Final Office Action received for U.S. Appl. No. 17/030,257, mailed on Jun. 20, 2022, 27 pages.
Non-Final Office Action received for U.S. Appl. No. 17/030,259, mailed on Aug. 19, 2021, 20 pages.
Non-Final Office Action received for U.S. Appl. No. 17/030,260, mailed on Jul. 8, 2022, 36 pages.
Non-Final Office Action received for U.S. Appl. No. 17/030,260, mailed on Oct. 6, 2021, 43 pages.
Non-Final Office Action received for U.S. Appl. No. 17/077,820, mailed on Aug. 31, 2022, 10 pages.
Non-Final Office Action received for U.S. Appl. No. 17/222,568, mailed on Sep. 16, 2022, 32 pages.
Non-Final Office Action received for U.S. Appl. No. 17/375,767, mailed on Sep. 29, 2022, 10 pages.
Non-Final Received for U.S. Appl. No. 17/030,257, mailed on Dec. 24, 2021, 24 pages.
Notice of Acceptance received for Australian Patent Application No. 2021213717, mailed on Sep. 21, 2022, 3 pages.
Notice of Allowance received for U.S. Appl. No. 17/030,256, mailed on Jul. 20, 2022, 9 pages.
Notice of Allowance received for U.S. Appl. No. 17/180,509, mailed on Apr. 28, 2021, 16 pages.
Notice of Allowance received for U.S. Appl. No. 17/180,509, mailed on Aug. 23, 2021, 14 pages.
Notice of Allowance received for U.S. Appl. No. 17/030,259, mailed on Dec. 14, 2021, 8 pages.
Notice of Allowance received for U.S. Appl. No. 17/484,306, mailed on Nov. 26, 2021, 9 pages.
Office Action received for Australian Patent Application No. 2021100511, mailed on May 26, 2021, 5 pages.
Office Action received for Australian Patent Application No. 2021100511, mailed on Sep. 2, 2021, 3 pages.
Office Action received for Australian Patent Application No. 2021102823, mailed on Aug. 24, 2021, 8 pages.
Office Action received for Australian Patent Application No. 2021102823, mailed on Feb. 22, 2022, 5 pages.
Office Action received for Australian Patent Application No. 2021102823, mailed on Nov. 24, 2021, 7 pages.
Office Action received for Australian Patent Application No. 2021203367, mailed on May 23, 2022, 5 pages.
Office Action received for Australian Patent Application No. 2021213717, mailed on Feb. 10, 2022, 4 pages.
Office Action received for Australian Patent Application No. 2021213717, mailed on Jun. 17, 2022, 4 pages.
Office Action received for Danish Patent Application No. PA202170032, mailed on May 7, 2021, 7 pages.
Office Action received for Danish Patent Application No. PA202170598, mailed on Sep. 7, 2022, 4 pages.
Office Action received for Korean Patent Application No. 10-2022-0003867, mailed on May 17, 2022, 19 pages (9 pages of English Translation and 10 pages of Official Copy).
Search Report and Opinion received for Danish Patent Application No. PA202170598, mailed on Feb. 15, 2022, 11 pages.
Sibila, Alex, "Tesla App Full Walkthrough (Mar. 2020)", Available Online at: https://www.youtube.com/watch?v=RHMWPj_RXLU, Mar. 16, 2020, 3 pages.
"Use your iPhone or Apple Watch as a car key", Available Online at: https://support.apple.com/en-us/HT211234, Mar. 16, 2021, 5 pages.

(56) References Cited

OTHER PUBLICATIONS

"Volvo On Call app: Operating remote start of the car", Available Online at: https://www.volvocars.com/en-ca/support/topics/volvo-on-call/app/volvo-on-call-app-operating-remote-start-of-the-car-2, Nov. 5, 2020, 4 pages.
Invitation to Pay Search Fees received for European Patent Application No. 22723512.4, mailed on Nov. 11, 2024, 3 pages.
Notice of Allowance received for U.S. Appl. No. 18/595,238, mailed on Nov. 20, 2024, 9 pages.
International Preliminary Report on Patentability received for PCT Patent Application No. PCT/US2023/023766, mailed on Dec. 19, 2024, 15 pages.
Notice of Allowance received for Japanese Patent Application No. 2023-528157, mailed on Feb. 5, 2024, 4 pages (1 page of English Translation and 3 pages of Official Copy).
Notice of Allowance received for Korean Patent Application No. 10-2021-7037387, mailed on Jan. 31, 2024, 7 pages (2 pages of English Translation and 5 pages of Official Copy).
Notice of Allowance received for U.S. Appl. No. 17/398,723, mailed on Jan. 30, 2024, 15 pages.
Office Action received for Australian Patent Application No. 2023200021, mailed on Feb. 1, 2024, 4 pages.
Extended European Search Report received for European Patent Application No. 23200887.0, mailed on Mar. 26, 2024, 9 pages.
International Preliminary Report on Patentability received for PCT Patent Application No. PCT/US2022/042978, mailed on Apr. 4, 2024, 12 pages.
Corrected Notice of Allowance received for U.S. Appl. No. 18/595,238, mailed on Dec. 10, 2024, 2 pages.
Intention to Grant received for European Patent Application No. 23214955.9, mailed on Dec. 3, 2024, 8 pages.
Notice of Allowance received for Chinese Patent Application No. 202311323829.0, mailed on Nov. 29, 2024, 4 pages (1 page of English Translation and 3 pages of Official Copy).
Notice of Allowance received for U.S. Appl. No. 17/222,568, mailed on Dec. 11, 2024, 14 pages.
Corrected Notice of Allowance received for U.S. Appl. No. 18/128,775, mailed on Jan. 8, 2024, 2 pages.
Final Office Action received for U.S. Appl. No. 17/900,734, mailed on Jan. 19, 2024, 11 pages.
Advisory Action received for U.S. Appl. No. 17/375,767, mailed on Jun. 29, 2023, 2 pages.
Applicant-Initiated Interview Summary received for U.S. Appl. No. 17/222,568, mailed on Aug. 25, 2023, 2 pages.
Applicant-Initiated Interview Summary received for U.S. Appl. No. 17/375,767, mailed on Jun. 26, 2023, 2 pages.
Corrected Notice of Allowance received for U.S. Appl. No. 17/030,257, mailed on Sep. 12, 2023, 2 pages.
Decision to Grant received for Danish Patent Application No. PA202170598, mailed on Jul. 11, 2023, 1 page.
Extended European Search Report received for European Patent Application No. 23165330.4, mailed on Jun. 28, 2023, 10 pages.
Final Office Action received for U.S. Appl. No. 17/375,767, mailed on Jun. 1, 2023, 15 pages.
International Preliminary Report on Patentability received for PCT Patent Application No. PCT/US2021/057325, mailed on May 19, 2023, 8 pages.
Invitation to Pay Additional Fees and Partial International Search Report received for PCT Patent Application No. PCT/US2023/023766, mailed on Sep. 14, 2023, 14 pages.
Non-Final Office Action received for U.S. Appl. No. 17/222,568, mailed on May 25, 2023, 72 pages.
Non-Final Office Action received for U.S. Appl. No. 17/375,767, mailed on Aug. 31, 2023, 16 pages.
Notice of Acceptance received for Australian Patent Application No. 2022235545, mailed on Jun. 27, 2023, 3 pages.
Notice of Allowance received for Japanese Patent Application No. 2023-028792, mailed on Jun. 26, 2023, 4 pages (1 page of English Translation and 3 pages of Official Copy).
Notice of Allowance received for Korean Patent Application No. 10-2022-7045895, mailed on Apr. 19, 2023, 7 pages (2 pages of English Translation and 5 pages of Official Copy).
Notice of Allowance received for U.S. Appl. No. 17/030,257, mailed on Jul. 26, 2023, 14 pages.
Notice of Allowance received for U.S. Appl. No. 17/030,260, mailed on Aug. 7, 2023, 11 pages.
Notice of Allowance received for U.S. Appl. No. 17/030,260, mailed on Jun. 28, 2023, 11 pages.
Notice of Allowance received for U.S. Appl. No. 17/398,723, mailed on Jun. 15, 2023, 15 pages.
Office Action received for Australian Patent Application No. 2022235545, mailed on May 11, 2023, 3 pages.
Office Action received for Chinese Patent Application No. 202310033917.0, mailed on Jun. 28, 2023, 19 pages (10 pages of English Translation and 9 pages of Official Copy).
Office Action received for Danish Patent Application No. PA202270438, mailed on Jul. 10, 2023, 4 pages.
Office Action received for Japanese Patent Application No. 2022-573404, mailed on Jul. 3, 2023, 12 pages (6 pages of English Translation and 6 pages of Official Copy).
Office Action received for Korean Patent Application No. 10-2023-7010480, mailed on Jul. 20, 2023, 14 pages (7 pages of English Translation and 7 pages of Official Copy).
Eminagaoglu et al., "A Two-Factor Authentication System with QR Codes for Web and Mobile Applications", 2014 Fifth International Conference on Emerging Security Technologies, 2014, pp. 105-112.
Kormann et al., "Risks of the Passport Single Signon Protocol", IEEE Computer Networks, Jul. 2000, 12 pages.
Non-Final Office Action received for U.S. Appl. No. 17/900,734, mailed on Oct. 24, 2023, 12 pages.
Office Action received for European Patent Application No. 21731662.9, mailed on Oct. 12, 2023, 8 pages.
Corrected Notice of Allowance received for U.S. Appl. No. 18/128,775, mailed on Jun. 6, 2024, 2 pages.
Notice of Allowance received for Korean Patent Application No. 10-2021-0151108, mailed on May 26, 2024, 7 pages (2 pages of English Translation and 5 pages of Official Copy).
Notice of Allowance received for Korean Patent Application No. 10-2021-0182662, mailed on Jun. 2, 2024, 6 pages (2 pages of English Translation and 4 pages of Official Copy).
Advisory Action received for U.S. Appl. No. 17/030,260, mailed on Dec. 13, 2022, 4 pages.
Advisory Action received for U.S. Appl. No. 17/222,568, mailed on Apr. 20, 2023, 5 pages.
Advisory Action received for U.S. Appl. No. 17/485,086, mailed on Sep. 9, 2022, 5 pages.
Applicant Initiated Interview Summary received for U.S. Appl. No. 17/485,086, mailed on Apr. 26, 2022, 2 pages.
Applicant-Initiated Interview Summary received for U.S. Appl. No. 17/030,257, mailed on Jan. 31, 2023, 7 pages.
Applicant-Initiated Interview Summary received for U.S. Appl. No. 17/030,260, mailed on Nov. 29, 2022, 2 pages.
Applicant-Initiated Interview Summary received for U.S. Appl. No. 17/030,260, mailed on Oct. 11, 2022, 2 pages.
Applicant-Initiated Interview Summary received for U.S. Appl. No. 17/375,767, mailed on Apr. 13, 2023, 2 pages.
Applicant-Initiated Interview Summary received for U.S. Appl. No. 17/375,767, mailed on Feb. 2, 2023, 2 pages.
Applicant-Initiated Interview Summary received for U.S. Appl. No. 17/375,767, mailed on Oct. 27, 2022, 4 pages.
Applicant-Initiated Interview Summary received for U.S. Appl. No. 17/485,086, mailed on Dec. 23, 2022, 2 pages.
August et al., "Mobile web searching", Bell Lab Technical Journal, vol. 6, No. 2, 2002, pp. 84-98.
Cease, Dictionary.com, Merriam-Webster, 2022, 1 page.
Corrected Notice of Allowance received for U.S. Appl. No. 17/030,256, mailed on Nov. 9, 2022, 8 pages.
Corrected Notice of Allowance received for U.S. Appl. No. 17/077,820, mailed on Feb. 6, 2023, 2 pages.
Corrected Notice of Allowance received for U.S. Appl. No. 17/077,820, mailed on Jan. 19, 2023, 2 pages.

(56) References Cited

OTHER PUBLICATIONS

Corrected Notice of Allowance received for U.S. Appl. No. 17/077,820, mailed on Mar. 8, 2023, 2 pages.
Corrected Notice of Allowance received for U.S. Appl. No. 17/485,098, mailed on Oct. 13, 2022, 8 pages.
Dahan et al., "Increasing TeraGrid User Productivity through Integration of Information and Interactive Services", IEEE, 2008, 11 pages.
Final Office Action received for U.S. Appl. No. 17/030,257, mailed on Dec. 8, 2022, 29 pages.
Final Office Action received for U.S. Appl. No. 17/030,260, mailed on Nov. 4, 2022, 39 pages.
Final Office Action received for U.S. Appl. No. 17/222,568, mailed on Feb. 8, 2023, 68 pages.
Final Office Action received for U.S. Appl. No. 17/375,767, mailed on Dec. 29, 2022, 13 pages.
Final Office Action received for U.S. Appl. No. 17/485,086, mailed on May 4, 2022, 21 pages.
Intention to Grant received for Danish Patent Application No. PA202170598, mailed on Apr. 24, 2023, 2 pages.
Intention to Grant received for Danish Patent Application No. PA202170598, mailed on Jan. 16, 2023, 2 pages.
International Preliminary Report on Patentability received for PCT Patent Application No. PCT/US2021/033051, mailed on Dec. 8, 2022, 14 pages.
International Search Report and Written Opinion received for PCT Patent Application No. PCT/US2022/030567, mailed on Dec. 9, 2022, 24 pages.
International Search Report and Written Opinion received for PCT Patent Application No. PCT/US2022/042978, mailed on Nov. 29, 2022, 15 pages.
Invitation to Pay Additional Fees and Partial International Search Report received for PCT Patent Application No. PCT/US2022/030567, mailed on Sep. 13, 2022, 13 pages.
Non-Final Office Action received for U.S. Appl. No. 17/375,767, mailed on Feb. 16, 2023, 12 pages.
Non-Final Office Action received for U.S. Appl. No. 17/485,086, mailed on Jan. 24, 2022, 19 pages.
Non-Final Office Action received for U.S. Appl. No. 17/485,086, mailed on Nov. 14, 2022, 22 pages.
Notice of Allowance received for Japanese Patent Application No. 2022-520133, mailed on Jan. 27, 2023, 4 pages (1 page of English Translation and 3 pages of Official Copy).
Notice of Allowance received for Korean Patent Application No. 10-2022-0003867, mailed on Oct. 21, 2022, 7 pages (2 pages of English Translation and 5 pages of Official Copy).
Notice of Allowance received for U.S. Appl. No. 17/030,260, mailed on May 3, 2023, 14 pages.
Notice of Allowance received for U.S. Appl. No. 17/077,820, mailed on Jan. 6, 2023, 11 pages.
Notice of Allowance received for U.S. Appl. No. 17/398,723, mailed on Feb. 23, 2023, 17 pages.
Notice of Allowance received for U.S. Appl. No. 17/485,086, mailed on Jan. 30, 2023, 9 pages.
Notice of Allowance received for U.S. Appl. No. 17/485,098, mailed on Aug. 5, 2022, 12 pages.
Office Action received for European Patent Application No. 21707473.1, mailed on May 4, 2023, 5 pages.
Office Action received for European Patent Application No. 21707473.1, mailed on Oct. 31, 2022, 7 pages.
Office Action received for Japanese Patent Application No. 2022-520133, mailed on Oct. 17, 2022, 4 pages (2 pages of English Translation and 2 pages of Official Copy).
Office Action received for Korean Patent Application No. 10-2021-0151108, mailed on Jan. 13, 2023, 10 pages (5 pages of English Translation and 5 pages of Official Copy).
Search Report received for Danish Patent Application No. 202270438, mailed on Dec. 5, 2022, 9 pages.
Office Action received for Korean Patent Application No. 10-2021-0151108, mailed on Sep. 21, 2023, 12 pages (6 pages of English Translation and 6 pages of Official Copy).
Applicant-Initiated Interview Summary received for U.S. Appl. No. 17/900,734, mailed on Nov. 20, 2023, 4 pages.
Corrected Notice of Allowance received for U.S. Appl. No. 17/398,723, mailed on Nov. 15, 2023, 12 pages.
Corrected Notice of Allowance received for U.S. Appl. No. 18/128,775, mailed on Nov. 17, 2023, 2 pages.
Office Action received for Australian Patent Application No. 2023200021, mailed on Nov. 1, 2023, 3 pages.
Office Action received for Korean Patent Application No. 10-2021-0182662, mailed on Oct. 26, 2023, 13 pages (6 pages of English Translation and 7 pages of Official Copy).
International Preliminary Report on Patentability rreceived for PCT Patent Application No. PCT/US2022/025365, mailed on Nov. 2, 2023, 11 pages.
Notice of Allowance received for U.S. Appl. No. 17/398,723, mailed on Oct. 26, 2023, 15 pages.
Notice of Allowance received for U.S. Appl. No. 18/128,775, mailed on Nov. 2, 2023, 10 pages.
Office Action received for European Patent Application No. 21707473.1, mailed on Oct. 27, 2023, 5 pages.
Office Action received for Korean Patent Application No. 10-2021-7037387, mailed on Oct. 12, 2023, 14 pages (6 pages of English Translation and 8 pages of Official Copy).
Intention to Grant received for European Patent Application No. 23165330.4, mailed on Feb. 19, 2025, 8 pages.
Office Action received for European Patent Application No. 21707473.1, mailed on Feb. 11, 2025, 9 pages.
Office Action received for European Patent Application No. 22723512.4, mailed on Feb. 10, 2025, 9 pages.
Applicant-Initiated Interview Summary received for U.S. Appl. No. 17/900,734, mailed on Feb. 3, 2025, 4 pages.
Final Office Action received for U.S. Appl. No. 17/951,818, mailed on Jan. 27, 2025, 31 pages.
Intention to Grant received for European Patent Application No. 22732745.9, mailed on Feb. 7, 2025, 14 pages.
Khedekar, et al., "Strength of QR Code over Design and Implementation of Authentication System", International Conference on Communication and Signal Processing, Online available at: https://ieeexplore.ieee.org/document/7754571, Apr. 6-8, 2016, pp. 2190-2193.
Non-Final Office Action received for U.S. Appl. No. 18/375,932, mailed on Jan. 29, 2025, 39 pages.
Result of Consultation received for European Patent Application No. 22732745.9, mailed on Jan. 23, 2025, 4 pages.
Non-Final Office Action received for U.S. Appl. No. 18/595,238, mailed on Sep. 26, 2024, 8 pages.
Office Action received for Chinese Patent Application No. 202311323829.0, mailed on Sep. 5, 2024, 11 pages (6 pages of English Translation and 5 pages of Official Copy).
Advisory Action received for U.S. Appl. No. 17/900,734, mailed on Mar. 21, 2024, 5 pages.
Office Action received for Chinese Patent Application No. 202180005556.8, mailed on Feb. 8, 2024, 16 pages (9 pages of English Translation and 7 pages of Official Copy).
Office Action received for European Patent Application No. 23165330.4, mailed on Mar. 18, 2024, 4 pages.
Summons to Attend Oral Proceedings received for European Patent Application No. 21707473.1, mailed on Mar. 22, 2024, 9 pages.
Office Action received for European Patent Application No. 22732745.9, mailed on Apr. 10, 2024, 7 pages.
Notice of Acceptance received for Australian Patent Application No. 2023200021, mailed on Jul. 22, 2024, 3 pages.
Notice of Allowance received for Japanese Patent Application No. 2023-168764, mailed on Jul. 26, 2024, 4 pages (1 page of English Translation and 3 pages of Official Copy).
Intention to Grant received for European Patent Application No. 23200887.0, mailed on Jan. 7, 2025, 8 pages.
Non-Final Office Action received for U.S. Appl. No. 17/900,734, mailed on Jan. 16, 2025, 7 pages.

(56) References Cited

OTHER PUBLICATIONS

Office Action received for European Patent Application No. 22785826.3, mailed on Jan. 9, 2025, 9 pages,.

Result of Consultation received for European Patent Application No. 22732745.9, mailed on Jan. 15, 2025, 13 pages.

Notice of Allowance received for Chinese Patent Application No. 202310865934.0, mailed on May 8, 2024, 2 pages (1 page of English Translation and 1 page of Official Copy).

Office Action received for Japanese Patent Application No. 2023-168764, mailed on May 17, 2024, 6 pages (3 pages of English Translation and 3 pages of Official Copy).

Notice of Allowance received for U.S. Appl. No. 18/128,775, mailed on Feb. 28, 2024, 11 pages.

Office Action received for Japanese Patent Application No. 2023-168764, mailed on Feb. 5, 2024, 5 pages (2 pages of English Translation and 3 pages of Official Copy).

Applicant-Initiated Interview Summary received for U.S. Appl. No. 17/900,734, mailed on Feb. 22, 2024, 3 pages.

Extended European Search Report received for European Patent Application No. 23214955.9, mailed on Feb. 22, 2024, 10 pages.

Notice of Allowance received for U.S. Appl. No. 17/375,767, mailed on Feb. 20, 2024, 6 pages.

Office Action received for Chinese Patent Application No. 202310865934.0, mailed on Jan. 16, 2024, 12 pages (6 pages of English Translation and 6 pages of Official Copy).

Corrected Notice of Allowance received for U.S. Appl. No. 17/030,257, mailed on Nov. 24, 2023, 2 pages.

Corrected Notice of Allowance received for U.S. Appl. No. 18/128,775, mailed on Dec. 7, 2023, 2 pages.

International Search Report and Written Opinion received for PCT Patent Application No. PCT/US2023/023766, mailed on Nov. 7, 2023, 20 pages.

Non-Final Office Action received for U.S. Appl. No. 17/375,767, mailed on Nov. 28, 2023, 16 pages.

Notice of Allowance received for Chinese Patent Application No. 202310033917.0, mailed on Nov. 26, 2023, 2 pages (1 page of English Translation and 1 page of Official Copy).

Notice of Allowance received for Korean Patent Application No. 10-2023-7010480, mailed on Nov. 29, 2023, 7 pages (2 pages of English Translation and 5 pages of Official Copy).

Office Action received for European Patent Application No. 22785826.3, mailed on Aug. 1, 2024, 7 pages.

Office Action received for Japanese Patent Application No. 2023-200980, mailed on Aug. 2, 2024, 8 pages (4 pages of English Translation and 4 pages of Official Copy).

Corrected Notice of Allowance received for U.S. Appl. No. 17/222,568, mailed on Apr. 24, 2025, 2 pages.

Corrected Notice of Allowance received for U.S. Appl. No. 17/971,407, mailed on May 20, 2025, 2 pages.

Decision to Grant received for European Patent Application No. 22732745.9, mailed on May 22, 2025, 4 pages.

Decision to Grant received for European Patent Application No. 23200887.0, mailed on May 22, 2025, 4 pages.

Non-Final Office Action received for U.S. Appl. No. 17/951,818, mailed on May 15, 2025, 32 pages.

Office Action received for Australian Patent Application No. 2023233133, mailed on May 23, 2025, 5 pages.

Office Action received for European Patent Application No. 21707473.1, mailed on May 9, 2025, 7 pages.

Office Action received for European Patent Application No. 22785826.3, mailed on May 8, 2025, 7 pages.

Applicant-Initiated Interview Summary received for U.S. Appl. No. 17/222,568, mailed on Apr. 16, 2025, 3 pages.

Decision to Grant received for European Patent Application No. 23214955.9, mailed on Apr. 10, 2025, 4 pages.

Notice of Allowance received for U.S. Appl. No. 17/971,407, mailed on Apr. 16, 2025, 7 pages.

Notice of Hearing received for Indian Patent Application No. 202217048935, mailed on May 26, 2025, 3 pages.

Office Action received for Japanese Patent Application No. 2024-032427, mailed on Apr. 21, 2025, 11 pages (5 pages of English Translation and 6 pages of Official Copy).

Applicant-Initiated Interview Summary received for U.S. Appl. No. 17/951,818, mailed on Mar. 3, 2025, 5 pages.

Applicant-Initiated Interview Summary received for U.S. Appl. No. 17/971,407, mailed on Apr. 1, 2025, 2 pages.

Corrected Notice of Allowance received for U.S. Appl. No. 17/900,734, mailed on Mar. 10, 2025, 3 pages.

Corrected Notice of Allowance received for U.S. Appl. No. 17/900,734, mailed on Mar. 17, 2025, 2 pages.

Emilio, Mauriziod, "CES 2021: Wearable Device with Biometric Authentication", Available online at: https://www.eetimes.eu/ces-2021-wearable-device-with-biometric-authentication/, EE Times Europe, Jan. 11, 2021, 6 pages.

Non-Final Office Action received for U.S. Appl. No. 17/971,407, mailed on Feb. 27, 2025, 9 pages.

Notice of Allowance received for U.S. Appl. No. 17/222,568, mailed on Mar. 27, 2025, 15 pages.

Notice of Allowance received for U.S. Appl. No. 17/900,734, mailed on Feb. 26, 2025, 8 pages.

Office Action received for Japanese Patent Application No. 2024-211628, mailed on Feb. 25, 2025, 12 pages (6 pages of English Translation and 6 pages of Official Copy).

Applicant-Initiated Interview Summary received for U.S. Appl. No. 17/951,818, mailed on Nov. 4, 2024, 5 pages.

Applicant-Initiated Interview Summary received for U.S. Appl. No. 18/595,238, mailed on Oct. 25, 2024, 2 pages.

Notice of Allowance received for Japanese Patent Application No. 2023-200980, mailed on Nov. 5, 2024, 4 pages (1 page of English Translation and 3 pages of Official Copy).

Office Action received for Indian Patent Application No. 202217048935, mailed on Oct. 29, 2024, 9 pages.

\* cited by examiner

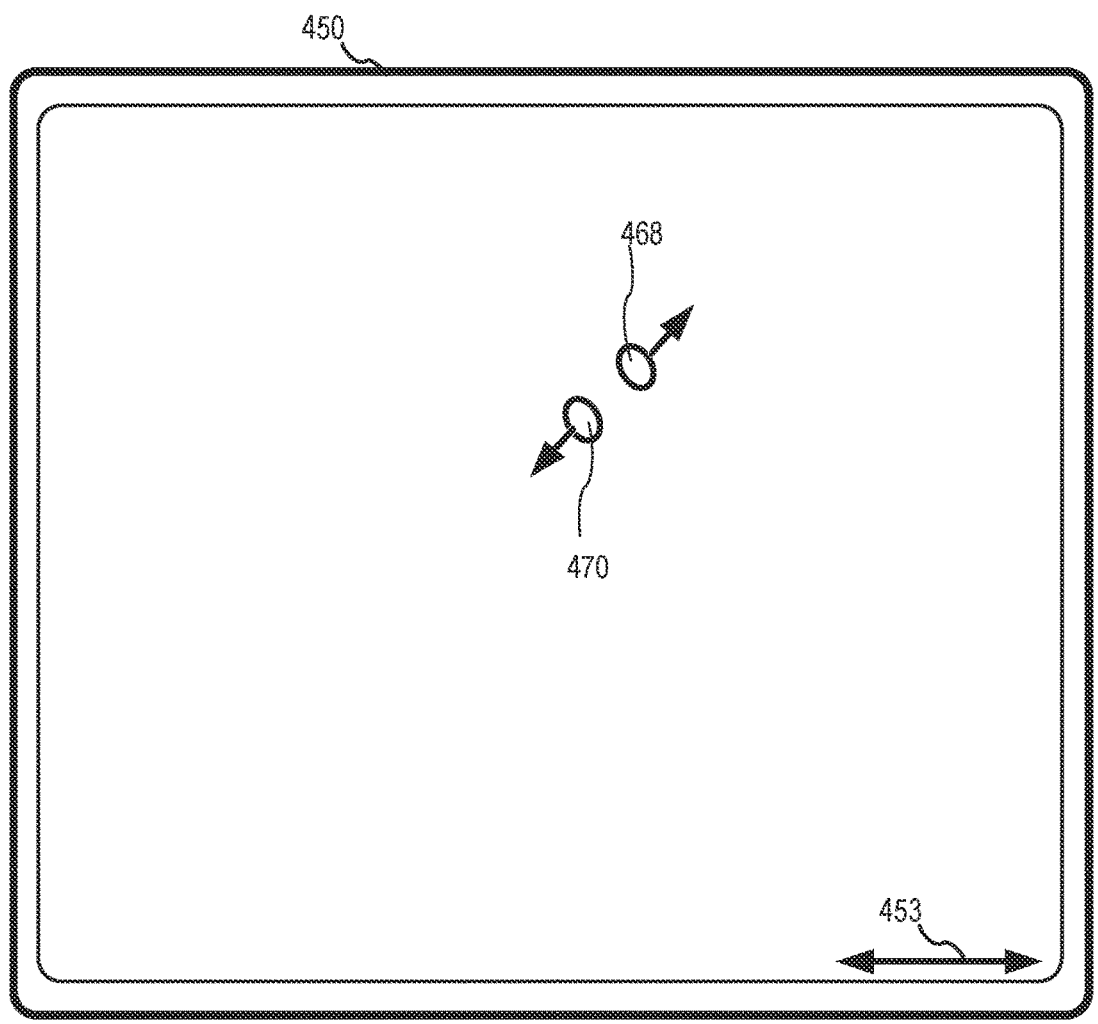
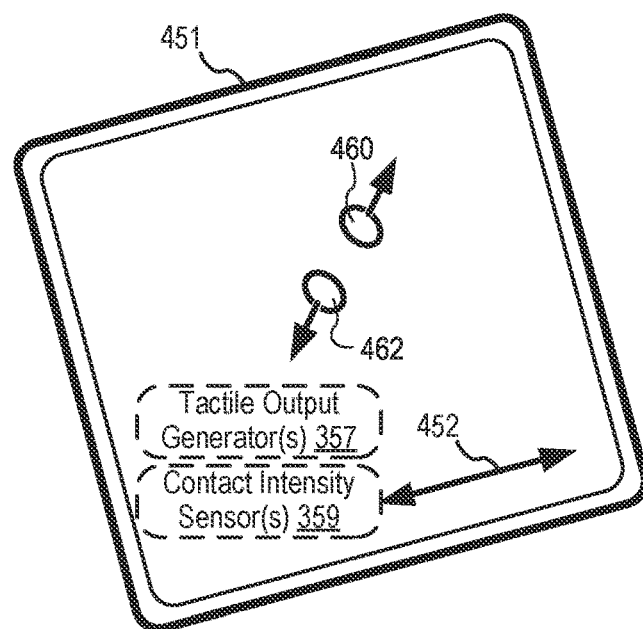
FIG. 4B

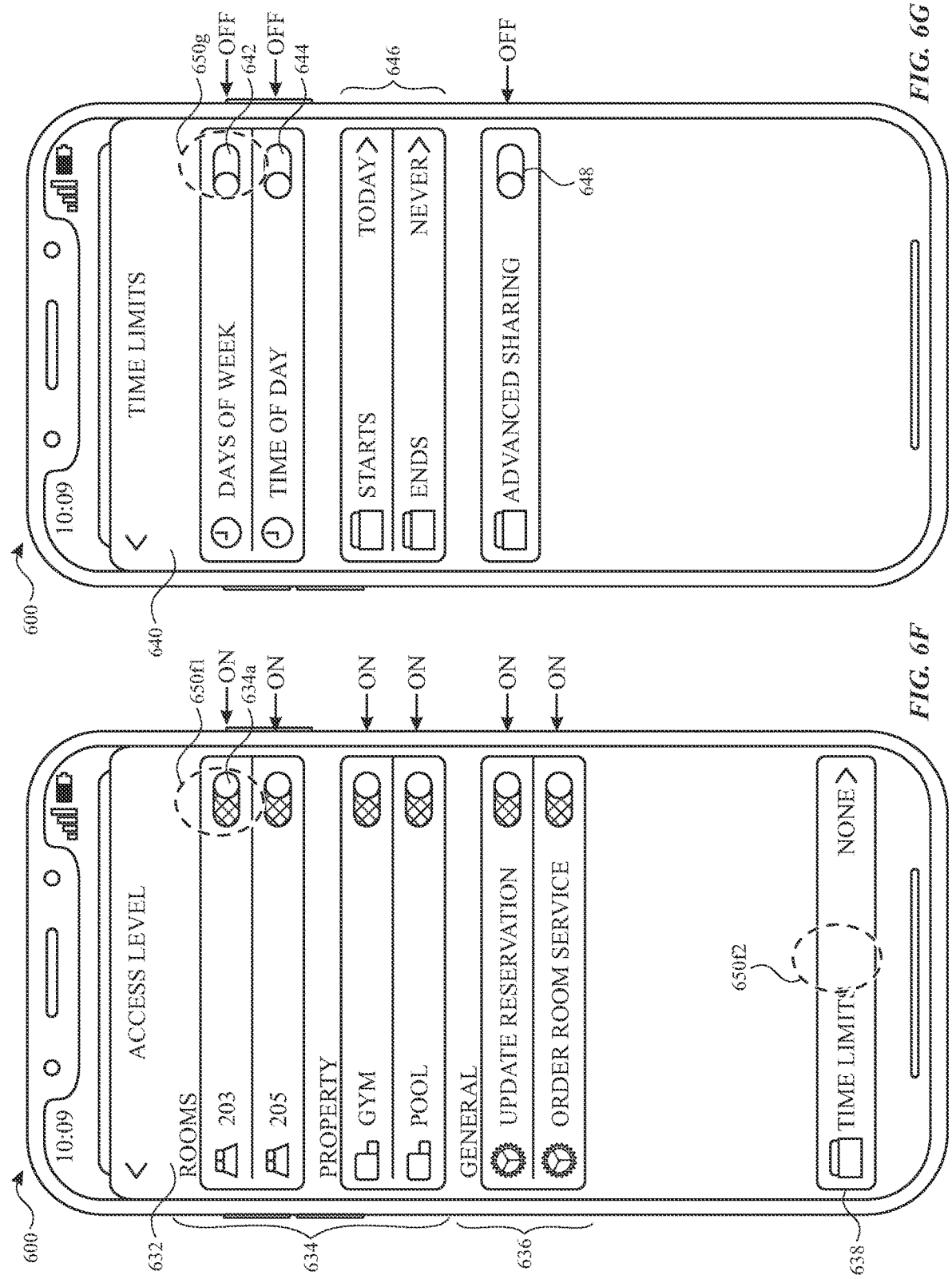

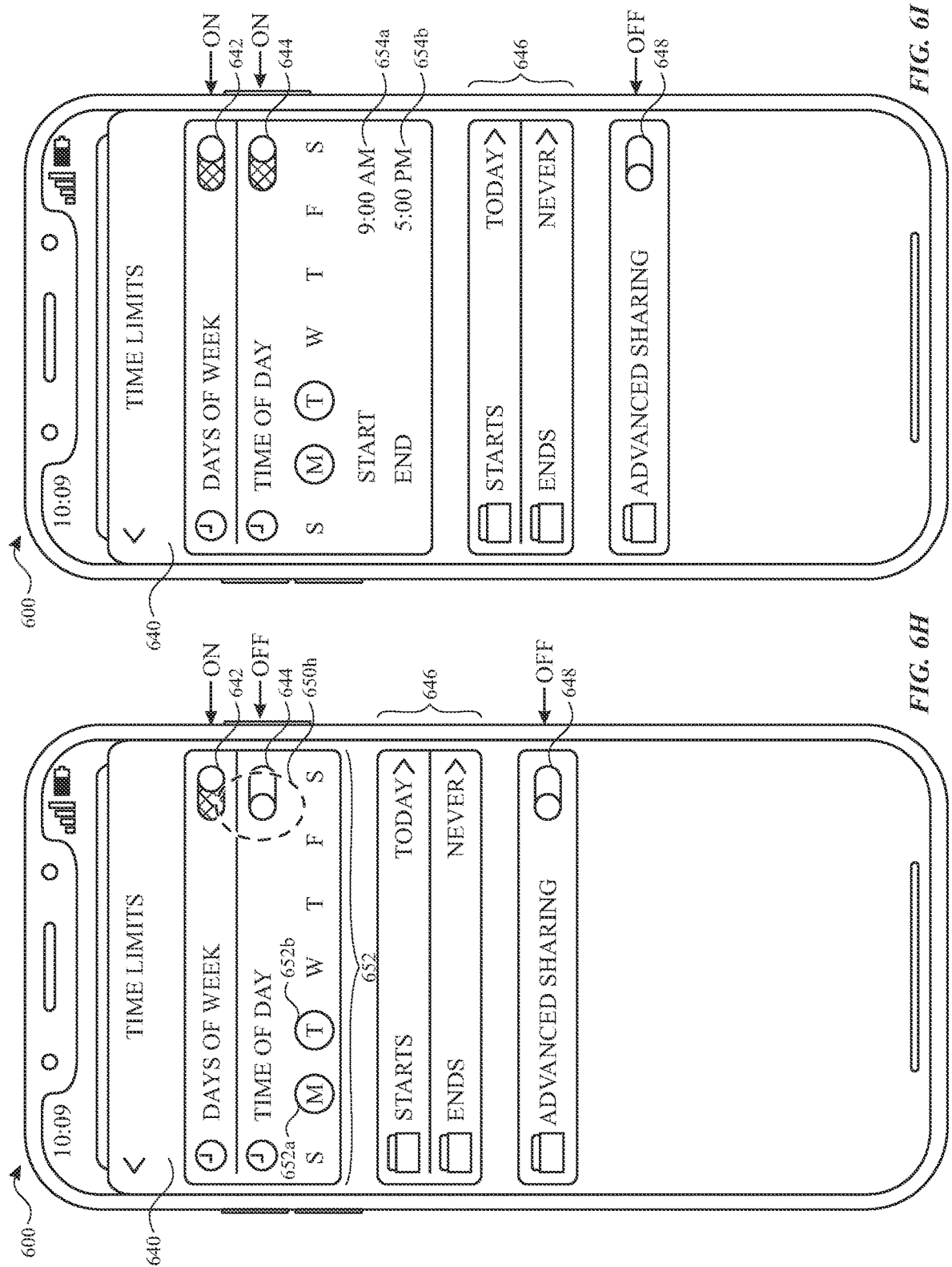

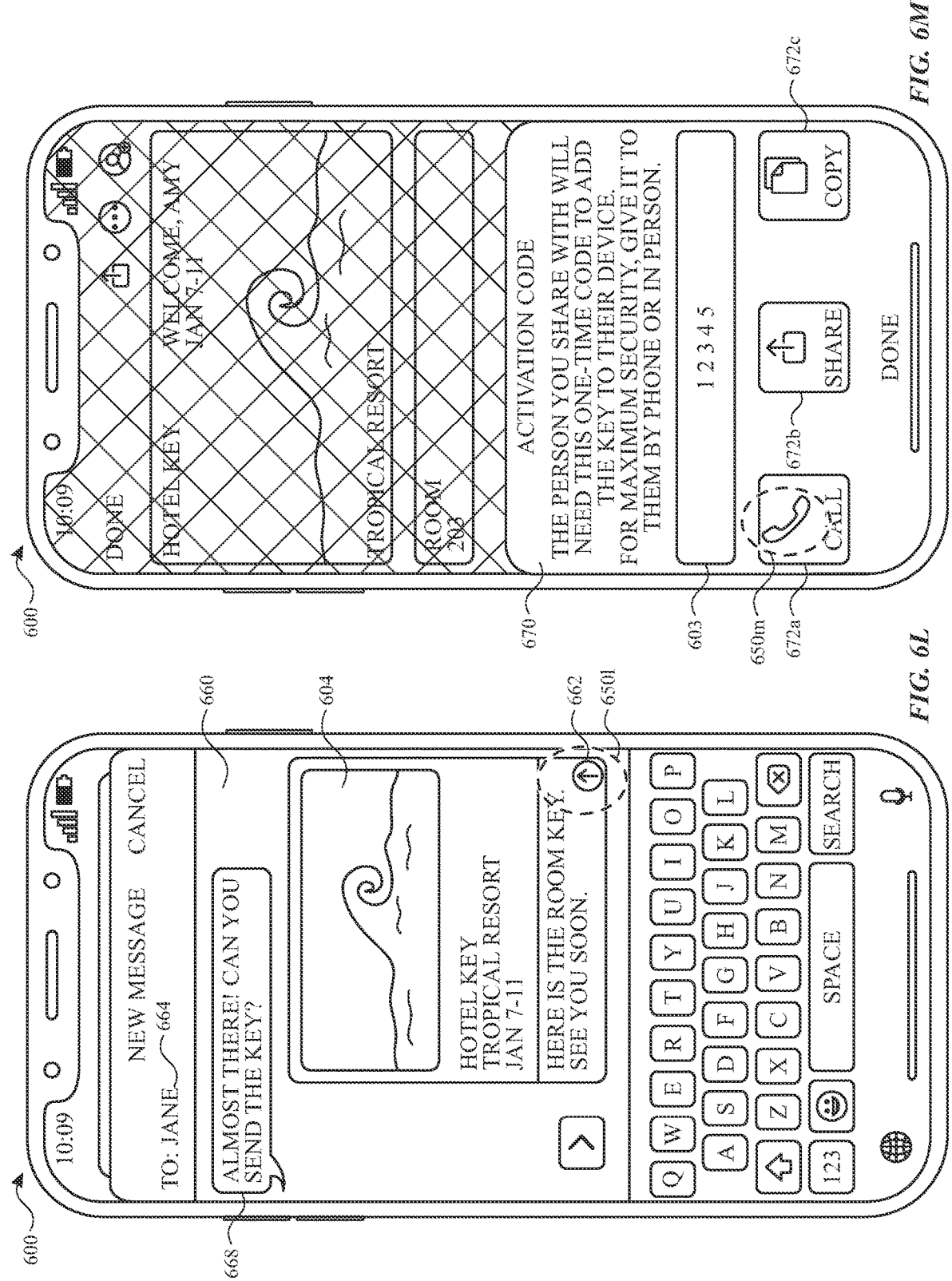

700

702
While the first computer system is associated with a first user, detect, via the one or more input devices, a set of one or more inputs corresponding to a request to share an electronic key of an electronic wallet with a second user that is different from the first user, wherein the electronic key provides one or more access rights to one or more physical locations.

704
In response to detecting the set of one or more inputs corresponding to the request to share the electronic key, initiate a process to share the electronic key with the second user of a second computer system that is different from the first user of the first computer system, wherein the process to share the electronic key with the second user of the second computer system includes:

706
In accordance with a determination that an activation code for the shared electronic key is enabled, displaying, via the display generation component, a first selectable object to initiate a process of communicating the activation code.

708
In accordance with a determination that the activation code for the shared electronic key is disabled, forgoing display of the first selectable object to initiate the process of communicating the activation code.

*FIG. 7*

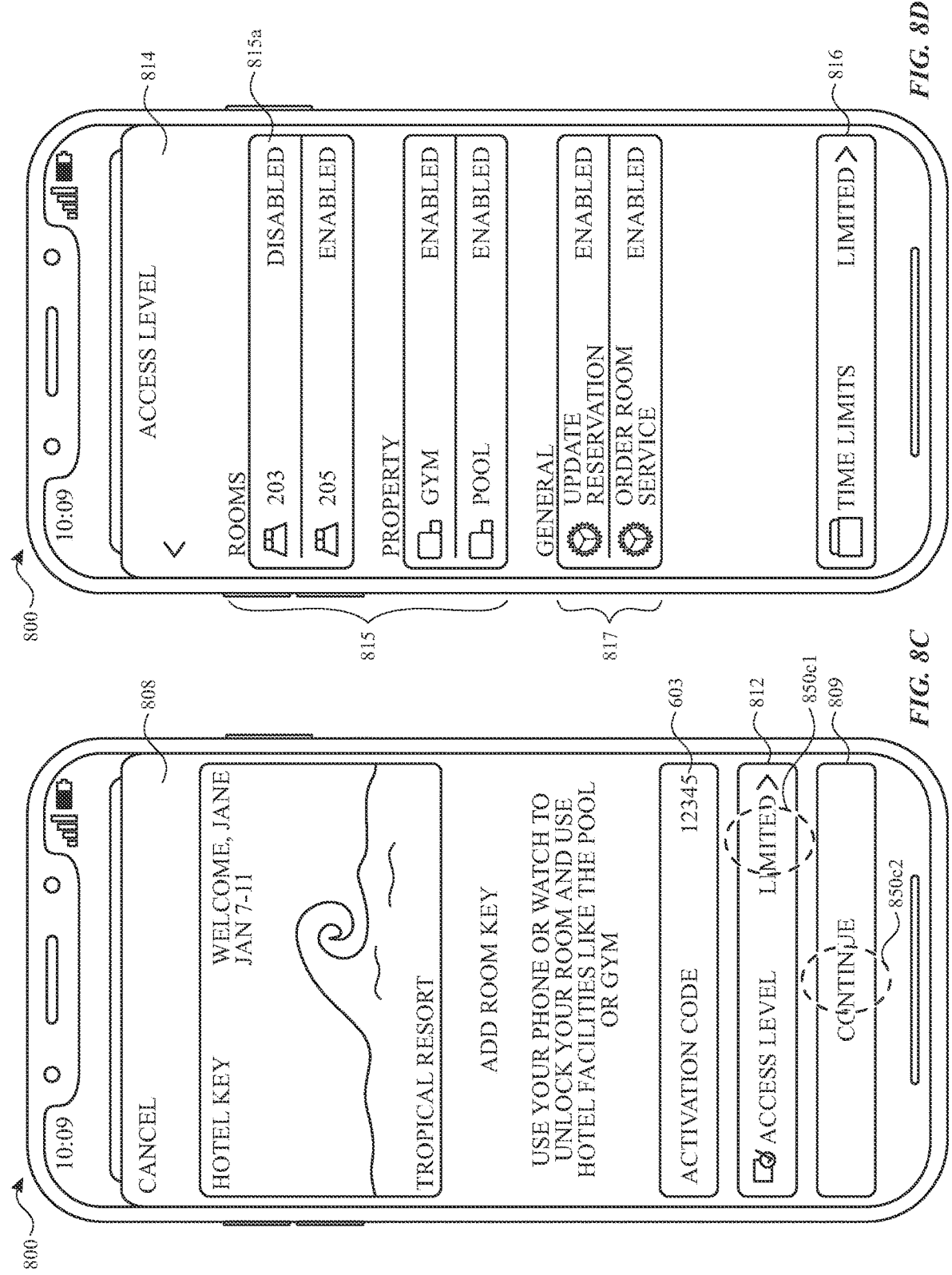

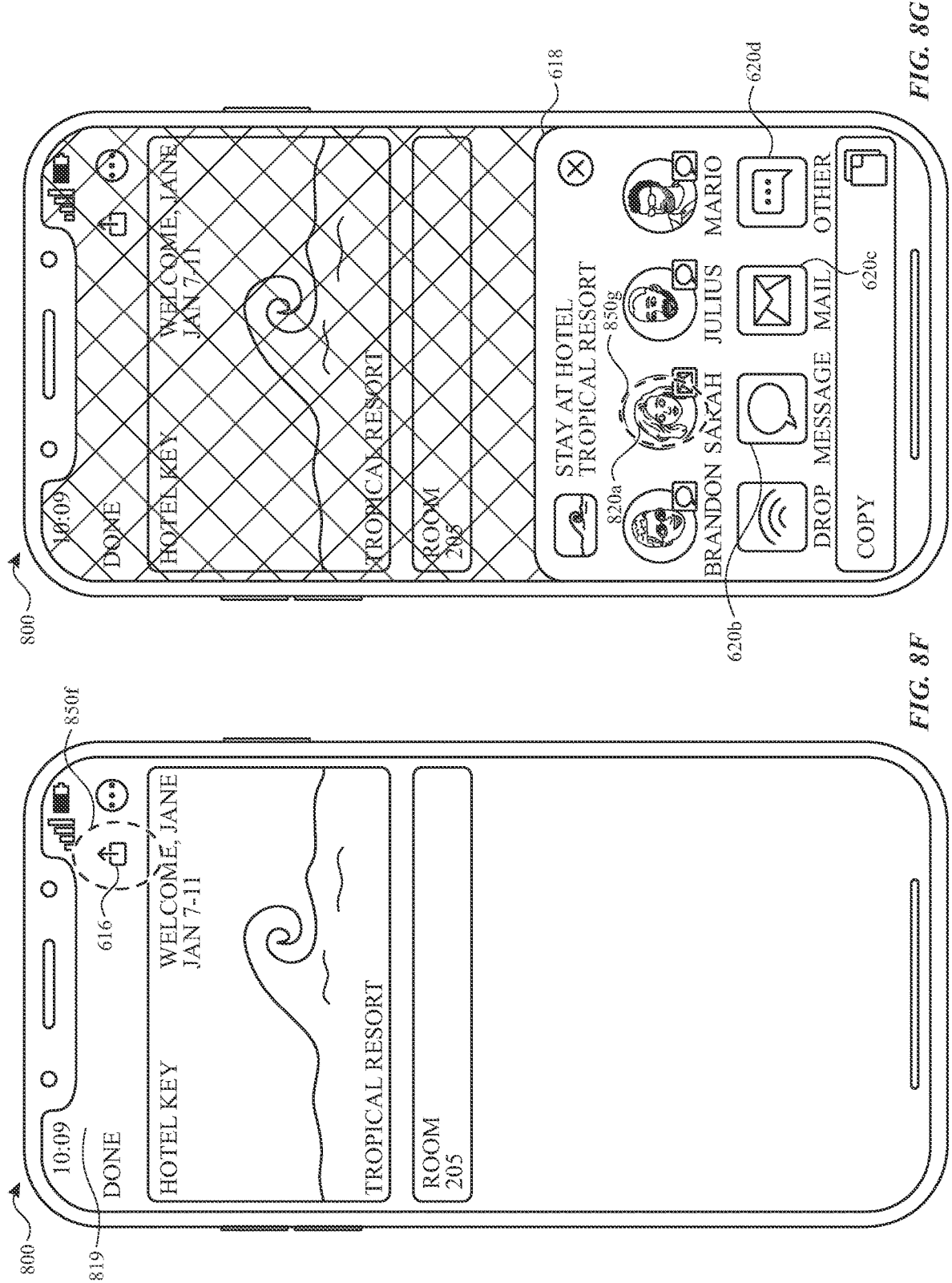

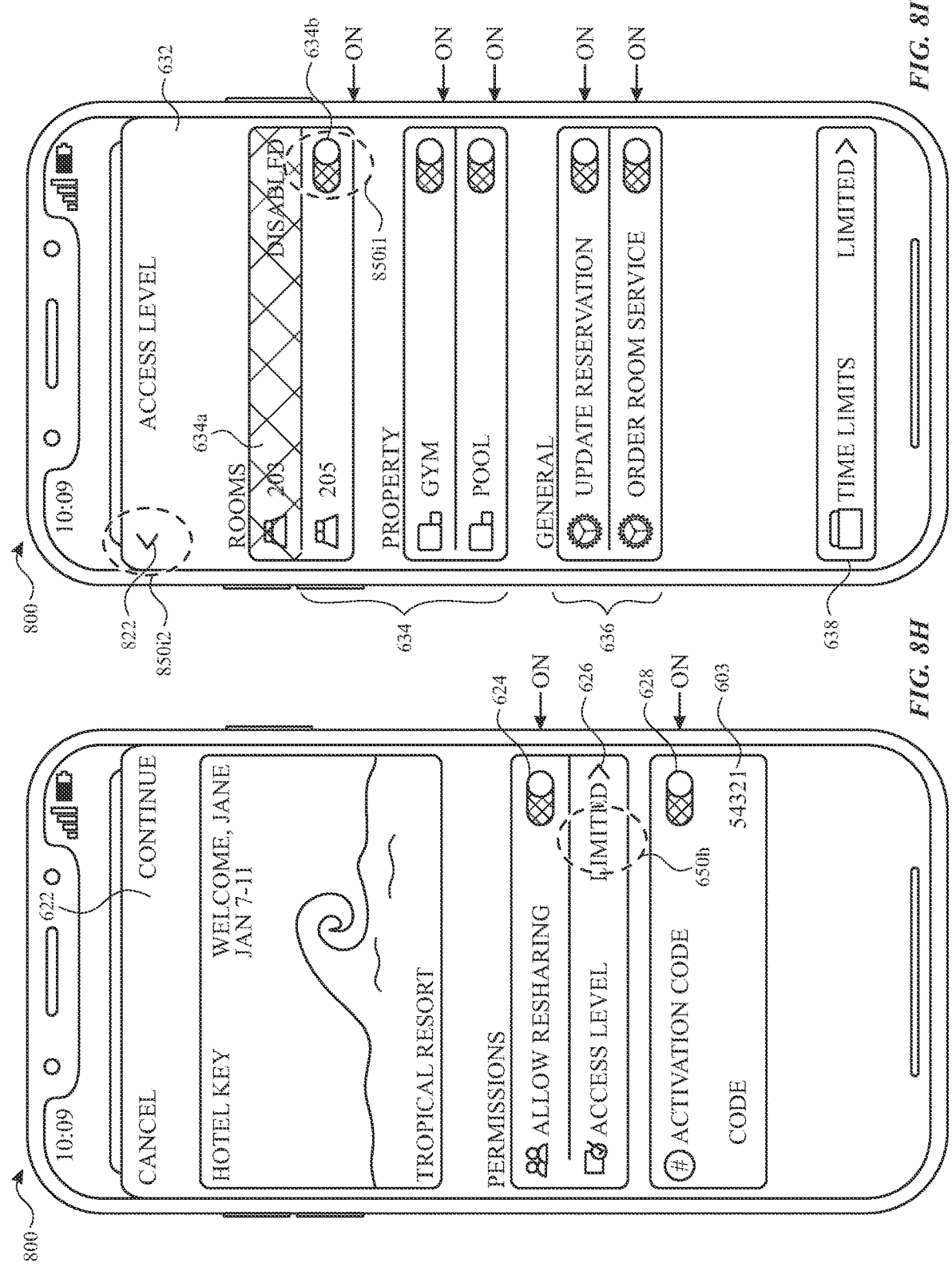

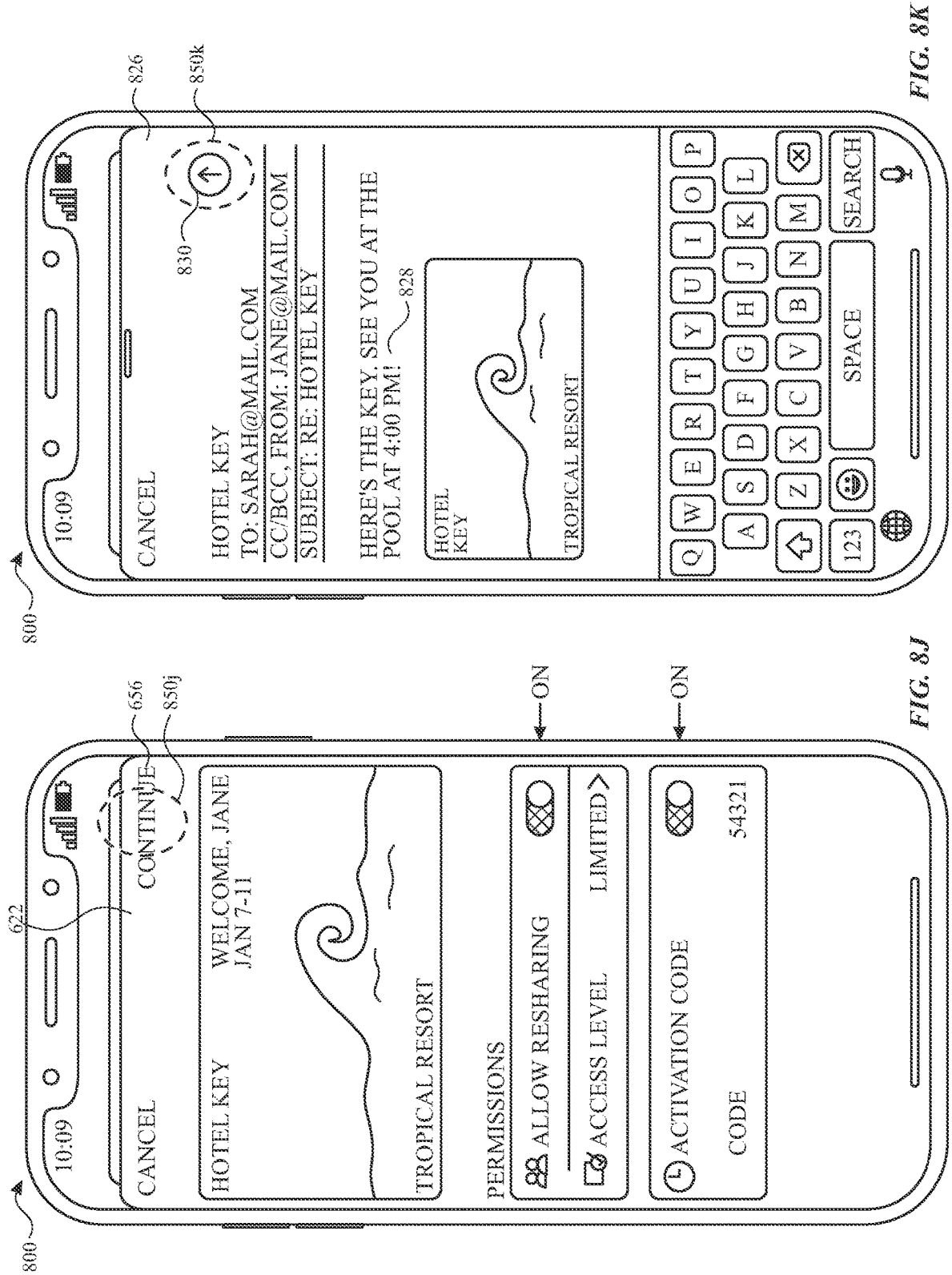

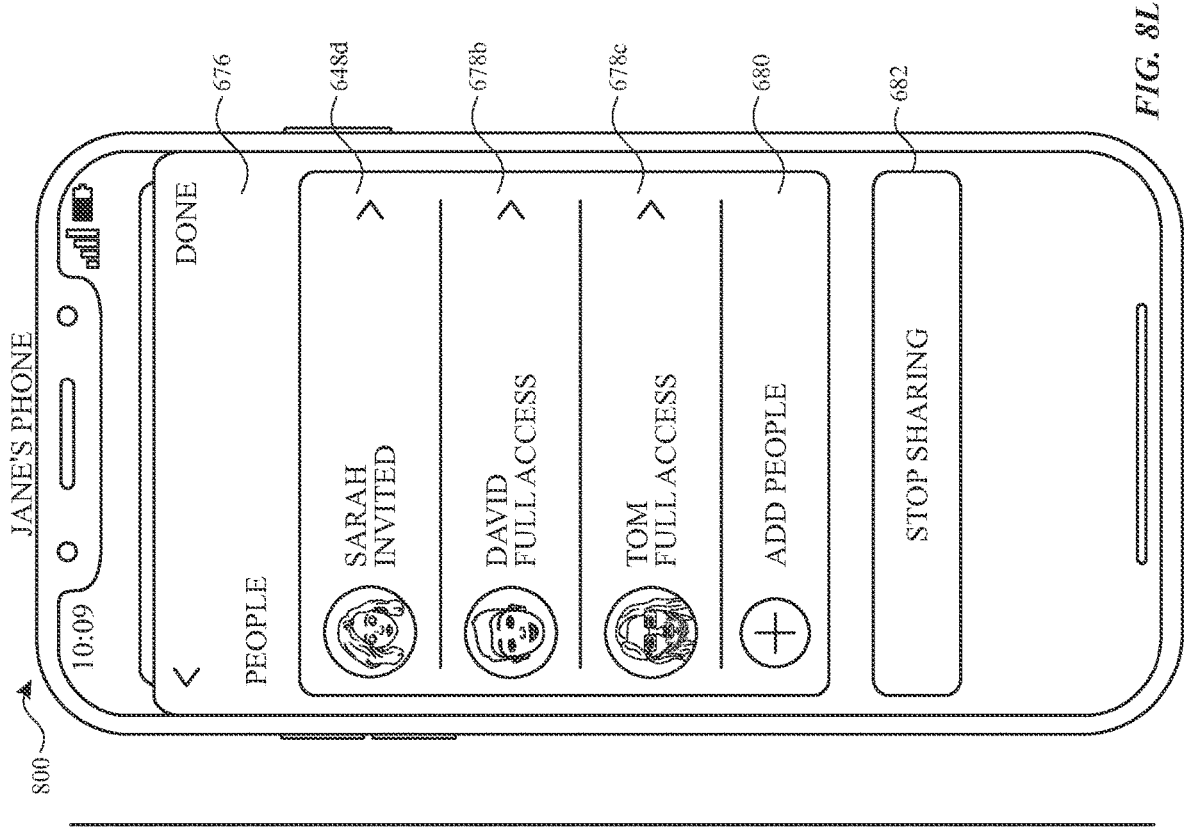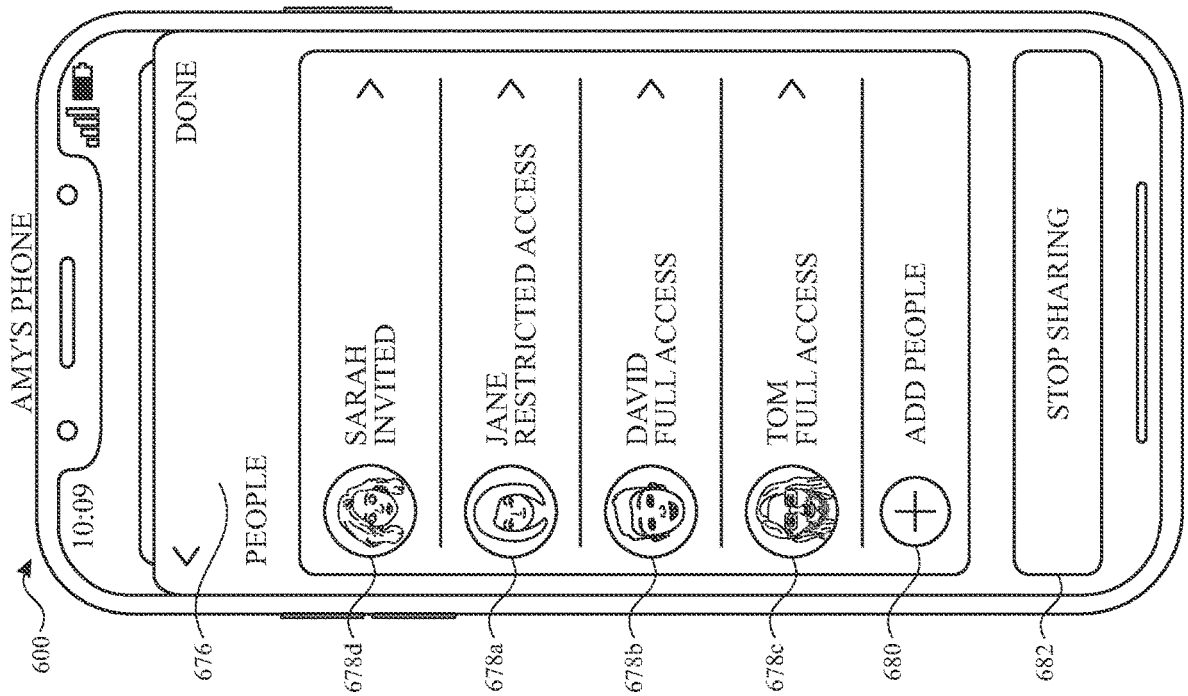
FIG. 8L

USER INTERFACES FOR SHARING AN ELECTRONIC KEY

CROSS-REFERENCE TO RELATED APPLICATIONS

This application claims priority to U.S. Patent Application Ser. No. 63/349,088, entitled "USER INTERFACES FOR SHARING AN ELECTRONIC KEY," filed on Jun. 4, 2022, the content of which is hereby incorporated by reference in its entirety.

TECHNICAL FIELD

The present disclosure relates generally to computer user interfaces, and more specifically to techniques for sharing an electronic key.

BACKGROUND

Electronic keys optionally provide access to physical locations, for example, by a wireless communication between the device storing the electronic key and an external device that grants physical access to the physical location.

BRIEF SUMMARY

Some techniques for sharing an electronic key using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for sharing an electronic key. Such methods and interfaces optionally complement or replace other methods for sharing an electronic key. Such methods and interfaces reduce the cognitive burden on a user and produce a more efficient human-machine interface. For battery-operated computing devices, such methods and interfaces conserve power and increase the time between battery charges. Additionally, such methods and interfaces provide improved security for an electronic key sharing process and how electronic devices share physical access rights when electronic keys are shared.

In accordance with some embodiments, a method is described. The method comprises: at a first computer system that is in communication with a display generation component and one or more input devices: while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and in response to detecting the set of one or more inputs corresponding to the request to share the electronic key: initiating a process to share the electronic key with the second user of a second computer system that is different from the first user of the first computer system, wherein the process to share the electronic key with the second user of the second computer system includes: in accordance with a determination that an activation code for the shared electronic key is enabled, displaying, via the display generation component, a first selectable object to initiate a process of communicating the activation code; and in accordance with a determination that the activation code for the shared electronic key is disabled, forgoing display of the first selectable object to initiate the process of communicating the activation code.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and in response to detecting the set of one or more inputs corresponding to the request to share the electronic key: initiating a process to share the electronic key with the second user of a second computer system that is different from the first user of the first computer system, wherein the process to share the electronic key with the second user of the second computer system includes: in accordance with a determination that an activation code for the shared electronic key is enabled, displaying, via the display generation component, a first selectable object to initiate a process of communicating the activation code; and in accordance with a determination that the activation code for the shared electronic key is disabled, forgoing display of the first selectable object to initiate the process of communicating the activation code.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and in response to detecting the set of one or more inputs corresponding to the request to share the electronic key: initiating a process to share the electronic key with the second user of a second computer system that is different from the first user of the first computer system, wherein the process to share the electronic key with the second user of the second computer system includes: in accordance with a determination that an activation code for the shared electronic key is enabled, displaying, via the display generation component, a first selectable object to initiate a process of communicating the activation code; and in accordance with a determination that the activation code for the shared electronic key is disabled, forgoing display of the first selectable object to initiate the process of communicating the activation code.

In accordance with some embodiments, a computer system configured to communicate with a display generation component and one or more input devices is described. The computer system comprises: one or more processors; and memory storing one or more programs configured to be executed by the one or more processors, the one or more programs including instructions for: while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and in response to detecting the set of one or more inputs corresponding to the request to share the electronic key: initiating a process to share the electronic key with the second user of a second computer system that is different from the first user of the first computer system, wherein the process to share the electronic key with the second user of the second computer system includes: in accordance with a determination that an activation code for the shared electronic key is enabled, displaying, via the display generation component, a first selectable object to initiate a process of communicating the activation code; and in accordance with a determination that the activation code for the shared electronic key is disabled, forgoing display of the first selectable object to initiate the process of communicating the activation code.

In accordance with some embodiments, a computer system configured to communicate with a display generation component and one or more input devices is described. The computer system comprises: means, while the first computer system is associated with a first user, for detecting, via the one or more input devices, a set of one or more inputs corresponding to a request to share an electronic key of an electronic wallet with a second user that is different from the first user, wherein the electronic key provides one or more access rights to one or more physical locations; and means, in response to detecting the set of one or more inputs corresponding to the request to share the electronic key, for: initiating a process to share the electronic key with the second user of a second computer system that is different from the first user of the first computer system, wherein the process to share the electronic key with the second user of the second computer system includes: in accordance with a determination that an activation code for the shared electronic key is enabled, displaying, via the display generation component, a first selectable object to initiate a process of communicating the activation code; and in accordance with a determination that the activation code for the shared electronic key is disabled, forgoing display of the first selectable object to initiate the process of communicating the activation code.

In accordance with some embodiments, a computer program product is described. The computer program product comprises one or more programs configured to be executed by one or more processors of a computer system that is in communication with a display generation component and one or more input devices, the one or more programs including instructions for: while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and in response to detecting the set of one or more inputs corresponding to the request to share the electronic key: initiating a process to share the electronic key with the second user of a second computer system that is different from the first user of the first computer system, wherein the process to share the electronic key with the second user of the second computer system includes: in accordance with a determination that an activation code for the shared electronic key is enabled, displaying, via the display generation component, a first selectable object to initiate a process of communicating the activation code; and in accordance with a determination that the activation code for the shared electronic key is disabled, forgoing display of the first selectable object to initiate the process of communicating the activation code.

In accordance with some embodiments, a method is described. The method comprises: at a first computer system that is in communication with one or more input devices: while the first computer system is associated with a first user, receiving, from a second user of a second computer system different from the first user of the first computer system, first information about an electronic key to be provisioned onto an electronic wallet of the first computer system that is associated with the first user, wherein the electronic key provides a first set of access rights to one or more physical locations; provisioning, using the first information about the electronic key, the electronic key to the electronic wallet of the first computer system; after provisioning the electronic key to the electronic wallet of the first computer system, detecting, via the one or more input devices, a request to share the electronic key with a third user that is different from the first user and the second user, wherein the request to share the electronic key with the third user specifies a second set of access rights for the shared electronic key; and in response to detecting the request to share the electronic key with the third user, initiating a process to share the electronic key with the second set of access rights with the third user of a third computer system that is different from the first computer system and the second computer system.

In accordance with some embodiments, a non-transitory computer-readable storage medium is described. The non-transitory computer-readable storage medium stores one or more programs configured to be executed by one or more processors of a first computer system that is in communication with one or more input devices, the one or more programs including instructions for: while the first computer system is associated with a first user, receiving, from a second user of a second computer system different from the first user of the first computer system, first information about an electronic key to be provisioned onto an electronic wallet of the first computer system that is associated with the first user, wherein the electronic key provides a first set of access rights to one or more physical locations; provisioning, using the first information about the electronic key, the electronic key to the electronic wallet of the first computer system; after provisioning the electronic key to the electronic wallet of the first computer system, detecting, via the one or more input devices, a request to share the electronic key with a third user that is different from the first user and the second user, wherein the request to share the electronic key with the third user specifies a second set of access rights for the shared electronic key; and in response to detecting the request to share the electronic key with the third user, initiating a process to share the electronic key with the second set of access rights with the third user of a third computer system that is different from the first computer system and the second computer system.

In accordance with some embodiments, a transitory computer-readable storage medium is described. The transitory computer-readable storage medium stores one or more programs configured to be executed by one or more processors of a first computer system that is in communication with one or more input devices, the one or more programs including instructions for: while the first computer system is associated with a first user, receiving, from a second user of a second computer system different from the first user of the first computer system, first information about an electronic key to be provisioned onto an electronic wallet of the first computer system that is associated with the first user, wherein the electronic key provides a first set of access rights to one or more physical locations; provisioning, using the first information about the electronic key, the electronic key to the electronic wallet of the first computer system; after provisioning the electronic key to the electronic wallet of the first computer system, detecting, via the one or more input devices, a request to share the electronic key with a third user that is different from the first user and the second user, wherein the request to share the electronic key with the third user specifies a second set of access rights for the shared electronic key; and in response to detecting the request to share the electronic key with the third user, initiating a process to share the electronic key with the second set of access rights with the third user of a third computer system that is different from the first computer system and the second computer system.

In accordance with some embodiments, a first computer system configured to communicate with one or more input devices is described. The first computer system comprises: one or more processors; and memory storing one or more programs configured to be executed by the one or more processors, the one or more programs including instructions for: while the first computer system is associated with a first user, receiving, from a second user of a second computer system different from the first user of the first computer system, first information about an electronic key to be provisioned onto an electronic wallet of the first computer system that is associated with the first user, wherein the electronic key provides a first set of access rights to one or more physical locations; provisioning, using the first information about the electronic key, the electronic key to the electronic wallet of the first computer system; after provisioning the electronic key to the electronic wallet of the first computer system, detecting, via the one or more input devices, a request to share the electronic key with a third user that is different from the first user and the second user, wherein the request to share the electronic key with the third user specifies a second set of access rights for the shared electronic key; and in response to detecting the request to share the electronic key with the third user, initiating a process to share the electronic key with the second set of access rights with the third user of a third computer system that is different from the first computer system and the second computer system.

In accordance with some embodiments, a first computer system configured to communicate with one or more input devices is described. The computer system comprises: means for, while the first computer system is associated with a first user, receiving, from a second user of a second computer system different from the first user of the first computer system, first information about an electronic key to be provisioned onto an electronic wallet of the first computer system that is associated with the first user, wherein the electronic key provides a first set of access rights to one or more physical locations; means for, provisioning, using the first information about the electronic key, the electronic key to the electronic wallet of the first computer system; means, after provisioning the electronic key to the electronic wallet of the first computer system, for detecting, via the one or more input devices, a request to share the electronic key with a third user that is different from the first user and the second user, wherein the request to share the electronic key with the third user specifies a second set of access rights for the shared electronic key; and means, in response to detecting the request to share the electronic key with the third user, for initiating a process to share the electronic key with the second set of access rights with the third user of a third computer system that is different from the first computer system and the second computer system.

In accordance with some embodiments, a computer program product is described. The computer program product comprises one or more programs configured to be executed by one or more processors of a first computer system that is in communication with one or more input devices, the one or more programs including instructions for: while the first computer system is associated with a first user, receiving, from a second user of a second computer system different from the first user of the first computer system, first information about an electronic key to be provisioned onto an electronic wallet of the first computer system that is associated with the first user, wherein the electronic key provides a first set of access rights to one or more physical locations; provisioning, using the first information about the electronic key, the electronic key to the electronic wallet of the first computer system; after provisioning the electronic key to the electronic wallet of the first computer system, detecting, via the one or more input devices, a request to share the electronic key with a third user that is different from the first user and the second user, wherein the request to share the electronic key with the third user specifies a second set of access rights for the shared electronic key; and in response to detecting the request to share the electronic key with the third user, initiating a process to share the electronic key with the second set of access rights with the third user of a third computer system that is different from the first computer system and the second computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for sharing an electronic key, thereby increasing the effectiveness, efficiency, and user satisfaction with such devices. Such methods and interfaces may complement or replace other methods for sharing an electronic key.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating methods of sharing an electronic key, in accordance with some embodiments.

FIGS. 8A-8L, illustrates exemplary user interfaces for re-sharing an electronic key, in accordance with some embodiments.

DESCRIPTION OF EMBODIMENTS

Figure 1A:
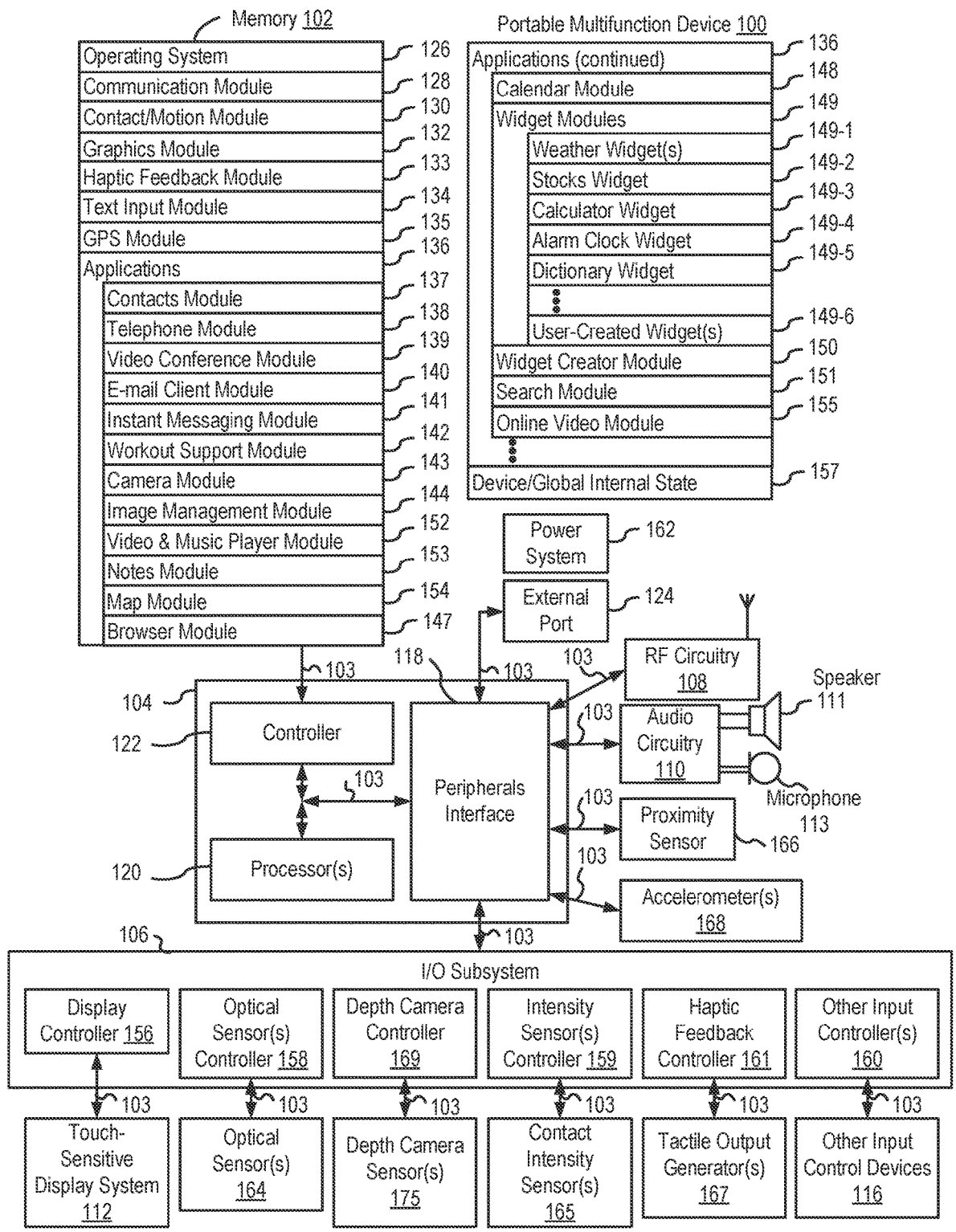
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for sharing an electronic key. Sharing an electronic key, for example, provides different electronic devices with access rights to physical locations. Such techniques can reduce the cognitive burden on a user who share electronic keys, thereby enhancing productivity. Further, such techniques can reduce processor and battery power otherwise wasted on redundant user inputs. Additionally, such techniques improve security of how electronic keys are shared (including an initial process of sharing an electronic key and/or managing an access right of a shared key that has been re-shared with another electronic device).

Below, FIGS. 1A-1B, 2, 3, 4A-4B, and 5A-5C provide a description of exemplary devices for performing the techniques for sharing electronic keys. FIGS. 6A-6R illustrate exemplary user interfaces for sharing an electronic key. FIG. 7 is a flow diagram illustrating methods of sharing an electronic key in accordance with some embodiments. The user interfaces in FIGS. 6A-6R are used to illustrate the processes described below, including the processes in FIG. 7. FIGS. 8A-8L illustrate exemplary user interfaces for re-sharing a shared electronic key. FIG. 9 is a flow diagram illustrating methods of re-sharing a shared electronic key in accordance with some embodiments. The user interfaces in FIGS. 8A-8L are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving the security of sharing an electronic key, improving how multiple devices share access rights to physical locations, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used.

It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
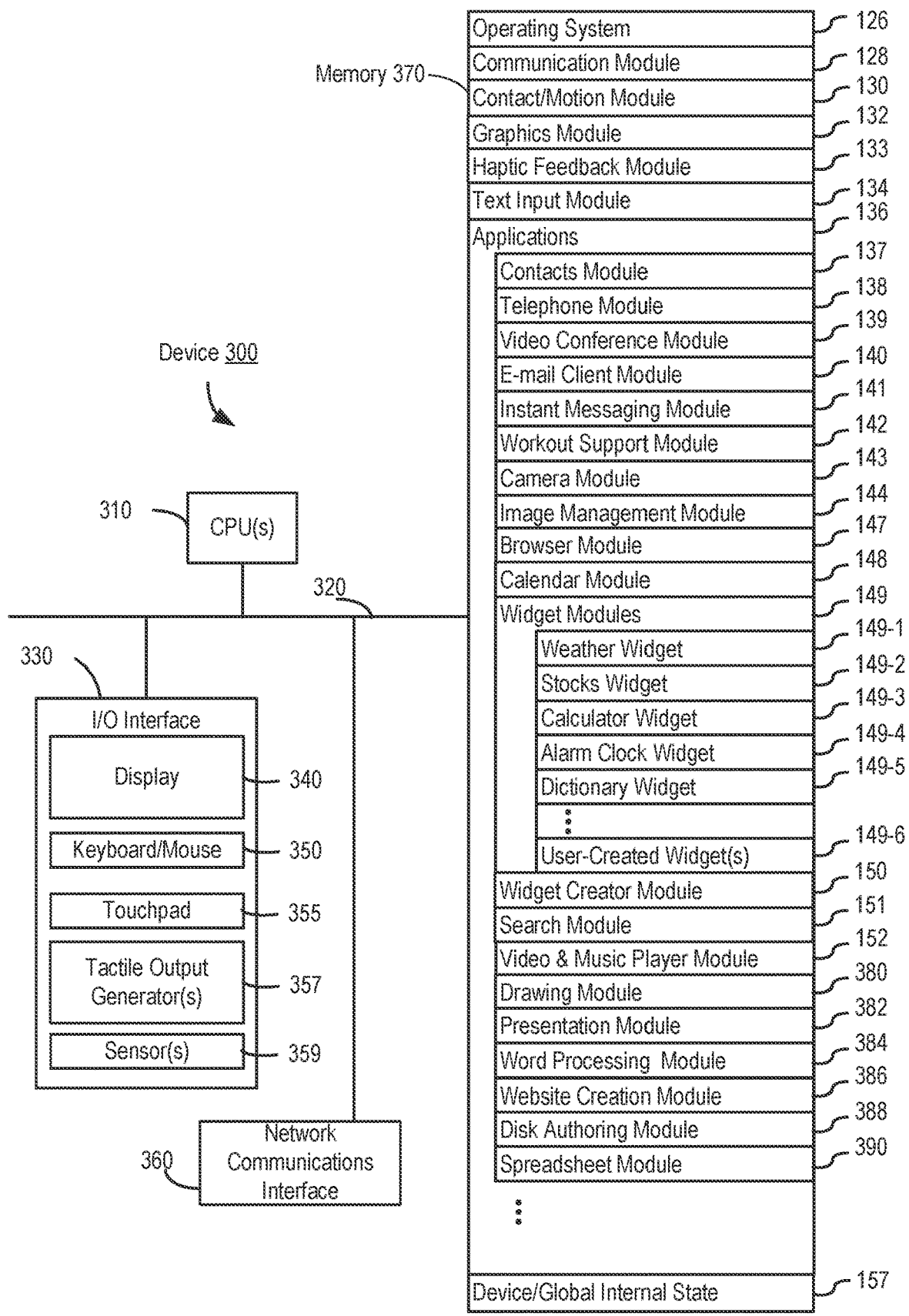
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
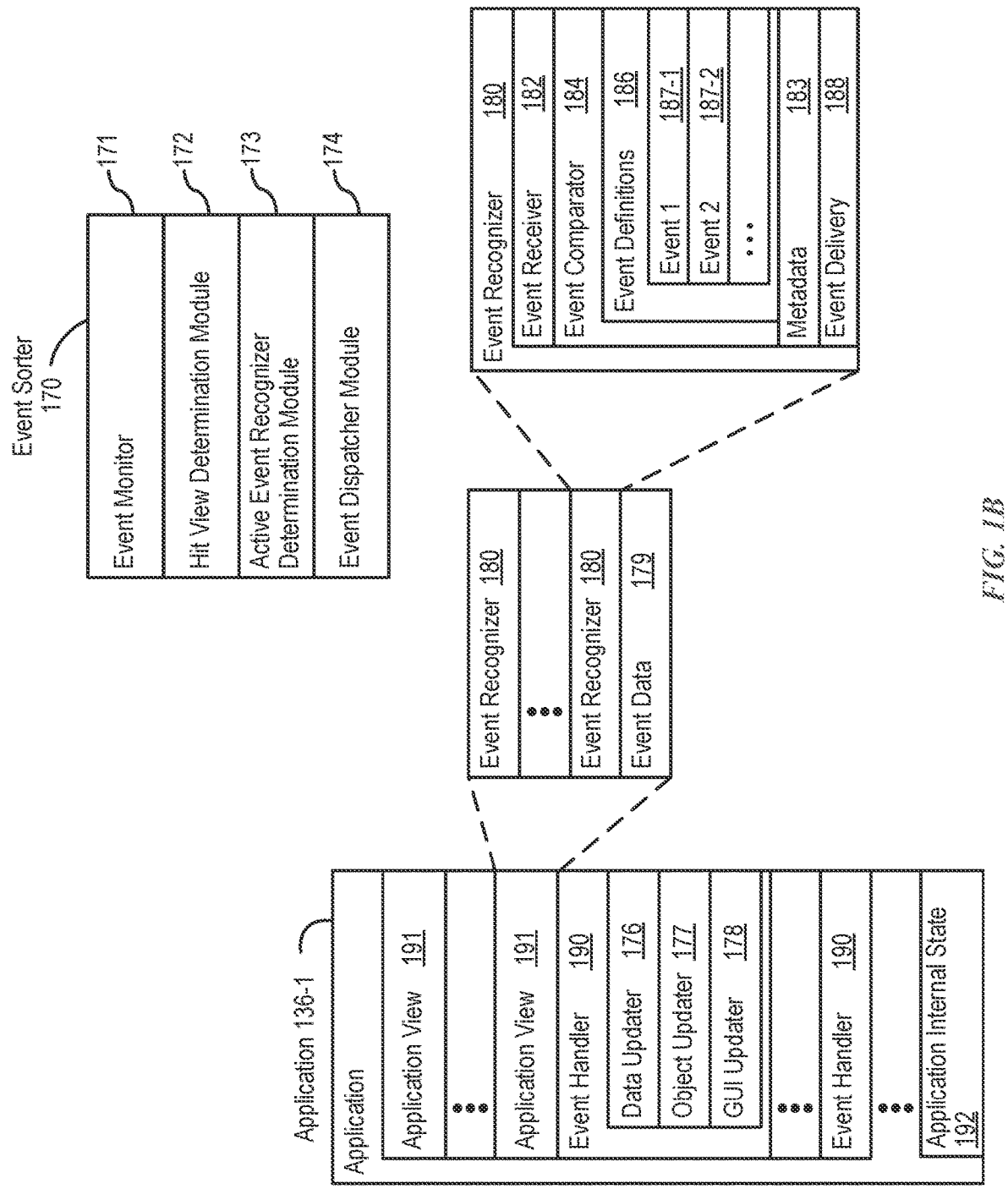
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
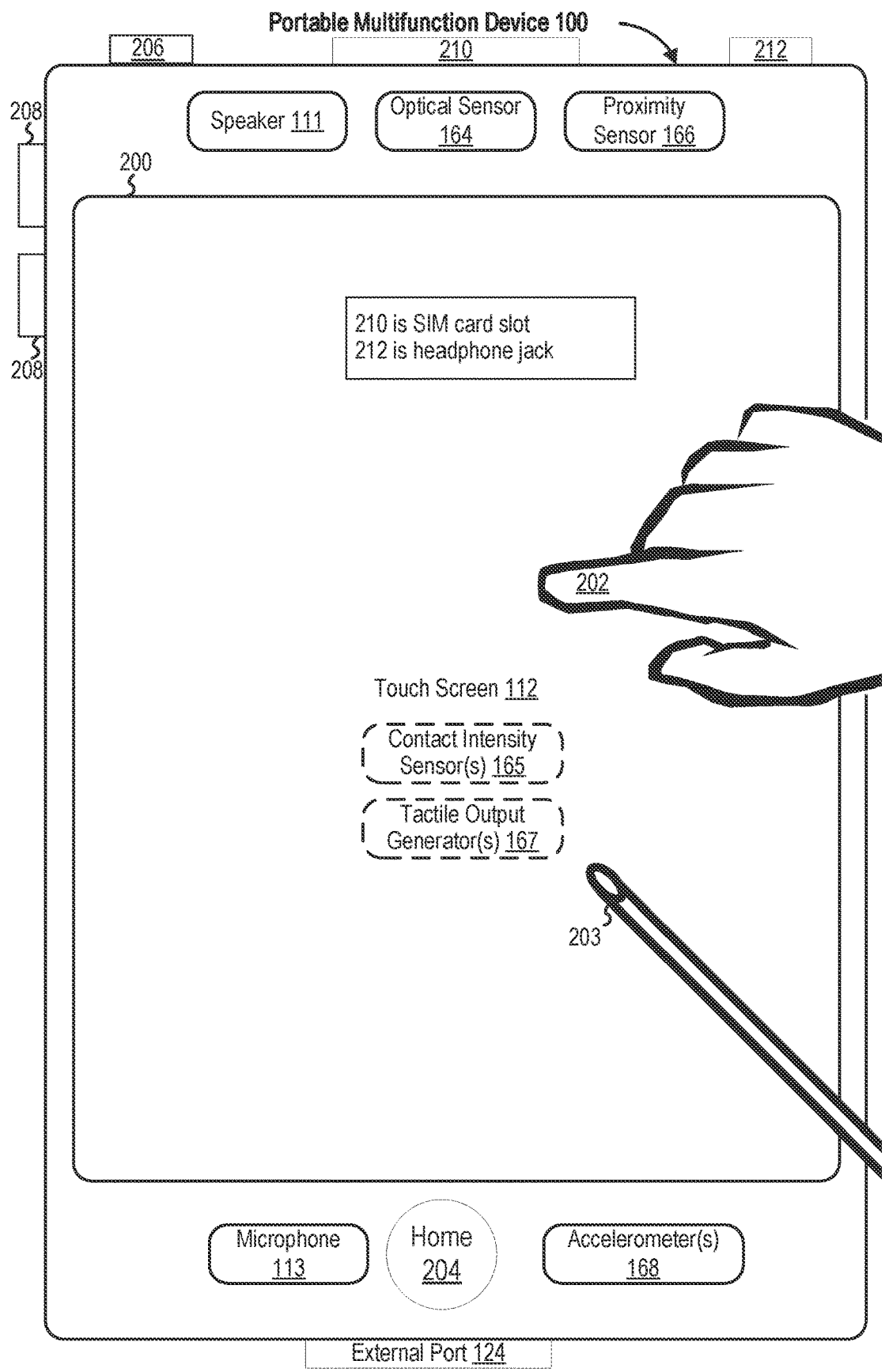
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
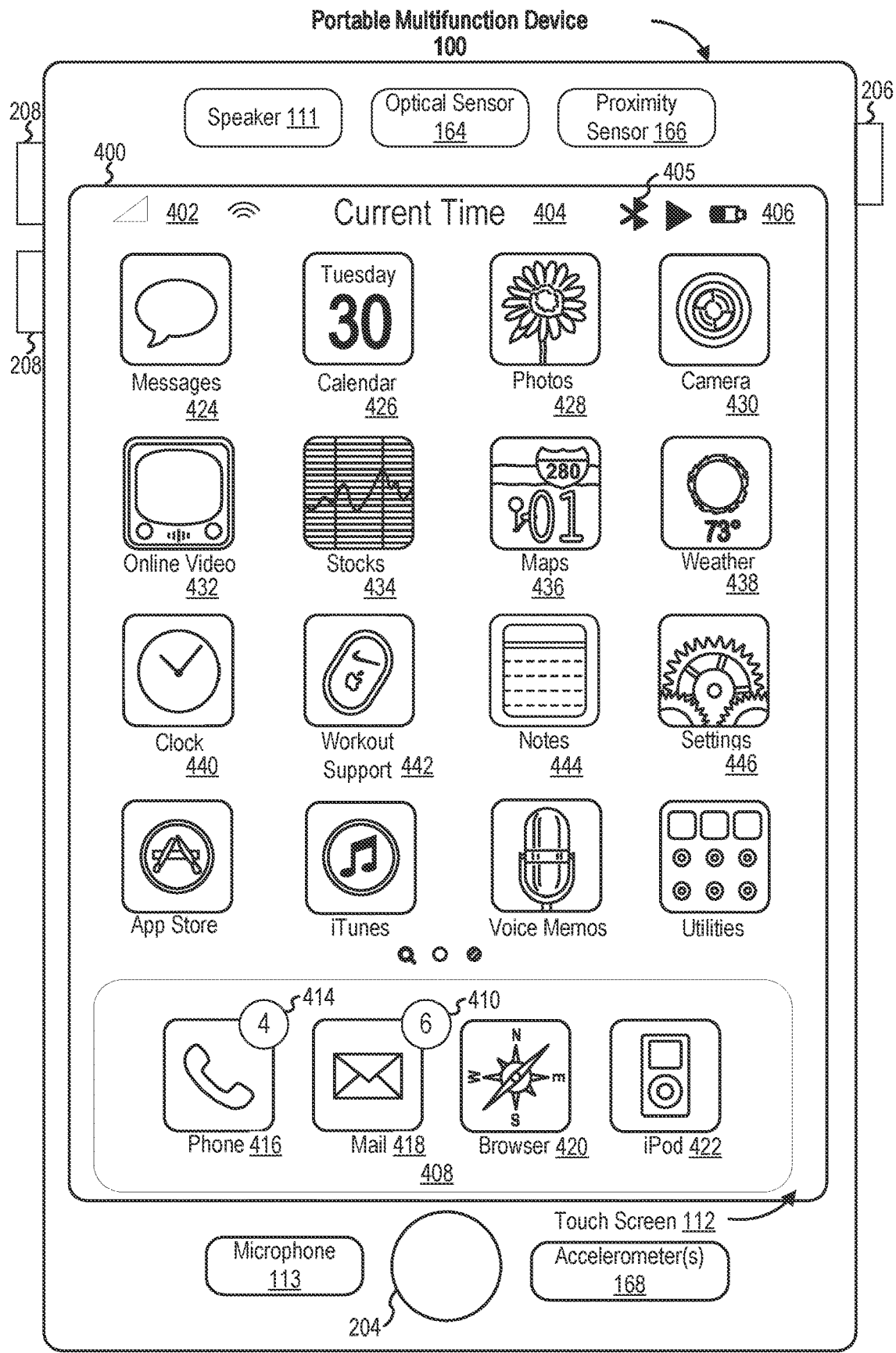
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
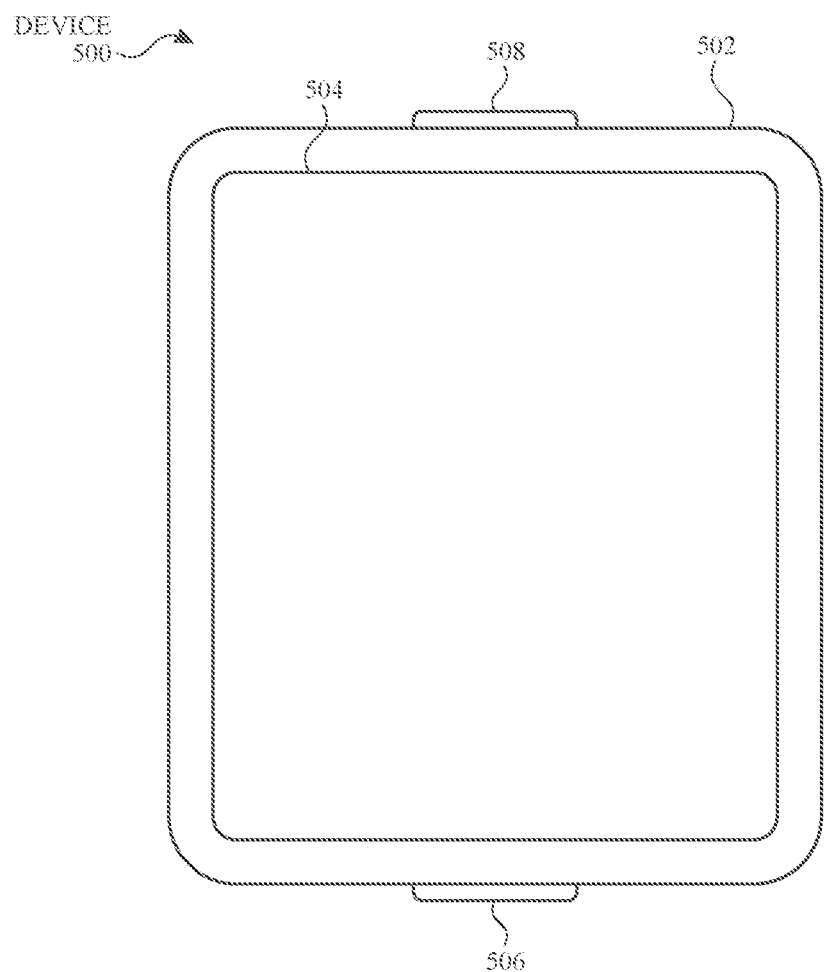
FIG. 5A illustrates a personal electronic device in accordance with some embodiments.
Figure 6A:
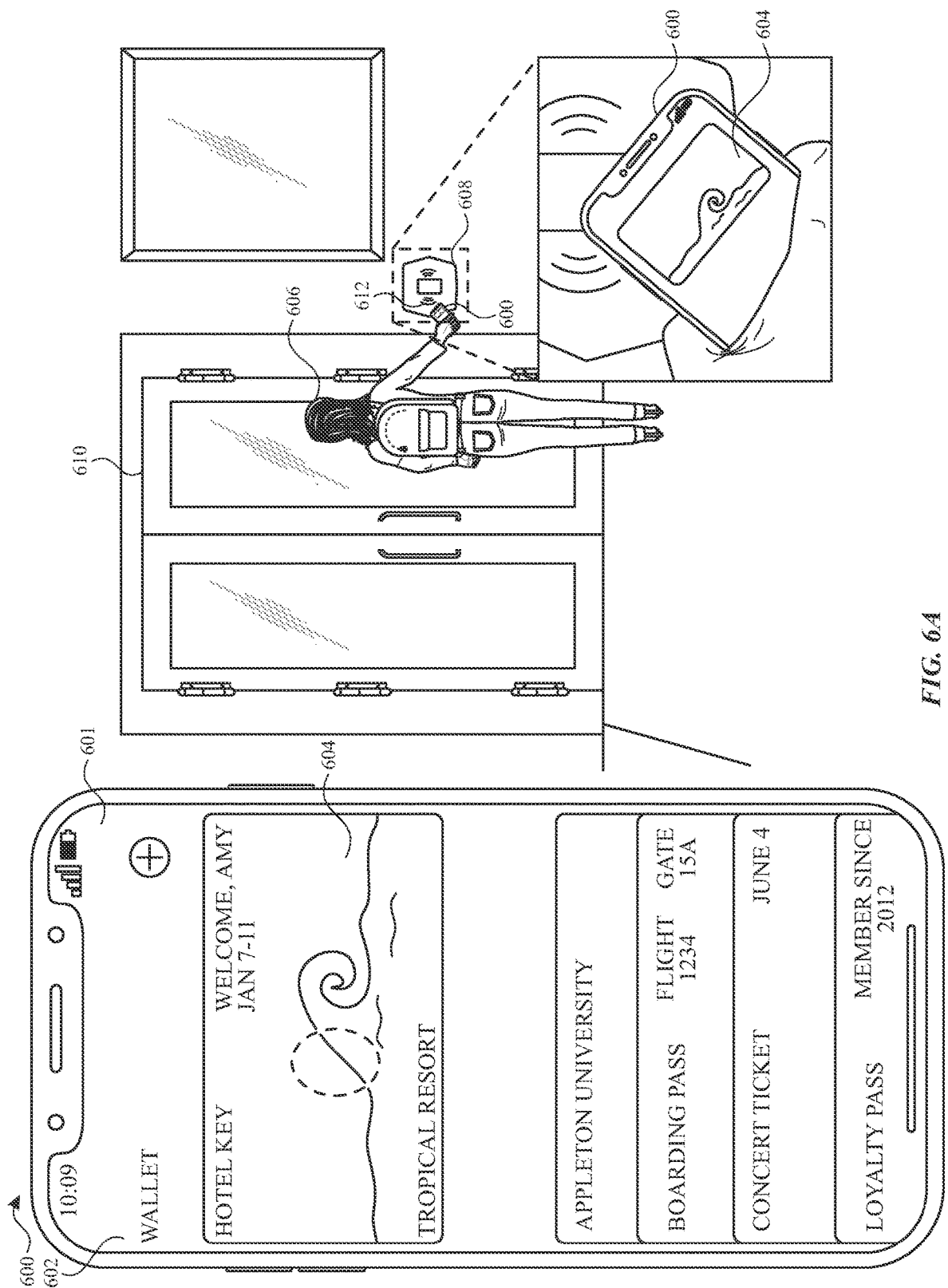
FIGS. 6A-6R, illustrates exemplary user interfaces for sharing an electronic key, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
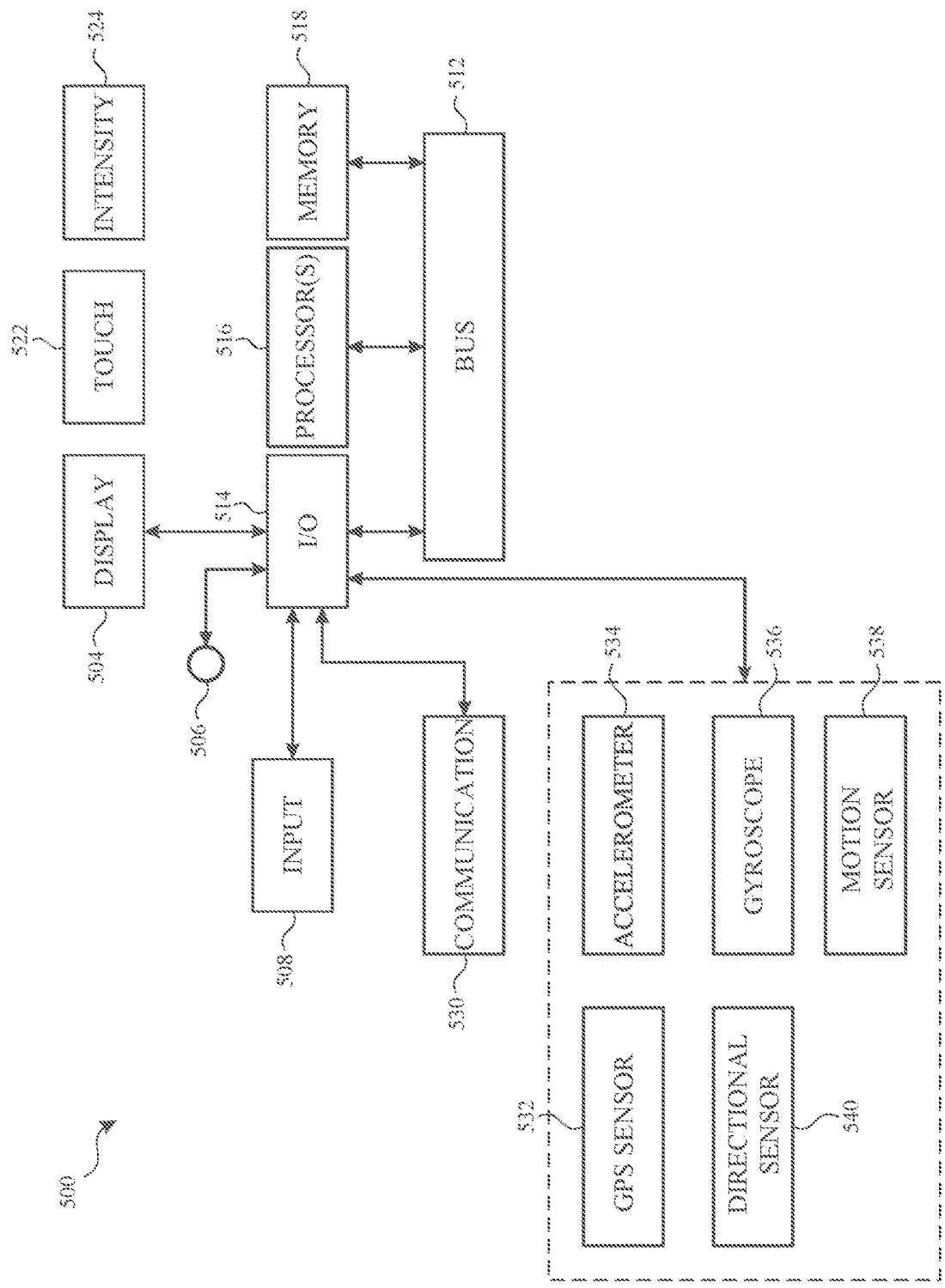
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIG. 7 and FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
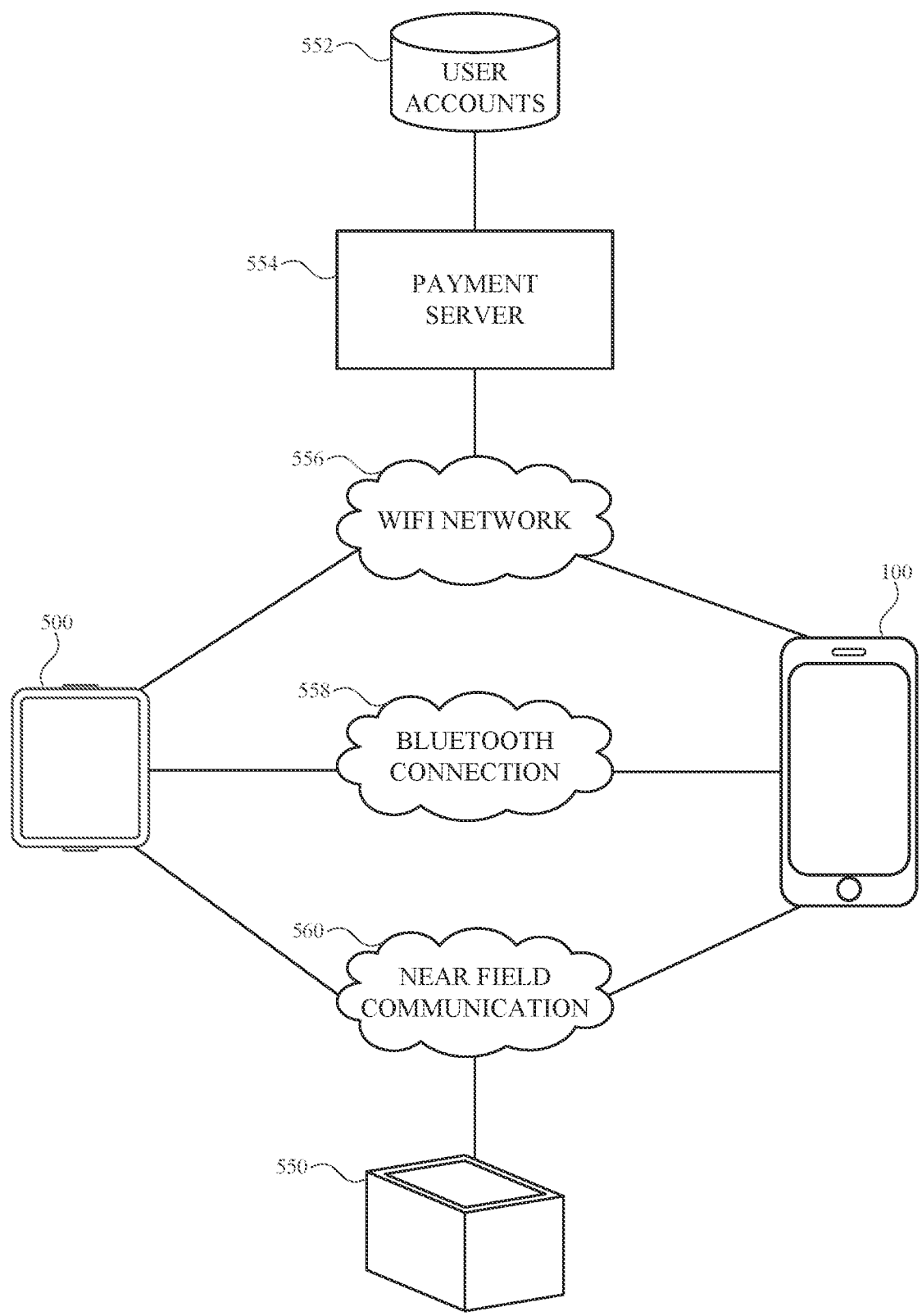
FIG. 5C illustrates exemplary devices connected via one or more communication channels, in accordance with some embodiments.

FIG. 5C illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit credential information (e.g., payment information and/or physical location unlock information to unlock a physical lock) (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts and/or to store electronic key information associated with each of one or more electronic key accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files). Electronic key information includes, for example, access rights (e.g., to unlock or otherwise access a physical location).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element. In some embodiments, an electronic key account is added to an electronic device (e.g., device 100, 300, and 500), such that electronic key account information is securely stored on the electronic device, such as on a secure element of the electronic device.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about transactions facilitated at the first electronic device. The information optionally includes one or more of: access information, location information, electronic key usage information, a payment amount, an account used, a time of purchase, and whether a default account was changed. The second device (e.g., 500) optionally uses such information to update a default account (e.g., based on a learning algorithm or explicit user input).

Electronic devices (e.g., 100, 300, 500) are configured to communicate with each other over any of a variety of networks. For example, the devices communicate using a Bluetooth connection 558 (e.g., which includes a traditional Bluetooth connection or a Bluetooth Low Energy connection) or using a WiFi network 556. Communications among user devices are, optionally, conditioned to reduce the possibility of inappropriately sharing information across devices. For example, communications relating to electronic key information optionally requires that the communicating devices be paired (e.g., be associated with each other via an explicit user interaction) or be associated with a same user account.

In some embodiments, an electronic device (e.g., 100, 300, 500) is used to communicate with a terminal 550 (e.g., a secure access terminal associated with a secure location and/or a point-of-sale (POS) payment terminal), which is optionally NFC-enabled. The communication optionally occurs using a variety of communication channels and/or technologies. In some embodiments, electronic device (e.g., 100, 300, 500) communicates with terminal 550 using an NFC channel 560. In some embodiments, terminal 550 communicates with an electronic device (e.g., 100, 300, 500) using a peer-to-peer NFC mode. Electronic device (e.g., 100, 300, 500) is optionally configured transmit a signal to terminal 550 that includes electronic key information for accessing a physical location and/or payment information for a payment account (e.g., a default account or an account selected for the particular transaction).

In some embodiments, proceeding with a transaction includes transmitting a signal that includes electronic key information and/or payment information for an account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to terminal 550. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., terminal 550) is established within a defined time period from detection of the input, the secure element releases electronic key information and/or payment information to be transmitted to the other device (e.g., terminal 550). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Terminal 550 optionally uses the payment information to generate a signal to transmit to a payment server 554 to determine whether the payment is authorized. Payment server 554 optionally includes any device or system configured to receive payment information associated with a payment account and to determine whether a proposed purchase is authorized. In some embodiments, payment server 554 includes a server of an issuing bank. Payment terminal 550 communicates with payment server 554 directly or indirectly via one or more other devices or systems (e.g., a server of an acquiring bank and/or a server of a card network).

Payment server 554 optionally uses at least some of the payment information to identify a user account from among a database of user accounts (e.g., 552). For example, each user account includes payment information. An account is, optionally, located by locating an account with particular payment information matching that from the POS communication. In some embodiments, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some embodiments, the payment server (e.g., 554) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 554 responds to a POS payment terminal (e.g., terminal 550) with an indication as to whether a proposed purchase is authorized or denied. In some embodiments, the POS payment terminal (e.g., terminal 550) transmits a signal to the electronic device (e.g., 100, 300, 500) to identify the result. For example, the POS payment terminal (e.g., terminal 550) sends a receipt to the electronic device (e.g., 100, 300, 500) when a purchase is authorized (e.g., via a transaction-coordination server that manages a transaction app on the user device). In some instances, the POS payment terminal (e.g., terminal 550) presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of the POS payment terminal (e.g., terminal 550). For example, upon detecting that a mechanical input has been received, a secure element in the electronic device (e.g., 100, 300, 500) releases information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some embodiments, a secure element is a hardware component (e.g., a secure microcontroller chip) configured to securely store data or an algorithm. In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for sharing an electronic key, in accordance with some embodiments. The user interfaces in these figures are used to illustrate the processes described below, including the processes in FIG. 7. In some embodiments, device 600 includes one or more features of devices 100, 300, and/or 500.

At FIG. 6A, an electronic wallet of device 600 stores an electronic hotel key (e.g., device 600 has been provisioned to include account information for the electronic hotel key). In some embodiments, device 600 has been provisioned to include account information for multiple accounts, including an electronic hotel key, a university electronic identification card, an electronic boarding pass, an electronic concert ticket, and a loyalty card. As illustrated in FIG. 6A, device 600 displays wallet user interface (UI) 602 that includes electronic hotel key representation 604 of the electronic hotel key. Wallet UI 602 also includes representations of the university identification card, the boarding pass, the concert ticket, and the loyalty card.

At FIG. 6A, (e.g., after user authentication at device 600) device 600 is held by first user 606 near a secure access terminal 608 associated with a secure location (e.g., a secure entrance to a secure location, such as a locked door to a secure room or building). In some embodiments, secure access terminal 608 is configured to control access to a secure location (e.g., a room, a building, a pool, and/or a gym) by locking/unlocking a secure door 610. In some embodiments, device 600 detects (e.g., via a wireless communication radio of device 600) the presence of a field 612 generated by secure access terminal 608. In response to (or subsequent to and/or after) detecting the presence of field 612 generated by secure access terminal 608, device 600 transmits (e.g., via a wireless communication radio of the device) a credential of a transfer account (e.g., a secure access account) associated with the electronic hotel key to secure access terminal 608. In some embodiments, transmitting the credential of the transfer account to secure access terminal 608 causes secure door 610 to unlock and/or to open, thus enabling the user to enter the secure location. In some embodiments, if the transfer account is not configured to provide access at the location, transmitting the credential of the transfer account to secure access terminal 608 does not cause secure door 610 to unlock or open (e.g., because valid credentials were not presented to secure access terminal 608). In some embodiments, secure access terminal 608 is in communication with a network associated with an entity issuing the electronic hotel key. In some embodiments, the network associated with the entity issuing the electronic hotel key sends and/or receives communications (e.g., from device 600 and/or device 800) about the state of the electronic hotel key (e.g., what access rights have been shared and/or whether the electronic hotel key has been provisioned to a wallet of a device). In some embodiments, a user can manage the electronic hotel key by logging into an application and/or website of the entity that issued the electronic hotel key (e.g., managing the electronic hotel key using all the techniques described herein, including managing what access rights are shared, managing whether an electronic key can be shared, managing whether an activation code is needed, and/or managing whether a different user has shared the key).

At FIG. 6A, while displaying wallet UI 602, device 600 detects tap input 650 directed at electronic hotel key representation 604. In response to detecting tap input 650, device 600 displays wallet UI 602, as depicted in FIG. 6B.

Figure 6C:
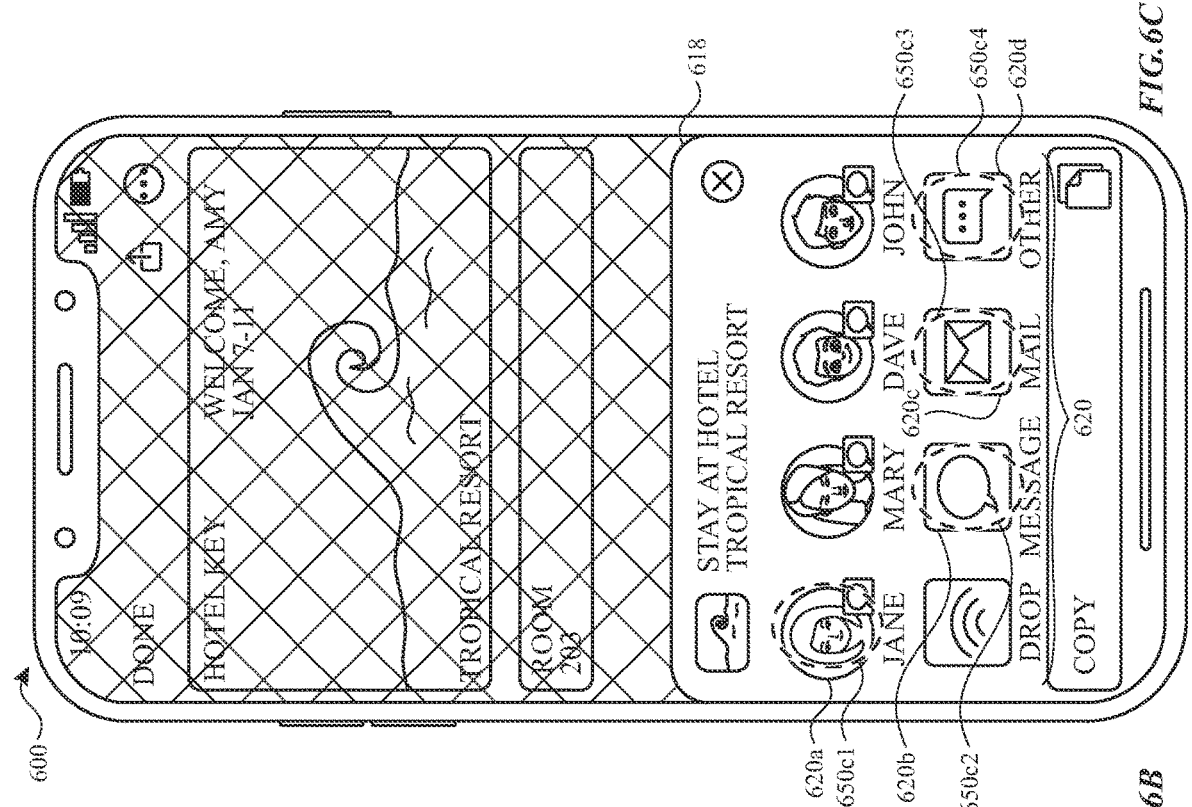
Figure 6B:
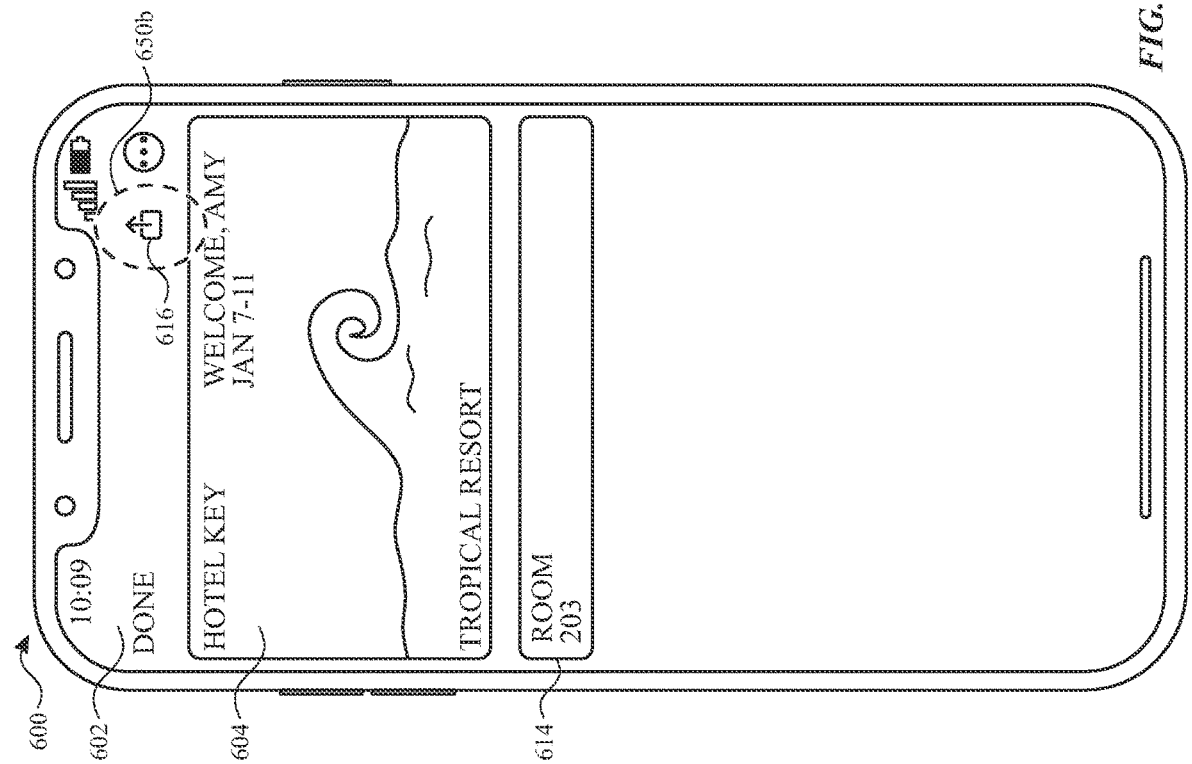

At FIG. 6B, wallet UI 602 includes key representation 604 and room representation 614 of a room for which the electronic hotel key grants access. Wallet user interface 602 also includes share icon 616. Device 600 displays share icon 616 if the electronic hotel key can be shared with another device associated with a use that is different from the user of device 600. In some embodiments, a hotel authorizing the electronic hotel key can configure the electronic hotel key to enable sharing or disable sharing of the electronic hotel key with another user. While displaying wallet UI 602, device 600 detects tap input 650b directed at share icon 616 to share the electronic hotel key. In response to detecting tap input 650b, device 600 displays communication options user interface 618, as depicted in FIG. 6C.

At FIG. 6C, communication options user interface 618 includes affordances 620 associated with different contacts and/or different communication applications. For example, activating affordance 620a initiates sharing the electronic hotel key with a user (e.g., Jane) using an instant messaging application. Activating affordance 620b initiates sharing the electronic hotel key using the instant messaging application without initially specifying a recipient. Activating affordance 620c initiates sharing the electronic hotel key using an email application. Activating affordance 620d initiates sharing the electronic hotel key using other communication applications, such as third party communication applications. At FIG. 6C, while displaying communication options user interface 618, device 600 detects selection of an affordance of affordances 620. In some embodiments, a first affordance of affordances 620 corresponds to a particular application and, optionally, corresponds to a particular individual. In response to receiving selection of an affordance of affordances 620 that corresponds to a first application and a first individual, device 600 proceeds with the process to share the electronic hotel key with the first individual using the first application. In response to receiving selection of an affordance of affordances 620 that corresponds to a second application and does not correspond to a particular individual, device 600 proceeds with the process to share the electronic hotel key using the second application without initially specifying a recipient for the shared electronic hotel key. In some embodiments, when device 600 detects selection of an affordance of affordance 620 and in accordance with a determination that the selected affordance corresponds to a user account of a user (e.g., Jane) of a particular service (e.g., a service for which the user of device 600 also has a user account), the computer system automatically disables the activation code feature for sharing the electronic hotel key. In some embodiments, when device 600 detects selection of an affordance of affordance 620 and in accordance with a determination that the selected affordance does not correspond to a user account of a user of the particular service (e.g., the service for which the user of device 600 also has a user account), the computer system automatically enables the activation code feature for sharing the electronic hotel key.

Figure 6E:
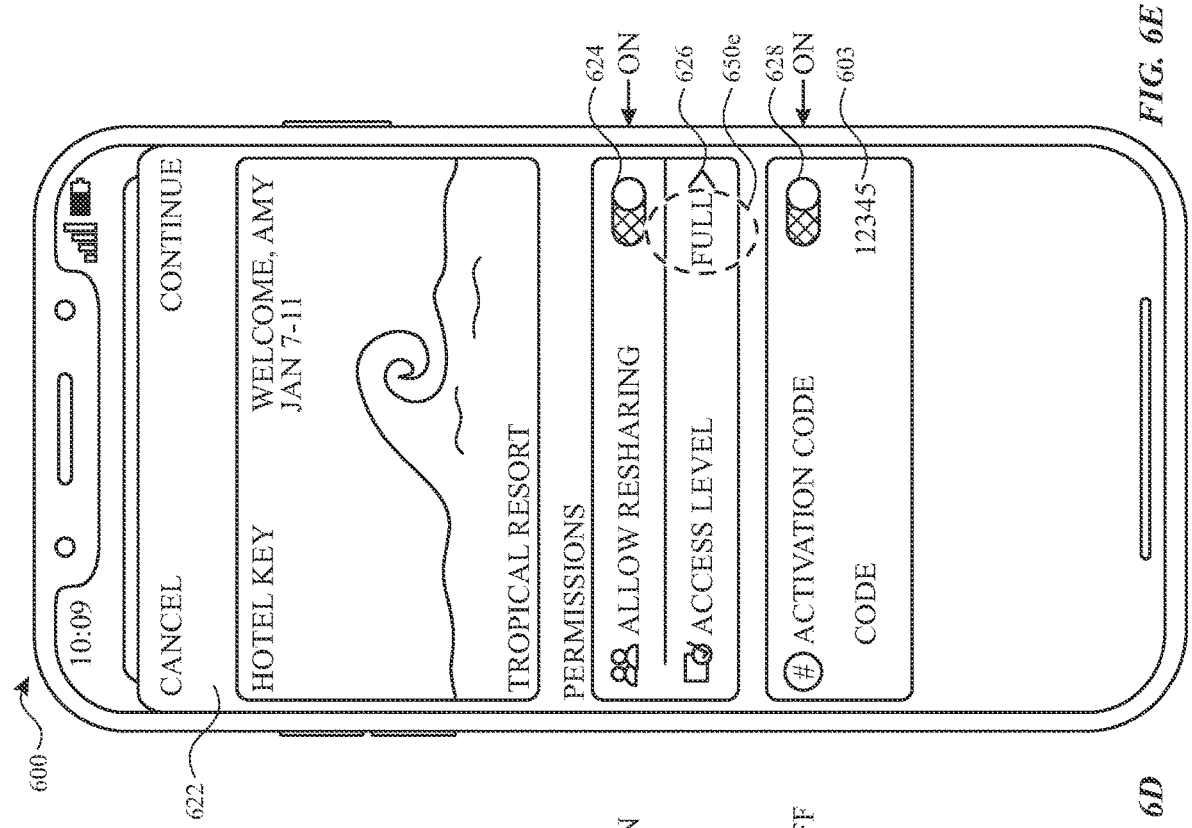
Figure 6D:
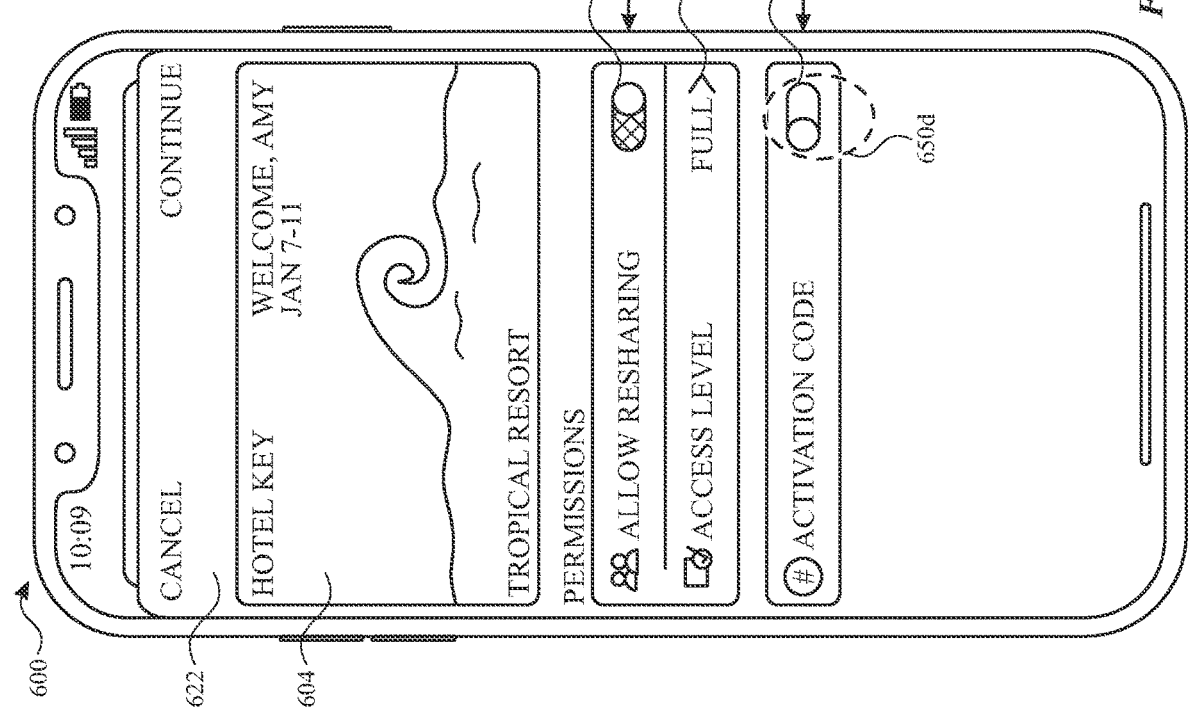
Figure 6K:
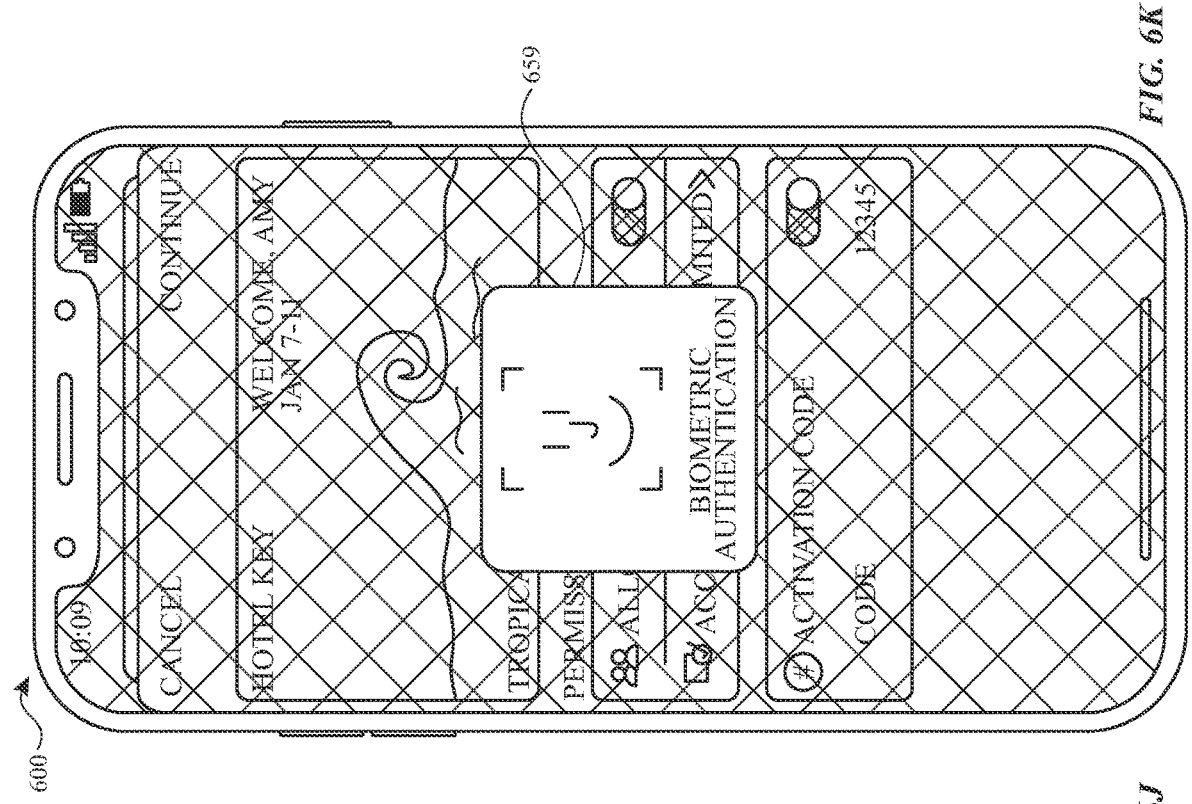

For example, at FIG. 6C, device 600 detects tap input 650c1 directed at affordance 620a and, in response to detecting tap input 650c1 and in accordance with a determination that affordance 620a corresponds to a user account (e.g., of Jane) for the particular service (e.g., the service for which the user of device 600 also has a user account), device 600 displays key sharing user interface 622 with activation code affordance 628 disabled, as illustrated in FIG. 6D. For another example, at FIG. 6C, device 600 detects tap input 650c3 directed at affordance 620c and, in response to determining that affordance 620c does not correspond to a user account for the particular service (e.g., the service for which the user of device 600 also has a user account), device 600 displays key sharing user interface 622 with activation code affordance 628 enabled, as illustrated in FIG. 6E.

Returning to FIG. 6C, device 600 detects tap input 650c1 directed at affordance 620a. In response to detecting tap input 650c1 and in accordance with a determination that affordance 620a corresponds to a user account (e.g., of Jane) for the particular service (e.g., the service for which the user of device 600 also has a user account), device 600 displays key sharing user interface 622 with activation code affordance 628 disabled, as illustrated in FIG. 6D.

At FIG. 6D, key sharing user interface 622 includes resharing affordance 624 that is enabled. Resharing affordance 624, which, when enabled, gives a recipient an ability to reshare the electronic hotel key with another user (e.g., device 800 of second user 806 of FIG. 8E). In some embodiments, when resharing affordance 624 is disabled, a recipient is not able to reshare the electronic hotel key with another user. In some embodiments, resharing affordance 624 is defaulted to enabled. In some embodiments, resharing affordance 624 is defaulted to disabled. In some embodiments, selection of resharing affordance 624 toggles resharing affordance 624 between enabled and disabled states.

At FIGS. 6D, key sharing user interface 622 includes activation code affordance 628. At FIG. 6D, activation code affordance 628 is disabled whereas activation code affordance 628 of FIG. 6E is enabled. When activation code affordance 628 is enabled, device 600 displays (e.g., concurrently displays) an indication 603 for an activation code (as depicted in FIG. 6E), while device 600 does not display indication 603 when activation code affordance 628 is disabled (as depicted in FIG. 6D). The activation code provides an additional layer of security in sharing the electronic hotel key. In some embodiments, a recipient cannot use the electronic hotel key until a user associated with a device of the recipient has entered the activation code. In some embodiments, a device cannot be provisioned with the electronic hotel key until the activation code has been entered at the device (e.g., at the recipient's device).

At FIG. 6D, device 600 enables or disables (e.g., automatically) activation code affordance 628 based on how the electronic hotel key will be shared. In some embodiments, device 600 determines which application will be used to share the electronic hotel key to enabled or disable the activation code affordance 628 (e.g., based on a selection of an affordance of affordances 620 at FIG. 6C). In such embodiments, device 600 enables activation code affordance 628 in response to detecting that the electronic hotel key will be shared using an instant messaging application and disables activation code affordances 628 in response to detecting that the electronic hotel key will be shared using an email application. In some embodiments, device 600 determines whether the user with whom the electronic hotel key is being shared is known. In such embodiments, device 600 enables activation code affordance 628 in response to detecting that the user is a stored contact on device 600 and/or both first user 606 and the user with whom the key is being shared have an account with same entity (e.g., the same online service). Device 600 enables or disables activation code affordance 628 in response to detecting an input directed at activation code affordance 628 (e.g., if a user wants to manually enable or disable the activation code). As illustrated, at FIG. 6D, while displaying key sharing user interface 622, device 600 detects tap input 650*d* directed at activation code affordance 628. In response to detecting tap input 650*d*, device 600 enables activation code affordance 628, as depicted in key sharing user interface 622 of FIG. 6E.

At FIG. 6E, key sharing user interface 622 includes access level affordance 626. Activating access level affordance 626 causes device 600 to display affordances that allow a user to select which rights are shared with a recipient. In some embodiments, device 600 cannot add or share rights beyond those which have been granted to device 600 (e.g., an entity (e.g., the hotel) providing the access). At FIG. 6E, while displaying key sharing user interface 622, device 600 detects tap input 650*e* directed at access level affordance 626. In response to detecting tap input 650*e*, device 600 displays access level editing user interface 632, as depicted in FIG. 6F.

At FIG. 6F, access level editing user interface 632 allows a user to configure different access rights that are shared. Access level editing user interface 632 includes affordances 634 to modify location access rights for different secured areas, affordances 636 to share access rights associated with using a vendor's services, and time limit affordance 638 which, when selected, displays a user interface to configure a time limit for the access rights that are shared. Device 600 optionally detects an input on affordances 634 and, in response, disable (or enable) a respective access right. Device 600 can therefore modify which access rights are provided to a recipient of the electronic hotel key. As illustrated in FIG. 6F, the secured areas include specific rooms (e.g., room 203 and 205) and a secured area of a property (e.g., gym and/or pool). In some embodiments, a user can share a right to one or more vendor services, such as updating one or more aspects of the reservation (e.g., extending the reservation, shortening the reservation, and/or switching rooms) and utilizing a service provided by the vendor (e.g., room service and/or restaurant dining credits). At FIG. 6F, while displaying access level editing user interface 632, device 600 detects tap input 650/1 directed at room affordance 634*a*. In response to detecting tap input 650/1, device 600 disables access right to room 203, which results in device 600 not sharing access rights to room 203.

At FIG. 6F, while displaying access level editing user interface 632, device 600 detects tap input 650/2 directed at time limit affordance 638. In response to detecting tap input 650/2, device 600 displays time limit user interface 640, as depicted in FIG. 6G.

At FIG. 6G, time limit user interface 640 allows a user to set a time frame for when the access rights are enabled (e.g., valid and/or authorized), as well as a starting date and/or an ending date in which the access rights are enabled. In some embodiments, device 600 cannot share rights (or extend the rights) beyond what rights were originally received from the hotel. Activating days affordance 642 causes device 600 to display affordances to choose specific days that the access rights are enabled. Activating time affordance 644 causes device 600 to display affordances to choose specific times during a day that the access rights are enabled. In some embodiments, activating affordances 646 causes device 600 to display affordances to designate a starting date and ending date in which the access rights are enabled and disabled, respectively.

At FIG. 6G, while displaying time limit user interface 640, device 600 detects tap input 650*g* directed at days affordance 642. In response to detecting tap input 650*g*, device 600 displays time limit user interface 640, as depicted in FIG. 6H.

At FIG. 6H, time limit user interface 640 includes affordances 652 for configuring a day of the week in which the access rights (e.g., the access rights displayed in access level editing user interface 632) are enabled. As illustrated, Monday affordance 652*a* and Tuesday affordance 6502*b* are enabled. As such, for example, access rights associated with the shared electronic hotel key will be valid for Monday and Tuesday only (e.g., a recipient that receives the electronic hotel key from device 600 will only have access rights enabled on Monday and Tuesday). Because the affordances for other days are not enabled, access rights associated with the shared electronic hotel key are not valid for those days. While displaying time limit user interface 640, device 600 detects tap input 650*h* directed at time affordance 644. In response to detecting tap input 650*h*, device 600 displays time limit user interface 640, as depicted in FIG. 6I.

At FIG. 6I, time limit user interface 640 includes affordances for designating a time frame during the day in which the access rights are enabled for the shared electronic hotel key. As illustrated, time limit user interface 640 includes start time affordance 654*a* and end time affordance 654*b*. In some embodiments, in response to detecting a selection of start time affordance 654*a* or end time affordance 654*b*, device 600 displays one or more affordances for configuring a start time or one or more affordances for configuring an end time, respectively. As illustrated, start time affordance 654*a* has an indication of 9:00 AM and end time affordance 654*b* has an indication of 5:00 PM. As such, as illustrated, the access rights for the shared electronic hotel key will be enabled from 9:00 AM to 5:00 PM on Monday and Tuesday. Because the access rights are enabled from 9:00 AM to 5:00 PM, the access rights associated with the shared electronic hotel key are not valid during any other time on Monday or Tuesday.

At FIG. 6I, time limit user interface 640 includes advanced sharing affordance 648. Advanced sharing affordance 648 allows a user to configure a time frame for a specific access right to be enabled (e.g., valid and/or authorized). In some embodiments, for example, in response to detecting an input directed at advanced sharing affordance 648, device 600 displays one or more affordances for configuring time limits for a specific access right. Accordingly, for example, device 600 can selectively disable an access right to room 205 from 8:00 AM to Noon, while the access right to a pool is not disabled during the same time frame.

Figure 6J:
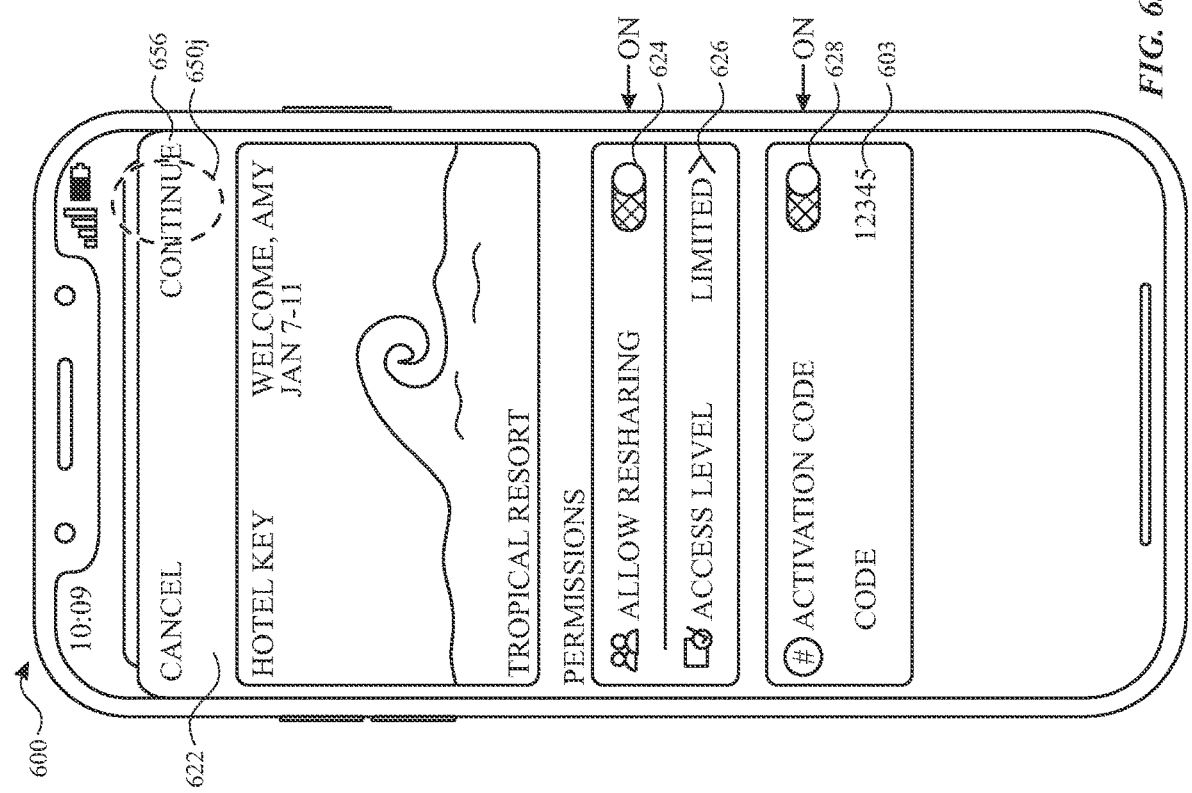
Figure 6O:
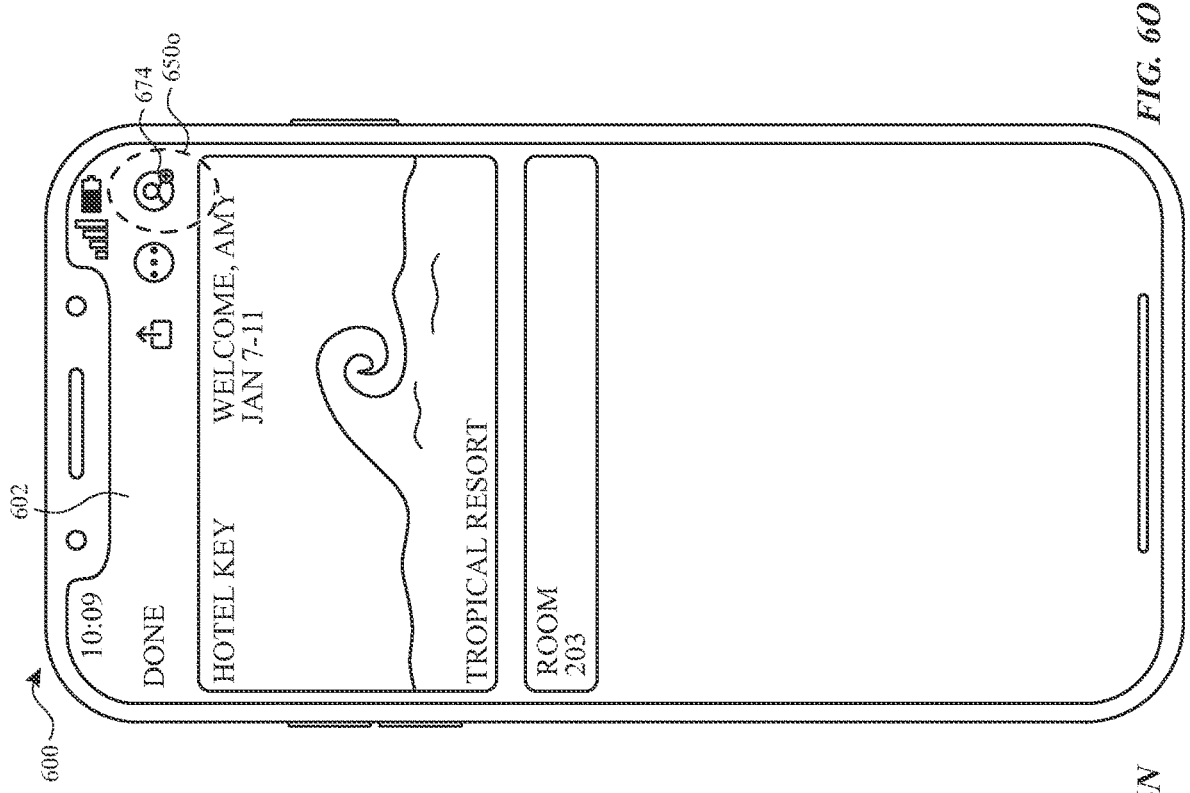

At FIG. 6J, after disabling room affordance 634a and configuring time limits for the other access rights, device 600 displays key sharing user interface 622 (e.g., based on selection of left chevron of time limit user interface 640). As illustrated in FIG. 6J, device 600 updates access level affordance 626 from indicating full access rights are being shared (as depicted in FIG. 6E) to access level affordance 626 indicating that limited access rights are being shared (as depicted in FIG. 6J). Similar to FIG. 6J, device 600 displays resharing affordance 624 and activation code affordance 628 as both being enabled. Device 600 also displays indication 603 of the activation code. While displaying key sharing user interface 622, device 600 detects tap input 650j directed at continue affordance 656. In response to detecting 650j, device 600 initiates a process to authenticate first user 606 (e.g., using biometric authentication (e.g., facial authentication, fingerprint authentication, and/or iris authentication) and/or using a password or passcode).

At FIG. 6K, device 600 authenticates first user 606. As illustrated, face authentication notification 659 indicates that device 600 is authenticating first user 606 using facial authentication. In response to authenticating first user 606, device 600 displays instant messaging user interface 660a, as depicted in FIG. 6L.

At FIG. 6L, device 600 displays instant messaging user interface 660a. Device 600 displays key representation 604 of the electronic hotel key in a draft message. Messaging user interface 660 also includes representation 664 of second user 806, so that first user 606 will know to whom the key will be sent. As illustrated, the messaging user interface 660 includes text message 668 of a conversation between first user 606 and second user 806 prior to sending the electronic hotel key. While displaying instant messaging user interface 660a, device 600 detects tap input 650l directed at send affordance 662. In response to detecting tap input 650l, device 600 displays activation code interface 670, as depicted in FIG. 6M. In some embodiments, in response to detecting tap input 650l, device 600 ceases to display instant messaging user interface 660a. In some embodiments, in response to detecting tap input 650l, device 600 does not cease to display instant messaging user interface 660a. In some embodiments, device 600 displays activation code interface 670 overlaid on wallet UI 602. In some embodiments, device 600 displays activation code interface 670 overlaid on messaging user interface 660. In some embodiments, in response to detecting tap input 650l, device 600 transmits message 804 including information about the electronic hotel key (e.g., account information, access rights, and/or a link to the access account information for the electronic hotel key) to device 800, as depicted in FIG. 8A. In some embodiments, device 600 does not transmit the activation code in response to detecting tap input 650l (e.g., activation code is not included in message 804).

At FIG. 6M, activation code interface 670 includes indication 603 of the activation code and one or more affordances to initiate respective processes to communicate the activation code to the recipient. As illustrated, activation code interface 670 includes call affordance 672a, share affordance 672b, and copy affordance 672c. In some embodiments, in response to detecting an input directed to share affordance 672b, device 600 displays affordances for different contacts and/or communication applications to share the activation code. In some embodiments, options are displayed for different communication applications for the same recipient (e.g., Jane) with which the electronic hotel key was shared. For example, in some embodiments, device 600 displays different communication applications and/or contact information similar to communication applications and/or contact information in communication options user interface 618, as depicted in FIG. 6C. In some embodiments, in response to detecting an input directed to copy affordance 672c, device 600 copies the activation code, which allows first user 606 to paste the activation code into a notebook application and/or a communication application.

At FIG. 6M, in some embodiments, the one or more affordances to initiate a process to communicate the activation code with device 800 includes an affordance for a communication application (and/or channel) that is different from the communication application used to transmit the electronic hotel key. As illustrated, communicate call affordance 672a, when selected, initiates a process to call device 800, as opposed to sending a text using the messaging user interface 660. Providing an affordance that initiates a process to communicate an activation code over a different communications channel enhances the security of sharing the electronic hotel key with another user since it prevents an unknown person from intercepting message 804 and using the electronic hotel key.

At FIG. 6M, while displaying activation code interface 670, device 600 detects tap input 650m directed at call affordance 672a. In response to detecting tap input 650m, device 600 displays call affordance 673, as depicted in FIG. 6N.

Figure 6N:
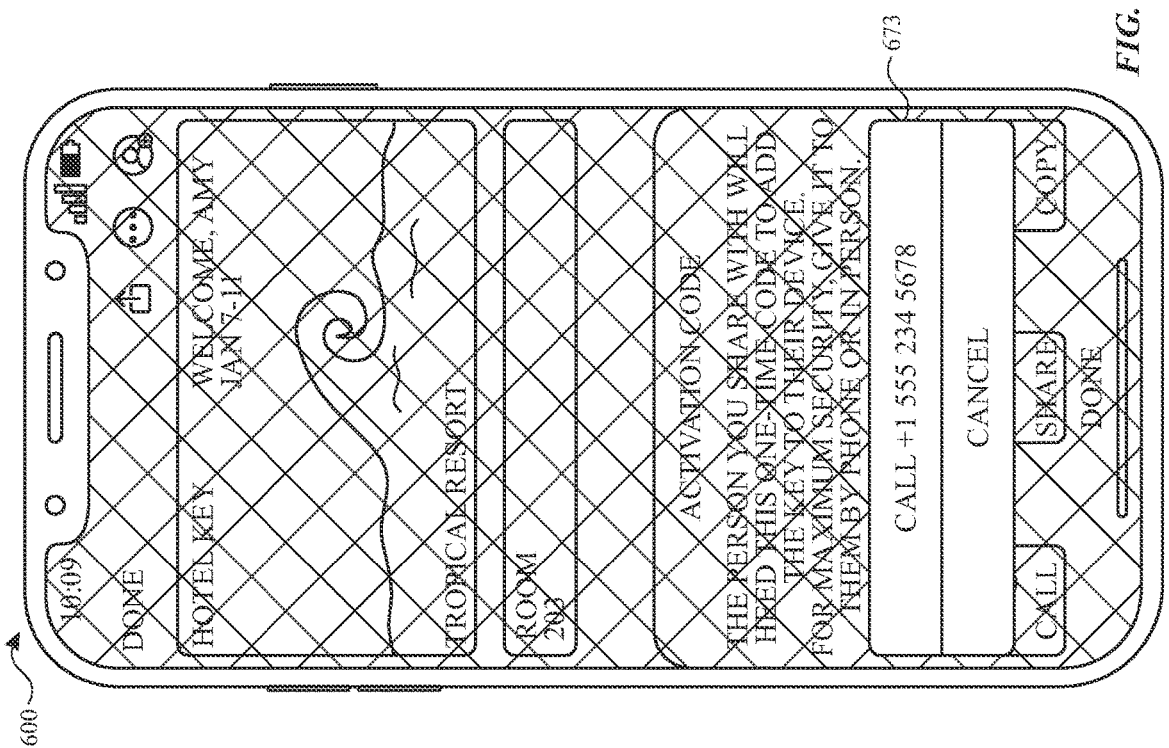
Figure 6Q:
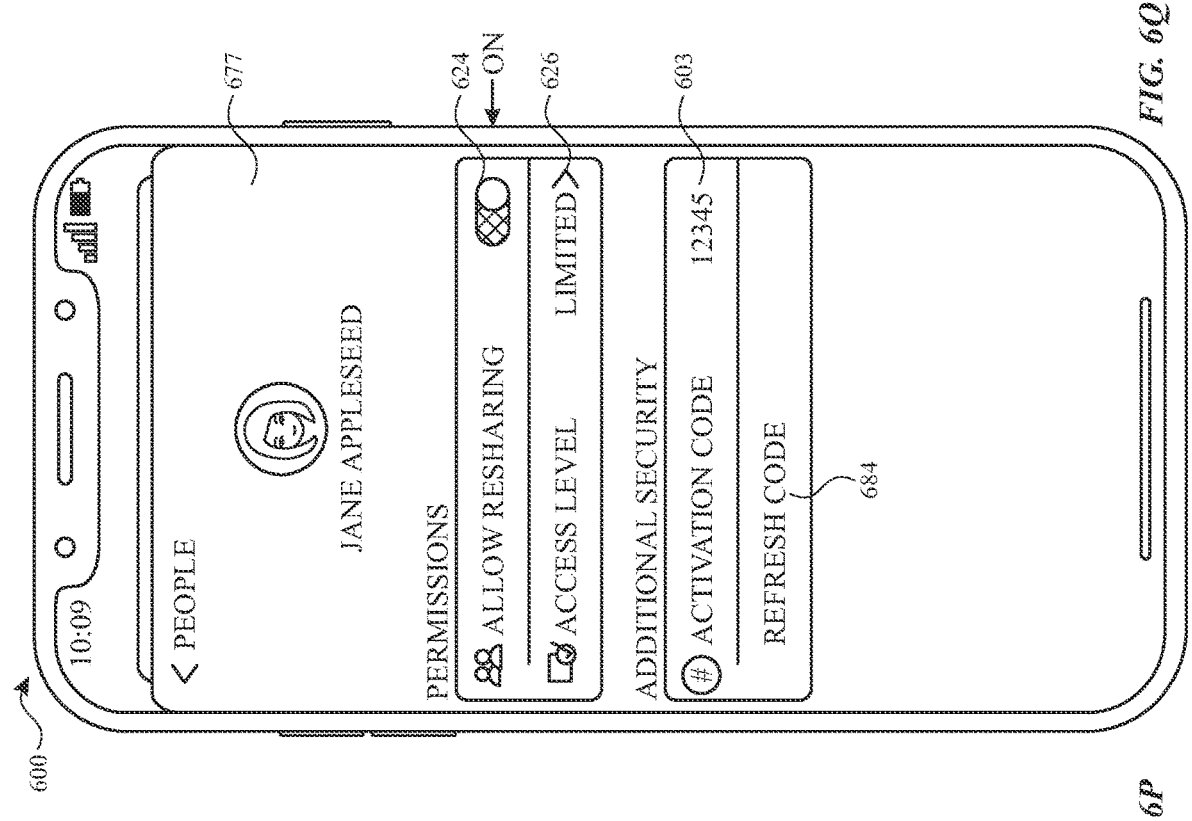

At FIG. 6N, device 600 displays call affordance 673, which when selected, initiates an audio call between device 600 and the recipient of the shared electronic hotel key (e.g., at device 800). In some embodiments, in response to detecting an input directed at call affordance 673, device 600 initiates a call to the recipient of the shared electronic hotel key (e.g., at device 800). Accordingly, in some embodiments, first user 606 can communicate the access code to second user 806 over the call, which ensures the identity of second user 806 and/or prevents a different person who might have intercepted the message 804 from receiving the access code.

At FIG. 6O, device 600 displays wallet user interface 602 for the electronic key. As illustrated at FIG. 6O, wallet user interface 602 includes manage affordance 674, which allows a user to manage different aspects (e.g., access rights and/or other users that have access rights to use the shared electronic hotel key) associated with how the shared electronic hotel key is shared. In some embodiments, device 600 displays manage affordance 674 based on detecting that the electronic hotel key has been shared with a particular user by the original key holder (e.g., first user 606) and/or when another user re-shares the key, as described herein. While displaying wallet user interface 602, device 600 detects tap input 650o directed at manage affordance 674. In response to detecting tap input 650o, device 600 displays management user interface 676, as depicted in FIG. 6P.

Figure 6P:
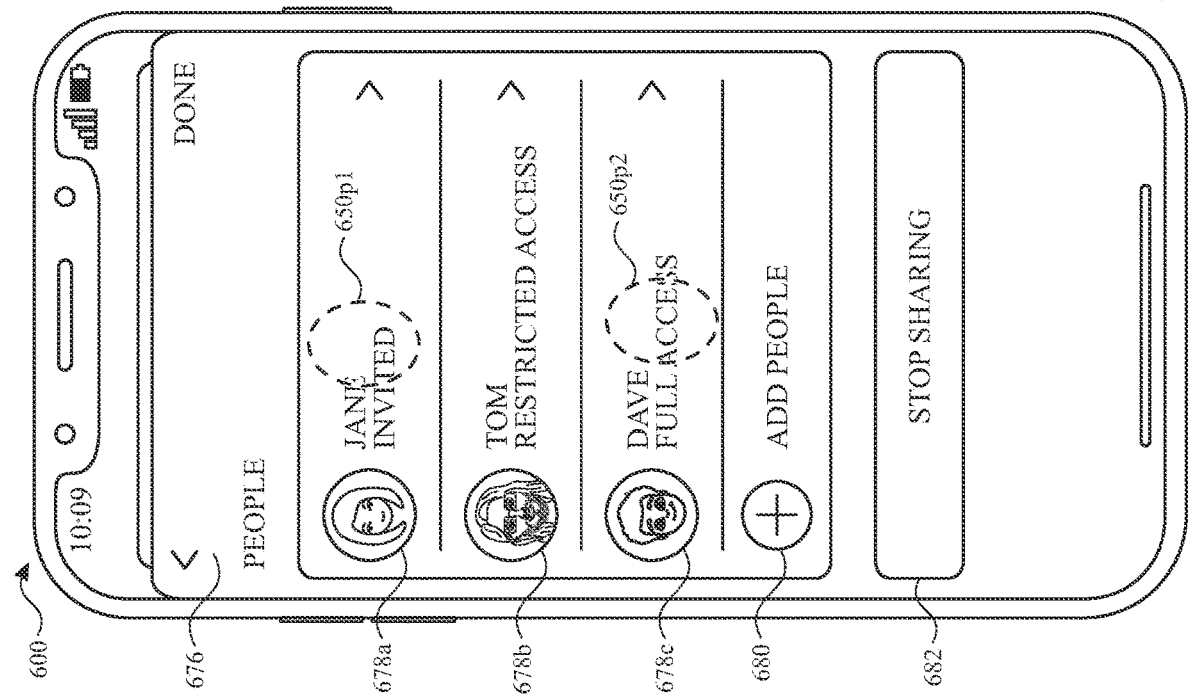
Figure 6R:
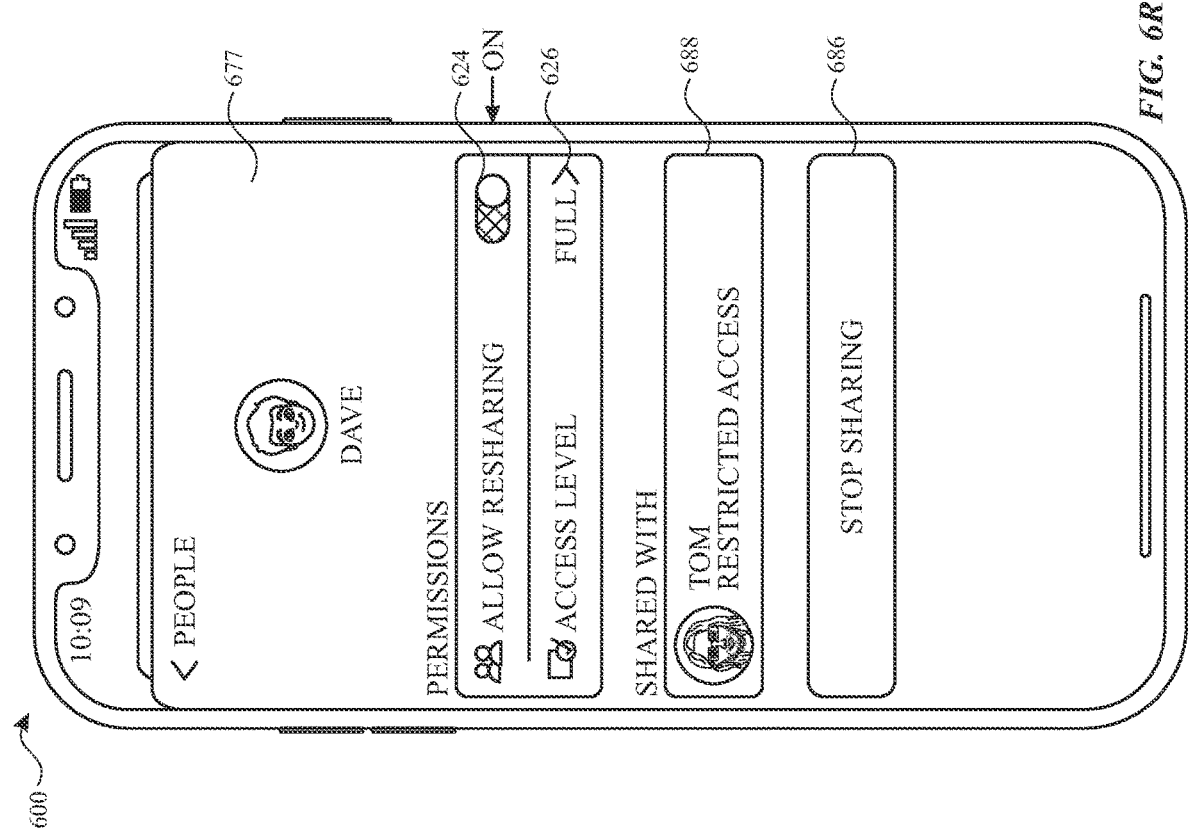

At FIG. 6P, management user interface 676 includes affordances 678a-678c associated with users with whom the electronic hotel key has been shared. In response to detecting an input on a respective affordance of affordances 687a-678c, device 600 displays user management interface 677 for the respective user. Management user interface 676 also includes add people affordance 680. In some embodiments, in response to detecting a selection of add people affordance 680, device 600 initiates a process to share the electronic hotel key with another user, including optionally displaying user interfaces and/or affordances described in FIGS. 6C-6O.

As illustrated in FIG. 6P, while displaying management user interface 676, device 600 detects tap input 650p1 directed at affordance 678a associated with second user 806. In response to detecting tap input 650p1, device 600 displays individual user management interface 677 associated with second user 806 (Jane), as depicted in FIG. 6Q. While displaying management user interface 676, device 600 detects tap input 650p2 directed at affordance 678c associated with Dave. In response to detecting tap input 650p2, device 600 displays individual user management interface 677 associated with Dave, as depicted in FIG. 6R.

At FIG. 6Q, individual user management interface 677 allows a user to modify the rights that have been shared with a specific user. Individual user management interface 677 allows a user to manage the access rights (including time limits) provided via the shared electronic hotel key discussed herein. Individual user management interface 677 in FIG. 6Q allows first user 606 to modify the rights that have been shared with second user 806 associated with device 800. Individual user management interface 677 includes resharing affordance 624 and access level affordance 626 that, when activated, cause device 600 to respond in a similar manner as discussed in reference to FIGS. 6D-6I. For example, in some embodiments, in response to detecting an input directed to resharing affordance 624, device 600 disables resharing affordance 624 so as to prevent user 806 from sharing the key (even though user 606 initially shared that right with user 806). Individual user management interface 677 in FIG. 6Q also includes indication 603 of the access code and refresh affordance 630 that, when activated, causes device 600 to replace/update indication 603 to a new access code (e.g., that is different from the access code). In some embodiments, individual user management interface 677 in FIG. 6Q includes indication 603 of the access code and refresh affordance 630 because second user 806 has not yet added the electronic hotel key to a digital wallet. Accordingly, first user 606 can view the access code and/or generate a new access code if second user 806 has misplaced or forgotten the access code. In some embodiments, device 600 modifies the access rights shared with second user 806 after the electronic hotel key has been added to device 800 (the device associated with Jane). In some embodiments, device 600 ceases to display the access code and refresh affordance 630 based on receiving an indication that a device (e.g., device 800) has added the shared electronic hotel key to a digital wallet.

At FIG. 6R, individual user management interface 677 allows first user 606 to modify the access rights that have been shared with a device associated with Dave. Individual user management interface 677 in FIG. 6R is the same as individual user management interface 677 in FIG. 6Q. However, as illustrated, individual user management interface 677 in FIG. 6R does not include indication 603 of the access code and refresh affordance 630 because a device associated with Dave has already added the shared electronic hotel key to a digital wallet. Individual user management interface 677 in FIG. 6R also includes indication 688 that Dave has shared the electronic hotel key with Tom. Referring briefly to FIG. 6P, in some embodiments, device 600 modifies the access rights that Dave shared with Tom in response to detecting an input on affordance 678c. At FIG. 6R, in some embodiments, device 600 terminates any rights Dave shared with Tom in response to detecting an input on stop sharing affordance 686. In some embodiments, in response to detecting the input on the stop sharing affordance 686, device 600 causes Tom's device to disable (and/or cease display of) the shared electronic hotel key and/or any access rights associated with the shared electronic hotel key.

FIG. 7 is a flow diagram illustrating a method for sharing an electronic key using a computer system in accordance with some embodiments. Method 700 is performed at a computer system (e.g., 100, 300, 500, 600, and/or 800) (e.g., a smartwatch, a smartphone, a tablet computer, a head mounted device (e.g., a head mounted augmented reality and/or extended reality device), and/or a laptop computer) that is in communication one or more input devices (e.g., a touch-sensitive surface, a keyboard, a controller, a rotatable input device, microphone, and/or a mouse). In some embodiments, the computer system is in communication with a display generation component (e.g., 601 and/or 801) (e.g., a display controller, a head mounted display system, a touch-sensitive display system, and/or a monitor). Some operations in method 700 are, optionally, combined, the orders of some operations are, optionally, changed, and some operations are, optionally, omitted.

As described below, method 700 provides an intuitive way for sharing an electronic key. The method reduces the cognitive burden on a user for sharing an electronic key, thereby creating a more efficient human-machine interface. For battery-operated computing devices, enabling a user to share an electronic key faster and more efficiently conserves power and increases the time between battery charges. The method also improves the security of sharing a electronic key.

While the first computer system is associated with (e.g., corresponds to, is being used by, and/or is logged into by) a first user (e.g., 606 and/or 806) (e.g., the first user is logged into the computer system using a first user account), the computer system detects (702), via the one or more input devices, a set of one or more inputs (e.g., 650b, 650c1, 650c2, 650c3, 650c4, 650j, 659, 650I, 850f, 850g, 850j, and/or 830) (e.g., including at least one input on a selectable UI object to send the electronic key or not including an input on a selectable UI object) corresponding to a request to share an electronic key (e.g., the electronic hotel key of FIGS. 6A-6R and/or the electronic hotel key of FIGS. 8A-8L) (e.g., credentials for an electronic card key and/or credentials for an access key account) of an electronic wallet (e.g., the electronic wallet includes credentials for one or multiple accounts (e.g., transit account, payment account, loyalty account, electronic key, and/or airline ticket), an electronic key that is accessible using the wallet, and/or an electronic key that is stored and/or saved in the electronic wallet) with a second user (e.g., 606 and/or 806) (e.g., corresponding to a second user account) that is different from the first user, wherein the electronic key provides one or more access rights (e.g., access rights associated with affordances (e.g., 634 and/or 636) in access level editing user interface 632 and/or time limits associated with affordances (e.g., 642, 644, 646, and/or 648) of time limit user interface 640) to one or more physical locations (e.g., 610, and/or physical location associated with affordances 634 in access level editing user interface 632) (e.g., the electronic key provides access to a room or building; and/or the electronic key unlocks a physical lock and/or door). In some embodiments, a physical location is a secured area (e.g., that is in a building (e.g., a room, an elevator, and/or a washing machine) or an outdoor area (e.g., a gated area, an outdoor pool, and/or a driveway), and/or a vehicle (e.g., a car or truck)). In some embodiments, the one or more access rights includes a temporal access right (e.g., the access rights are valid for a respective time frame). In some embodiments, the wallet includes a visual representation of the electronic key. In some embodiments, the wallet includes credentials for one or more accounts (e.g., a loyalty account, a payment account, a transit account, an electronic credit card, and/or an electronic ticket) different from the electronic key. In some embodiments, the wallet includes one or more visual representations of the one or more accounts (e.g., a first representation for a first account, a second representation for a second account, and/or a third representation for the electronic key).

In response to detecting the set of one or more inputs corresponding to the request to share the electronic key, the computer system initiates (704) (e.g., starts, causes, and/or executes a command to transmit) a process to share the electronic key (e.g., to transmit information to enable the recipient to access an electronic key that provides access to at least some of the one or more access rights to the physical locations while the first user maintains access to the electronic key) with the second user of a second computer system (e.g., 600 and/or 800) that is different from the first user of the first computer system (e.g., a remote computer system, an external computer system, a computer system associated with a user different from a user associated with the first computer system, a smartphone, a tablet computer, a laptop computer, desktop computer, and/or a head mounted device). In some embodiments, the process to share the electronic key with the second user of the second computer system includes: in accordance with a determination that an activation code (e.g., 603) (e.g., a security code and/or a PIN) for the shared electronic key is enabled (e.g., activation code affordance 628 is enabled) (e.g., activated), displaying (706), via the display generation component, a first selectable object (e.g., 672a-672c, and/or 673) (e.g., button and/or other user-selectable interface object) to initiate a process of communicating the activation code (e.g., initiate a communications channel to allow the user to communicate (e.g., either orally or through writing) the activation code, and/or start an audio call, start a video call, begin a draft of an instant message, begin a draft of an email); and in accordance with a determination that the activation code for the shared electronic key is disabled (e.g., activation code affordance 628 is disabled), forging (708) display of the first selectable object to initiate the process of communicating the activation code.

In some embodiments, the electronic key is shared without transmitting the activation code. In some embodiments, the activation code is communicated independent of sharing the electronic key. In some embodiments, the first computer system displays a respective user interface while the set of one or more inputs corresponding to the request to share the electronic key (e.g., the set of inputs includes at least one input on an affordance to send the electronic key) are detected. In some embodiments, in accordance with the determination that the activation code for the shared electronic key is enabled, at least a portion (e.g., an entire portion and/or sub-portion (e.g., a first portion and not a second portion)) of the respective user interface ceases to be displayed (e.g., at least a portion of a messaging user interface ceases to be displayed). In some embodiments, in accordance with the determination that the activation code for the shared electronic key is disabled, the first computer system displays a user interface of the electronic wallet (e.g., after a user requests that the computer system send the key in a communication application, the first computer system automatically displays the user interface of the wallet). Displaying a selectable object to communicate an activation code if the activation code for the shared electronic key is enabled improves the computer system because it displays the selectable object when a set of conditions are met, which performs an operation when a set of conditions has been met without requiring further user input. Additionally, displaying the selectable object to communicate the activation code improves the computer system because it provides enhanced security while sharing an electronic key.

In some embodiments, the computer system detects, via the one or more input devices, a second set of one or more inputs including an input (e.g., 650m and/or input on 673) directed the first selectable object. In some embodiments, in response to detecting the second set of one or more inputs, the computer system communicates (e.g., transmits and/or sends) the activation code to the second user. In some embodiments, selection of the first selectable object causes display of a draft text message to the second user that includes the activation code. In some embodiments, selection of the first selectable object causes display of a draft email to the second user that includes the activation code. In some embodiments, selection of the first selectable object causes an audio call to be made to the second user for communicating the activation code. In some embodiments, the first computer system detects selection of the first selectable object and, in response, initiates the process for communicating the activation code to the second user. In some embodiments, the first selectable object is displayed in response to transmitting the shared electronic key to the second user. In some embodiments, detecting the second set of one or more inputs includes detecting an input on a send affordance of a message (e.g., text message and/or email message). In some embodiments, in response to detecting the second set of one or more inputs, the first computer system initiates a voice communication channel (e.g., over a telecommunications network and/or wireless network) to communicate the activation code. In some embodiments, the first selectable object corresponds to the second user (e.g., starts a communication with the second user). In some embodiments, in accordance with the determination that the activation code (e.g., a security code and/or a PIN) for the shared electronic key is enabled, the first computer system displays, a plurality of selectable objects for communicating with the second user (e.g., each for an option to use a different communication technique). Communicating the activation code in response to user input (e.g., and not when the electronic key is shared) enhances the security during a process of sharing an electronic key by enabling the first user to communicate the activation code separately from the shard electronic key to the second.

In some embodiments, transmitting the activation code does not activate the shared electronic key. In some embodiments, after the shared electronic key has been provisioned onto an electronic wallet of the second computer system, the shared electronic key provides, at the second computer system, the one or more access rights to the one or more physical locations (e.g., to the second user). In some embodiments, the first computer system continues to retain the one or more access rights to one or more physical locations provided by the electronic key at the first computer system.

In some embodiments, the computer system detects, via the or more input devices, selection of the first selectable object. In some embodiments, in response to detecting selection of the first selectable object, the computer system initiates the process of communicating the activation code, including displaying a conversation (e.g., displaying indication 603 of the access code in instant messaging interface 660 and/or instant messaging interface 802) (e.g., a chat conversation, instant messaging conversation, and/or an email thread) between the first user and the second user. In some embodiments, the conversation is displayed as part of a messaging application. In some embodiments, while displaying the conversation between the first user and the second user, the computer system detects, via the one or more input devices, selection of an option (e.g., 662 672a-672c, and/or 830) (e.g., a send affordance and/or a voice instruction) to transmit the activation code (e.g., that is populated into a draft message) to the second user. In some embodiments, in response to detecting selection of the option to transmit the activation code to the second user, the computer system transmits, as part of the conversation between the first user and the second user, the activation code to the second user. In some embodiments, the computer system automatically populates the activation code into a draft message that can be sent via selection of the option to transmit the activation code. In some embodiments, the computer system enables user input to add additional information (and/or modify existing information) in the draft message before the message is sent. In some embodiments, the displayed conversation is updated to reflect the transmitted activation code (and any additional corresponding message). In some embodiments, the process to share the electronic key with the second user includes: concurrently displaying, via the display generation component, a representation (e.g., an image and/or text) of the shared electronic key in a draft message of a messaging application (e.g., an instant messaging application, a text messaging application, and/or an email application) and a representation of a conversation (e.g., text that has been sent and/or received) (e.g., messages that have been sent prior to the draft message including the representation of the shared key) between the first user and the second user. While concurrently displaying the representation of the shared electronic key in the draft message and the representation of the conversation, the computer system detects selection of an option to transmit (e.g., selection of a send button and/or receiving a voice command to send) the shared electronic key to the second user, and, in response, the computer system transmits, as part of the conversation between the first user and the second user, the shared electronic key to the second user. Concurrently displaying an option to transmit the activation code and/or to transmit a representation of the shared electronic key with a representation of a conversation provides the user with visual feedback as to whom the activation cod and/or electronic key will be sent and reduces the risk that the activation code and/or electronic key is unintentionally shared with a user that is different from an intended recipient, which provides improved visual feedback and provides enhanced security while sharing an electronic key.

In some embodiments, during the process to share the electronic key with the second user of the second computer system: in accordance with the determination that an activation code (e.g., a security code and/or a PIN) for the shared electronic key is enabled (e.g., activated), the computer system concurrently displays with the first selectable object, via the display generation component, a second selectable object (e.g., 672a-672c, and/or 673) (e.g., button and/or other user-selectable interface object) to initiate the process of communicating the activation code (e.g., initiate a different type of communications channel to allow the user to communicate (e.g., either orally or through writing) the activation code based on the selectable object that is selected); and in accordance with a determination that the activation code for the shared electronic key is disabled, the computer system forgoes display of the second selectable object to initiate the process of communicating the activation code. In some embodiments, while concurrently displaying the first selectable object and the second selectable object, the computer system detects, via the one or more input devices, an object selection user input. In some embodiments, in response to detecting the object selection user input: in accordance with a determination that the object selection user input corresponds to selection of the first selectable object, initiating the process of communicating the activation code using a first communication technique (e.g., a first application, a messaging application (such as by displaying a draft message), and/or an email application (such as by displaying a draft email)); and in accordance with a determination that the object selection user input corresponds to selection of the second selectable object, initiating the process of communicating the activation code using a second communication technique (e.g., a second application different from the first application, an audio calling application (such as by starting (or offering to start) an audio call), and/or a video calling application (such as by starting (or offering to start) a video call)) that is different from the first communication technique. In some embodiments, the first communication technique uses a first contact information (e.g., an email address) for the first communication technique without using a second contact information (e.g., a phone number) and the second communication technique uses the second contact information without using the first contact information. In some embodiments, in accordance with a determination that the shared electronic key is shared with a respective user, the first computer system displays a selectable object that initiates a communication using contact information (e.g., a phone number and/or email) of the respective user. In some embodiments, in accordance with a determination that the shared electronic key is shared with a user different from the respective user, the first computer system displays a selectable object that initiates a communication using contact information (e.g., a phone number and/or email) of the user that is different from the respective user. In some embodiments, the first application and the second application utilize different communication channels, modalities, and/or networks. Displaying various selectable objects to initiate the communication of the activation code using various respective techniques provides enhanced security while sharing an electronic key (e.g., because it is difficult for a bad actor to have access to the both communication applications).

In some embodiments, during the process to share the electronic key with the second user of the second computer system: in accordance with the determination that an activation code (e.g., a security code and/or a PIN) for the shared electronic key is enabled (e.g., activated), the computer system concurrently displays, via the display generation component and with the first selectable object, a third selectable object (e.g., 672a-672c, and/or 673) (e.g., button and/or other user-selectable interface object) to copy the activation code (e.g., to a particular application and/or to memory for later pasting into a different user interface); and in accordance with a determination that the activation code for the shared electronic key is disabled, the computer system forges display of the third selectable object to copy the activation code. In some embodiments, while concurrently displaying the first selectable object and the third selectable object, the computer system detects, via the one or more input devices, an object selection user input. In some embodiments, in response to receiving the object selection user input: in accordance with a determination that the object selection user input corresponds to selection of the first selectable object, the computer system initiates the process of communicating the activation code using a first communication technique (e.g., a first application, a messaging application (such as by displaying a draft message), and/or an email application (such as by displaying a draft email)) without copying the activation code; and in accordance with a determination that the object selection user input corresponds to selection of the third selectable object, the computer system copies the activation code without initiating the process of communicating the activation code using the first communication technique. In some embodiments, in response to detecting the set of one or more inputs corresponding to the request to share the electronic key and in accordance with the determination that the activation code for the shared electronic key is enabled, displaying, via the display generation component, a third selectable object that, when selected, copies (e.g., save and/or store) the activation code. Displaying a selectable object to copy the activation code improves the computer system because it allows the user to save the activation code and send at a later time and/or allows the user to save the activation code and send it from a different application, which provides enhanced security while transmitting the activation code.

In some embodiments, the second computer system uses the activation code to activate the shared electronic key (e.g., as described in reference to FIGS. 8B-8E). In some embodiments, the computer system cannot activate the shared electronic key (e.g., cannot be used by the second user to gain access to the one or more physical locations and/or provisioned onto an electronic wallet of the second computer system) without using the activation code. In some embodiments, the second computer system uses the activation code to provision the shared electronic key onto a wallet application of the second computer system. Using an activation code to activate the shared electronic key (and/or to provision the shared electronic key onto an electronic wallet) enhances the security of the shared electronic key.

In some embodiments, the activation code is received and/or generated (e.g., by the first computer system and/or by a server in communication with the first computer system) during the process of sharing the electronic key. In some embodiments, a new activation code is received and/or generated (e.g., by the first computer system and/or by a server in communication with the first computer system) during a process of sharing the electronic key with a third computer system (different from the second computer system). In some embodiments, the activation code is a single-use activation code (e.g., the activation code is not re-used and/or the activation code is specific to a particular instance of sharing the electronic key).

In some embodiments, the activation code is predetermined prior to initiating the sharing process. In some embodiments, the activation code is received and/or generated (e.g., by a computer system different from computer system and/or an entity that issued the electronic key) prior to initiating the process of sharing the electronic key. In some embodiments, the same activation code is used during a process of sharing the electronic key with a third computer system (different from the second computer system). In some embodiments, the activation code is a multi-use activation code (e.g., the activation code is re-used and/or the activation code is not specific to a particular instance of sharing the key).

In some embodiments, during the process to share the electronic key with the second user of the second computer system, the computer system displays, via the display generation component, a user interface (e.g., 640) for designating, for the shared electronic key, a range of time (e.g., 642, 644, 646, 648, 654*a*-654*b*, and/or 652) (e.g., particular days, particular hours, and/or particular minutes) during which at least one of the one or more access rights of the shared electronic key to the one or more physical locations are active (e.g., enabled and/or valid) (and/or designates a second range of time during which the one or more access rights are inactive (e.g., disabled and/or invalid)) and outside of which the at least one of the one or more access rights of the shared electronic key to the one or more physical locations are not active (e.g., not enabled and/or invalid). In some embodiments, during the process to share the electronic key with the second user of the second computer system, the computer system detects, while displaying the user interface for designating the range of time, a third set of one or more inputs (e.g., touch inputs, voice commands, and or air inputs) specifying a first range of time (e.g., 642, 644, 646, 648, 654*a*-654*b*, and/or 652). In some embodiments, during the process to share the electronic key with the second user of the second computer system, in response to detecting the third set of one or more inputs specifying the range of time, the computer system designates (e.g., configures the shared electronic key such that) the first range of time (e.g., particular days, particular hours, and/or particular minutes) during which at least one of the one or more access rights of the shared electronic key to the one or more physical locations are active (e.g., enabled and/or valid) (and/or designates a second range of time during which the one or more access rights are inactive (e.g., disabled and/or invalid)) and outside of which the at least one of the one or more access rights of the shared electronic key to the one or more physical locations are not active. Displaying one or more selectable objects that specify when an access right is active and when an access right is inactive improves the electronic key sharing process because it allows the first user to share a key but restrict an access right to a specific range of time.

In some embodiments, after sharing the electronic key (e.g., before and/or while the electronic key is provisioned onto an electronic wallet of the second computer system), the computer system detects, via the one or more input devices, a fourth set of one or more inputs corresponding to a request to modify the one or more access rights of the shared electronic key (e.g., inputs on 674, 678*a*-678*d*, 682, 624, 626, 688, 686, including, for example, input 650*o*, 650*p*1 650*p*2). In some embodiments, in response to detecting the fourth set of one or more inputs corresponding to the request to modify (e.g., increase, decrease, edit, and/or change) the one or more access rights of the shared electronic key, the computer system modifies (e.g., changes, deactivates, and/or activates) a respective access right of the one or more access rights (e.g., modifies (expand or further restrict) a respective time frame during which the one or more access rights are active). Modifying an access right after the shared electronic key has been shared improves the security of the electronic key sharing process because the first user can modify the access right if the electronic key was shared with an unintended recipient and/or with unintended access rights. Modifying the access right after the shared electronic key has been shared improves the electronic key sharing process because it allows the first user to customize the rights that are shared even after the shared electronic key has been shared.

In some embodiments, during the process to share the electronic key with the second user of the second computer system, the computer system displays, via the display generation component, a user interface for configuring the shared electronic key to be shareable by the second user (with a respective user that is different from the first user and the second user, to whom the second user decides to share the shared electronic key). In some embodiments, during the process to share the electronic key with the second user of the second computer system, while displaying the user interface for configuring the shared electronic key to be shareable, the computer system detects, via the one or more input devices, user input to configure the shared electronic key to be shareable by the second user (e.g., an input on 624). In some embodiments, during the process to share the electronic key with the second user of the second computer system, in response to detecting the user input to configure the shared electronic key to be shareable by the second user, the computer system configures the shared electronic key to be sharable by the second user (e.g., the electronic hotel key is sharable by device 800 and/or user 806) (e.g., the second user can reshare the shared electronic key with a third user that is different from the first user and the second user). In some embodiments, the user interface for configuring the shared electronic key to be shareable by the second user includes a default option that the shared electronic key is not shareable. Providing an option to enables the second user to reshare the shared electronic key improves the security of the electronic key sharing process because it provides the first user with the option to prevent the second user from resharing the shared electronic key. Additionally, enabling the second user to share the shared electronic key improves the sharing process because it allows the first user to customize whether the second user can share the shared electronic key, which provides additional control options.

In some embodiments, after sharing the electronic key, the computer system displays, via the display generation component, (e.g., in response to detecting, via the one or more input devices, a request to display) a management user interface (e.g., 677) for the shared electronic key that includes: in accordance with a determination that an activation code for the shared electronic key is enabled and that the shared electronic key has not been activated using the activation code (e.g., the second user has not used the activation code to activate the shared electronic key), displaying, via the display generation component, the activation code (e.g., 603 is displayed in FIG. 6Q) (and, optionally, an option to transmit the activation code to the second user); and in accordance with a determination that an activation code for the shared electronic key is enabled and that the shared electronic key has been activated using the activation code (e.g., the second user has used the activation code to activate the shared electronic key), forgoing display of the activation code (e.g., 603 is not displayed in FIG. 6R). In some embodiments, the first computer system receives a communication (e.g., from a server monitoring the sharing of the electronic key and/or from the second computer system) as to the state of the shared electronic key and/or whether the shared electronic key has been provisioned onto the electronic wallet of the second computer system. Displaying the activation code when the shared electronic key has not been activated improves the electronic key sharing process because it provides the first user with the option to view the activation code (e.g., after it has been communicated and/or if the second user has forgot the activation code after it has been communicated).

In some embodiments, displaying the management user interface for the shared electronic key includes displaying, via the display generation component, an option (e.g., 684) to provide, for the shared electronic key, a new activation code that is different from the activation code. In some embodiments, while displaying the option to provide the new activation code, the computer system detects, via the one or more input devices, selection of the option to provide the new activation code. In some embodiments, in response to detecting selection of the option to provide the new activation code: the computer system displays, via the display generation component, the new activation code for the shared electronic key (e.g., 603 is updated in response to input on 684). In some embodiments, in response to detecting selection of the option to provide a new activation code, the computer system generates a new activation code for the shared electronic key. In some embodiments, the new activation code can be used (e.g., by the second user) to activate the shared electronic key. In some embodiments, in response detecting selection of the option to provide a new activation code, the first computer system configures the shared electronic key to not be activatable using the original activation code. In some embodiments, selection of the option to generate the new activation code causes the (original) activation code to be disabled (e.g., only the new activation code will activate the shared electronic key). Displaying a new activation code that is different from a previous activation code (e.g., one that was already communicated) improves the security of the electronic key sharing process because it provides the first user with the option to update the activation code (e.g., if the second user has misplaced the activation code and/or if a bad actor comes into possession of the activation code).

In some embodiments, during the process to share the electronic key with the second user of the second computer system: the computer system displays, via the display generation component, an option (e.g., 628) to change (enable or disable) an activation code (e.g., a security code and/or a PIN) setting for the shared electronic key. In some embodiments, the computer system displays the option to enable/disable the activation code for the shared electronic key prior to displaying the first selectable object. Displaying the option to enable/disable an activation code during the key sharing process improves the security of the electronic key sharing process because it enables the first user to decide whether an activation code should be used, which reduces the risk that a user other than the intended recipient can access and use the shared electronic key.

In some embodiments, during the process to share the electronic key with the second user of the second computer system, while an activation code for the shared electronic key is not displayed, the computer system detects, via the one or more inputs, selection of the option to change (enable or disable) the activation code setting for the shared electronic key. In some embodiments, during the process to share the electronic key with the second user of the second computer system, in response to detecting selection of the option to change the activation code setting for the shared electronic key, in accordance with a determination that the selection of the option to change the activation code setting for the shared electronic key enables the activation code (e.g., alphanumeric text and or image) for the shared electronic key: the computer system enables the activation code for the shared electronic key; and the computer system concurrently displays, via the display generation component, the option to change the activation code setting for the shared electronic key and the activation code (e.g., alphanumeric text and or image) for the shared electronic key (e.g., when activation code affordance 628 is enabled, device 600 and/or device 800 displays indication 603 and activation code affordance 628; and/or, when 628 is enabled, device 600 and/or device 800 displays activation code affordance 628 and does not display indication 603). In some embodiments, in response to detecting selection of the option to change the activation code setting for the shared electronic key and in accordance with a determination that the selection of the option to change the activation code setting for the shared electronic key disables the activation code for the shared electronic key: disabling the activation code for the shared electronic key and displaying, via the display generation component, the option to change the activation code setting for the shared electronic key without displaying an activation code (e.g., alphanumeric text and or image) for the shared electronic key. Automatically displaying the activation code when the activation code provides the user with visual feedback about what the activation code is, thereby providing improved visual feedback.

In some embodiments, displaying the option to change (enable or disable) the activation code (e.g., a security code and/or a PIN) setting for the shared electronic key includes: in accordance with a determination that the request to share the electronic key satisfies a first set of sharing conditions (e.g., what techniques, applications, and/or recipient first user 606 and/or second user 806 selects in communication options user interface 618, including, for example, 620a-620d) (e.g., selecting a particular type of user and/or selecting a particular type of application to share the electronic key through), the option to change the activation code setting for the shared electronic key defaults to the activation code for the shared electronic key being disabled; and in accordance with a determination that the request to share the electronic key does not satisfy the first set of sharing conditions, the option to change the activation code setting for the shared electronic key defaults to the activation code for the shared electronic key being enabled. Automatically enabling and/or disabling the activation code depending on whether the first set of sharing conditions is satisfied improves the computer system because an operation is performed when a set of conditions has been met without requiring further user input. Additionally, automatically enabling and/or disabling the activation code depending on whether the first set of sharing conditions is satisfied improves the security of sharing the shared electronic key because the first computer system automatically enables the activation code based on how a user has decided to share the electronic key.

In some embodiments, the first set of sharing conditions includes a first sharing condition that is satisfied when the second user is a known user (e.g., user associated with affordance 620a and/or 820a). Automatically enabling and/or disabling the activation code based on a sharing condition that is satisfied when the second user is identified by the first computer system improves the computer system because an operation is performed when a set of conditions has been met without requiring further user input. Additionally, it improves the security of sharing the electronic key since the first computer system automatically enables the activation code based on how a user has decided to share the electronic key.

In some embodiments, the second user is a known user when the second user is associated with stored contact information (e.g., user associated with affordance 620a and/or affordance 820a) (e.g., in an electronic contact application of the first computer system). Automatically enabling and/or disabling the activation code based on a sharing condition that is satisfied when the second user is associated with stored contact information improves the computer system because an operation is performed when a set of conditions has been met without requiring further user input. Additionally, it reduces the number of inputs needed since an activation code is not needed when the second user is associated with stored contact information, which reduces the number of inputs needed to perform an operation.

In some embodiments, the second user is a known user when the second user corresponds to a respective user account of a trusted service (e.g., both first user 606 and user associated with affordance 620a have a user account with the trusted service and/or both second user 806 and user associated with affordance 820a have a user account with the trusted service) (e.g., a service that provides end-to-end encryption, a service of which the first user also has a respective user account, and/or a service that offers a particular level of security in communicating a message). In some embodiments, the first computer system receives, from a server associated with the service and/or from the second computer system, an indication that the second computer system is associated with a user account of the service. In some embodiments, the first computer system stores an indication about the second user of the second computer system based on prior communications between the second computer system. Automatically enabling and/or disabling the activation code based on a sharing condition that is satisfied when the second user has a respective account with a trusted service improves the computer system because an operation is performed when a set of conditions has been met without requiring further user input. Additionally, it reduces the number of inputs needed since an activation code is not needed.

In some embodiments, the first set of sharing conditions includes a second sharing condition that is satisfied when a respective (e.g., a predetermined and/or predefined) communication application is selected to share the electronic key (e.g., what application is used for sharing the electronic hotel key based on a selection in communication options user interface 618, including, for example, a selection of 620a-620d and/or 820a). In some embodiments, in response to detecting the set of one or more inputs corresponding to the request to share the electronic key and in response to detecting a request to share the electronic key using a first application, the first computer system enables the activation code. In some embodiments, in response to detecting the set of one or more inputs corresponding to the request to share the electronic key and in response to detecting a request to share the electronic key using a second application different from the first application, the first computer system disables the activation code. Automatically enabling and/or disabling the activation code based on a sharing condition that is satisfied when a respective improves the computer system because an operation is performed when a set of conditions has been met without requiring further user input. Additionally, it reduces the number of inputs needed since an activation code is not needed when a respective communication application is selected to share the electronic key (e.g., if the respective communication application has been determined to satisfy a particular level of security), which reduces the number of inputs needed to perform an operation.

In some embodiments, after sharing the electronic key, the computer system receives an indication that the second user shared the shared electronic key with a third user different from the second user and the first user. In some embodiments, in response to receiving the indication that the second user shared the shared electronic key with the third user, the computer system displays, via the display generation component, an indication (e.g., 678*a*-678*d* and/or 688) that the second user shared the shared electronic key. In some embodiments, the indication that the second user shared the shared electronic key includes a representation of the third user. In some embodiments, the first computer system receives the indication that the second user shared the shared electronic key from a server monitoring the sharing of the shared electronic key and/or from the second computer system. Displaying an indication that the second user has shared the shared electronic key with a third user improves the security of the key sharing process because the first user can view who has an access right to a physical location. Additionally, it provides visual feedback that the shared electronic key has been shared, which provides improved visual feedback.

In some embodiments, while displaying the indication that the second user shared the shared electronic key, the computer system detects, via the one or more input devices, selection of the indication that the second user shared the shared electronic key. In some embodiments, in response to detecting selection of the indication that the second user shared the shared electronic key, the computer system displays, via the display generation component, a management user interface (e.g., 677) for the shared electronic key that includes options (e.g., 624, 626, and/or 686) that, when selected, modify (e.g., change, deactivate, and/or activate) one or more access rights (including a respective time frame during which the one or more access rights are active) that the second user shared with the third user. In some embodiments, the second user shared the shared electronic key with a subset of the one or more access rights (e.g., a first access right and not a second access right) that the first user shared with the second user. In some embodiments, the second user shared the shared electronic key with all of one or more access rights that were received from the first user. Displaying a second set of one or more selectable objects that, when selected, modify one or more access rights that the second user shared with the third user improves the security of the key sharing process (e.g., how computer system share an electronic key) because the first user can modify the access rights that the second user shared.

In some embodiments, in response to completion of the process to share the electronic key without an activation code enabled, the first computer system displays a user interface for the shared electronic key with an option to manage the shared electronic key. In some embodiments, in response to completion of the process to share the electronic key with an activation code enabled, the first computer system forgoes displaying the user interface for the shared electronic key with the option to manage the shared electronic key.

In some embodiments, a user interface of the electronic wallet application includes a representation of the electronic key and, in accordance with a determination that the electronic key can be shared, an option for sharing the key; and in accordance with a determination that the electronic key cannot be shared, without displaying an option for sharing the key.

In some embodiments, a user interface of the electronic wallet application includes a representation of the electronic key and, once the electronic key has been shared, an option to manage the shared electronic key.

In some embodiments, when a recipient is selected for key sharing and the recipient does not have an account with the trusted service, the computer system displays an option to enable the activation code for the shared electronic key.

In some embodiments, the access rights of an electronic key (e.g., the original electronic key and/or the shared electronic key) can be modified remotely (e.g., by an issuer of the original electronic key and/or by a user logging into issuer's application and/or website).

Note that details of the processes described above with respect to method 700 (e.g., FIG. 7) are also applicable in an analogous manner to the methods described below. For example, method 900 optionally includes one or more of the characteristics of the various methods described above with reference to method 700. For example, method 900 can include displaying the interfaces of method 700 that include techniques to share (e.g., re-share) and/or configure access rights (including time limits), techniques for enabling and/or disabling an access code, and/or techniques to manage shared access rights. For brevity, these details are not repeated below.

FIGS. 8A-8L illustrate exemplary user interfaces for access rights provided by an electronic key, in accordance with some embodiments. The user interfaces in these figures are used to illustrate the processes described below, including the processes in FIG. 9. In some embodiments, device 600 includes one or more features of devices 100, 300, 500, and/or 600.

At FIG. 8A, device 800 displays, on display 801, instant messaging interface 802, which includes the same conversation as instant messaging interface 606*a* in FIG. 6L. Instant messaging interface 802 includes message 804 transmitted by device 600 in response to input 650*l* in FIG. 6L and received at device 800. Message 804 includes key representation 604 and add affordance 805. Add affordance 805 allows a user to initiate a process of adding the electronic hotel key to a digital wallet of device 800. While displaying instant messaging interface 802, device 800 detects tap input 850*a* directed at add affordance 805. In response to detecting tap input 850*a*, device 800 displays main add interface 808, as depicted in FIG. 8B.

Figure 8B:
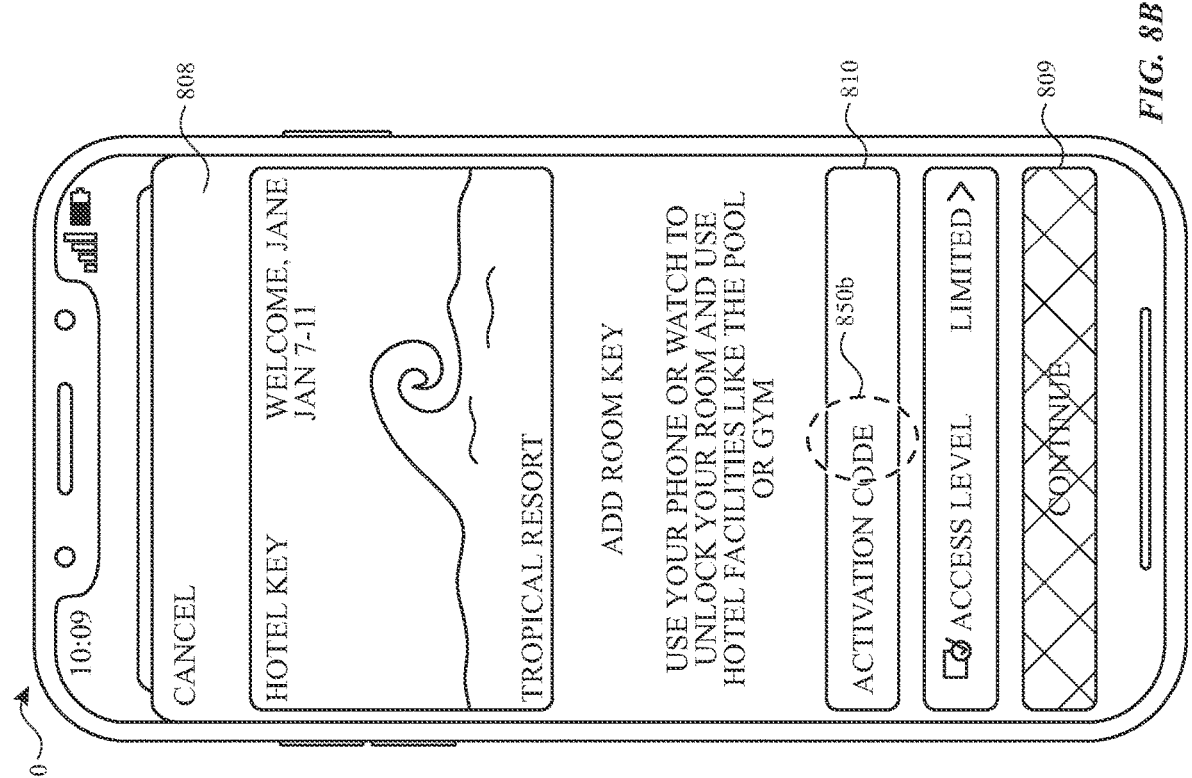
Figure 8A:
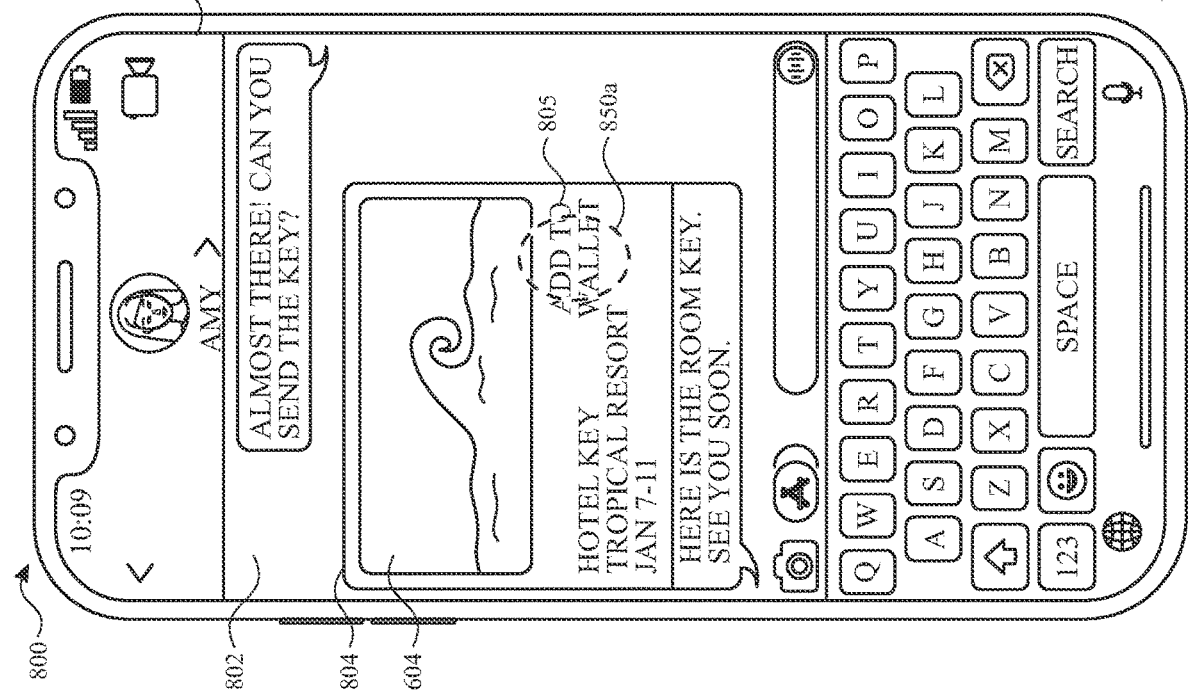
Figure 9:
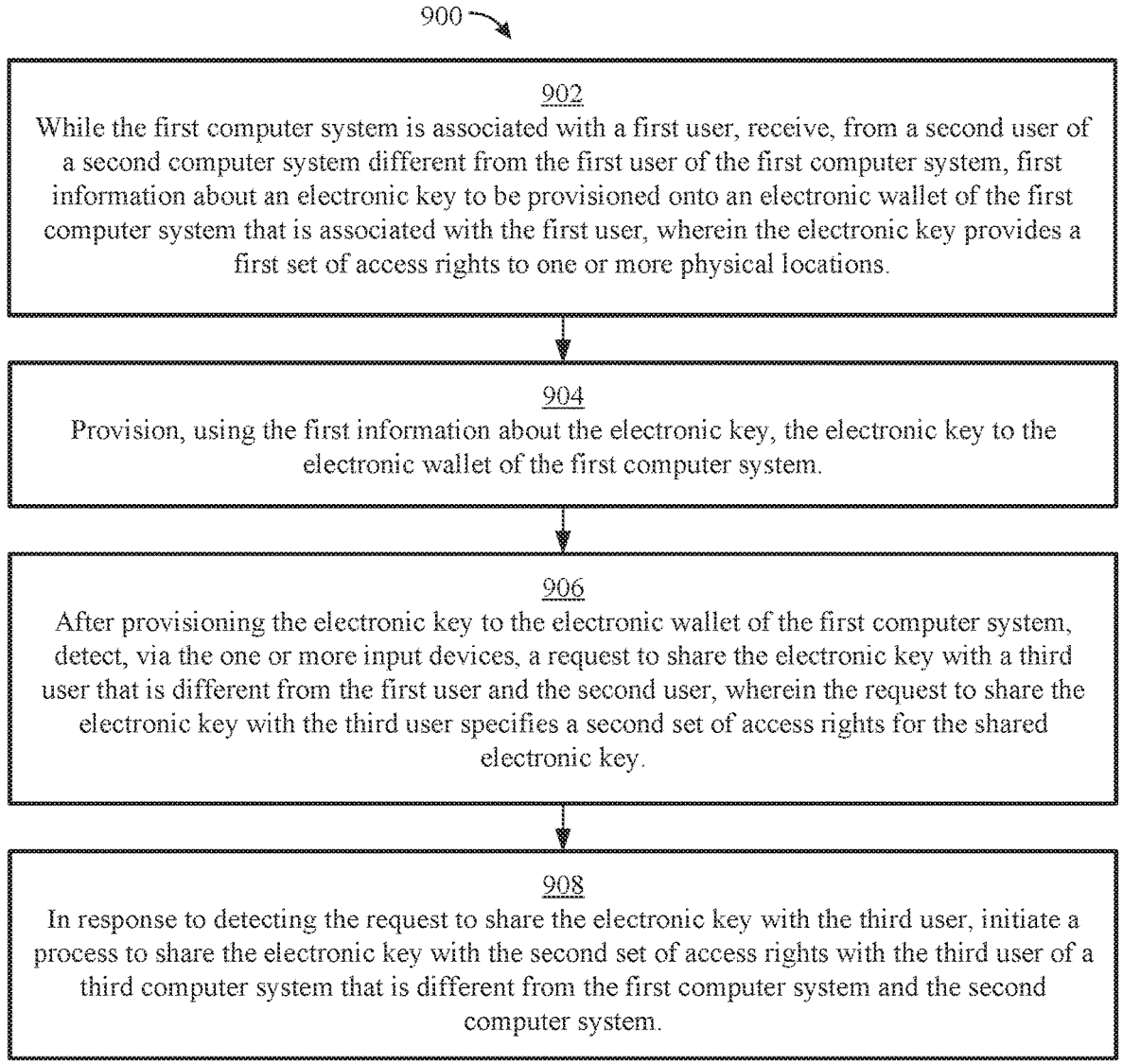
FIG. 9 is a flow diagram illustrating methods of re-sharing a shared electronic key, in accordance with some embodiments.

At FIG. 8B, main add interface 808 includes add activation code affordance 810 and continue affordance 809. As illustrated, continue affordance 809 is disabled, preventing second user 806 from adding the shared electronic hotel key to the digital wallet of device 800. While displaying main add interface 808, device 800 detects tap input 850*b* directed at add activation code affordance 810. In response to detecting tap input 850*b*, device 800 displays a user interface and/or affordances to allow a user to input the activation code.

At FIG. 8C, after device 800 detects an input of the activation code, main add interface 808 includes indication 603 of the activation code. As illustrated, continue affordance 809 is enabled, allowing second user 806 to add the shared electronic hotel key to the digital wallet of device 800. In some embodiments, second user 806 receives the activation code over a communications channel and/or in communications application that is different than the instant messaging application (e.g., a telephone call that is initiated in response to selecting call affordance 673 of FIG. 6O).

At FIG. 8C, main add interface 808 also includes view access level affordance 812. View access level affordance 812 allows a user to view a read-only (e.g., non-editable) version of the access rights that were shared with device 800. While displaying main add interface 808, device 800 detects tap input 850*c*1 directed at view access level affordance 812. In response to detecting tap input 850*c*1, device 800 displays access level interface 814, as depicted in FIG. 8D. While displaying main add interface 808, device 800 detects tap input 850*c*2 directed at continue affordance 809.

Figure 8E:
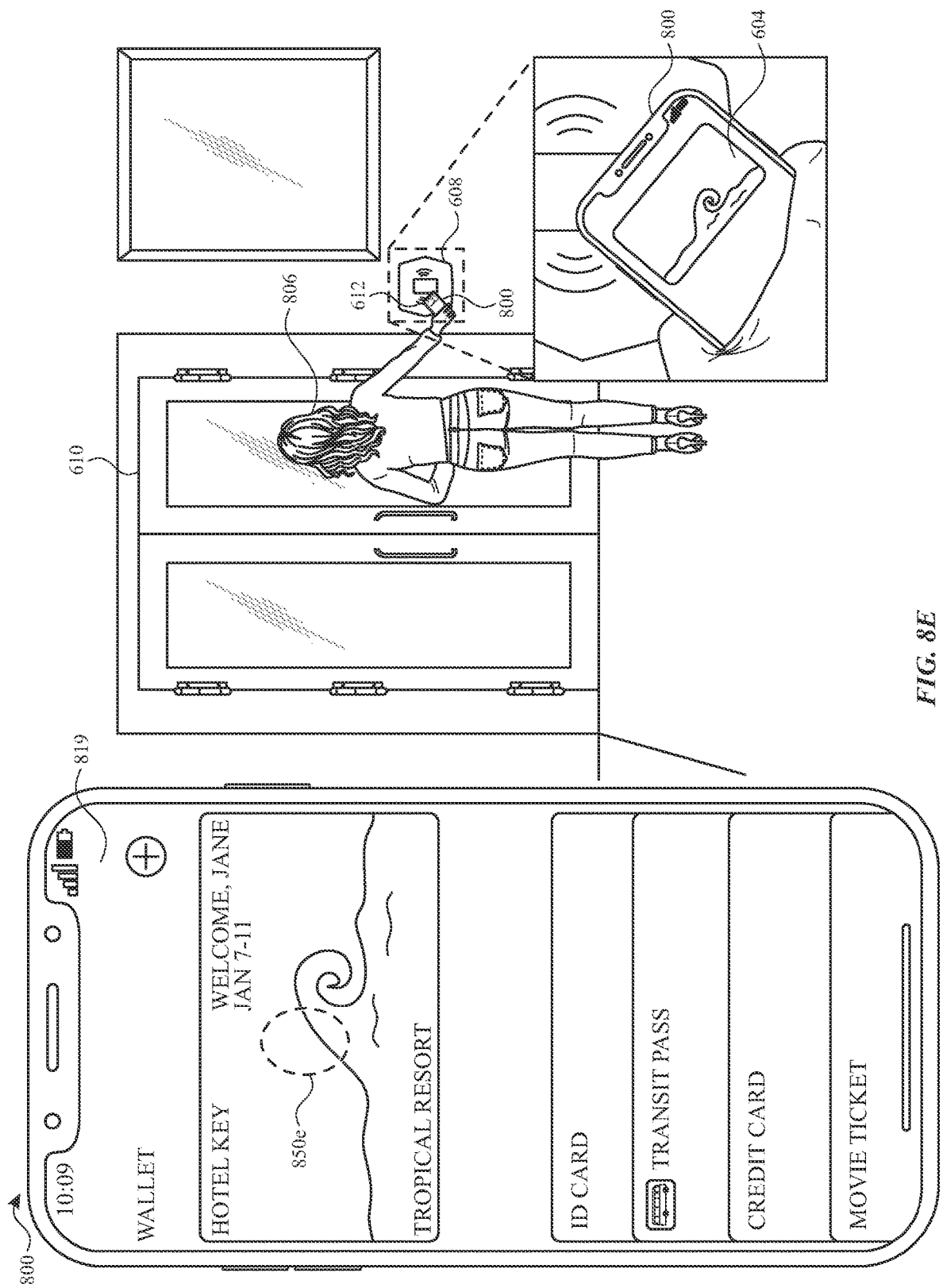

In response to detecting tap input 850c2, device 600 provisions device 800 with the shared electronic hotel key and displays wallet user interface 819, as depicted in FIG. 8E.

At FIG. 8D, access level interface 814 includes a read-only version of the access rights that were shared with device 800. The access rights of access level interface 814 includes indication 815, indication 817 of the access rights (including time limits) that were configured by device 600 in response to detecting a selection of the affordances in access level editing user interface 632 in FIG. 6F and/or time limit user interface 640 in FIGS. 6J-6I. In some embodiments, access level interface 814 does not include an indication of the access rights that are not shared (e.g., indication 815a that access to room 203 was disabled). In some embodiments, device 800 displays a read-only version of the time limits of the access rights that were shared in response to detecting a selection of time limits affordances 816.

At FIG. 8E, in response to detecting input 850c2 in FIG. 8C, device 800 displays wallet user interface 819. Wallet user interface 819 includes representations of different electronic cards, including the electronic hotel key, an electronic identification card, an electronic transit pass, an electronic credit card, and an electronic movie ticket. As illustrated, similar to the techniques described in reference to FIG. 6A, the shared electronic hotel key gives second user 806 access to secure door 610 (e.g., after user authentication at device 800).

At FIG. 8E, while displaying wallet user interface 819, device 800 detects tap input 850e directed at the representation of electronic hotel key in FIG. 8E. In response to detecting tap input 850e, device 800 displays wallet user interface 819, as depicted in FIG. 8F.

At FIG. 8F, device 800 displays wallet user interface 819 for the shared electronic hotel key, similar to wallet user interface 602 of FIG. 6B. Wallet user interface 819 includes share icon 616, similar to the techniques described with reference to FIG. 6B. While displaying wallet user interface 819 for the electronic hotel key, device 800 detects tap input 850f directed at share icon 616. In response to detecting tap input 850f, device 800 displays communication options user interface 618, as depicted in FIG. 8G.

At FIG. 8G, communication options user interface 618 in FIG. 8G is similar to communication options user interface 618 in FIG. 6C, but in a different state (e.g., with different contacts and/or communication applications, in some embodiments). While displaying communication options user interface 618, device 800 detects tap input 850g directed at affordance 820a that is associated with initiating a process to reshare the electronic hotel key with Sarah using an email application. In response to detecting tap input 850g, device 800 displays key sharing user interface 622, as depicted in FIG. 8H.

At FIG. 8H, key sharing user interface 622 in FIG. 8H is similar to key sharing user interface 622 of FIG. 6E. As illustrated, key sharing user interface 622 in FIG. 8H includes resharing affordance 624 that is enabled, access level affordance 626, and activation code affordance 628 that is enabled. Key sharing user interface 622 in FIG. 8H also includes indication 603 of an activation code. Device 800 automatically enables activation code affordance 628 based on the how the electronic key is going to be shared (e.g., which communication application). In some embodiments, activation code affordance 628 is automatically enabled based on device 800 receiving an indication that a device receiving the electronic key also has an account with an entity that provides a communications channel in the key is going to be transmitted (e.g., the transmitting user and the intended recipient both have user accounts with the same service).

Notably, indication 603 in FIG. 8H includes a different activation code from the activation code associated with indication 603 in FIG. 8E. In some embodiments, the activation code is the same. For example, in some embodiments, the entity issuing the electronic key configures the activation code. In such embodiments, the activation code is the same when the electronic key is shared (either by the original key holder, such as first user 606, or by users who receive the key from the original key holder, such as second user 806). In some embodiments, a device (e.g., the digital wallet of a device) generates and/or receives (e.g., from a server) the activation code during the process to reshare the electronic hotel key. While displaying key sharing user interface 622, device 800 detects tap input 850h directed at access level affordance 626. In response to detecting tap input 850h, device 800 displays access level editing user interface 632, as depicted in FIG. 8I.

At FIG. 8I, access level editing user interface 632 in FIG. 8I is similar to access level editing user interface 632 of FIG. 6F but having a different state (e.g., based on the access rights shared with second user 806). Access level editing user interface 632 in FIG. 8I allows second user 806 to modify (e.g., further restrict) the access rights that were shared with second user 806. Notably, access level editing user interface 632 in FIG. 8I only allows device 800 to modify the access rights that were enabled at device 600. For example, device 800 can enable and/or disable affordances 634', which excludes room affordance 634a (which was disabled by device 600 in response to input tap 650f1 in FIG. 6F). Room affordance 634a is displayed as a different appearance based on being disabled (e.g., non-configurable by device 800). In some embodiments, room affordance 634a is not displayed. In other words, in some embodiments, access rights that are disabled (and/or not shared) are not displayed at device 800.

At FIG. 8I, access level editing user interface 632 allows a second user 806 to modify other access rights that were shared using affordances 636 and time limit affordance 638. In some embodiments, in response to detecting a selection of time limit affordance 638, device 800 displays time limit user interfaces similar to time limit user interfaces 640 in FIGS. 6J-6I. In some embodiments, device 800 modifies the time limit to restrict the access rights to 3 PM to 5 PM, which is a shorter time frame than what access rights were by device 600 (e.g., 9 AM to 5 PM as described in reference to FIG. 6I).

At FIG. 8I, while displaying access level editing user interface 632 at FIG. 8I, device 800 detects tap input 850i1 directed at room affordance 634b. In response to detecting tap input 850i1, device 800 disables room affordance 634b. As such, when device 800 shares the electronic hotel key with a device associated with a different user (e.g., Sarah), the user associated with the receiving device will not have access to neither room 203 (which was disabled by device 800) nor room 205 (which was disabled by device 600) when the key is added to a digital wallet of the device.

At FIG. 8I, while displaying access level editing user interface 632 at FIG. 8I, device 800 detects tap input 850i2 directed at affordance 822. In response to detecting tap input 850i2, device 800 displays key sharing user interface 622, as depicted in FIG. 8J.

At FIG. 8J, while displaying key sharing user interface 622, device 800 detects tap input 850j directed at continue affordance 656. In response to detecting tap input 850j, device 800 initiates a process to authenticate second user 806 (e.g., using a facial recognition, using a fingerprint, and/or using a password). In some embodiments, device 800 displays a face authentication notification similar to face authentication notification 659 in FIG. 6K.

At FIG. 8K, device 800 has successfully authenticated second user 806. As such, device 800 displays email message interface 826 of the email application associated with affordance 820a. At FIG. 8K, second user 806 has entered text in email 828 to Sarah, the recipient. As illustrated, email 828 includes a representation of the electronic hotel key that is being shared. While displaying email message interface 826, device 800 detects tap input 850k directed at send affordance 830. In response to detecting tap input 850k, device 800 sends email 828 to a device associated with Sarah. Notably, in some embodiments, because activation code affordance 628 is enabled, device 800 displays an activation code interface similar to activation code interface 670 and/or call affordance similar to call affordance 673, similar to the techniques described with respect to FIGS. 6M-6N. Additionally, device 800 updates wallet user interface 819 for the electronic hotel key to include manage affordance 674, similar to the techniques described with respect to FIG. 6O.

At FIG. 8L, device 600 updates management user interface 676 to include affordance 678d associated with Sarah in response to device 800 transmitting the electronic hotel key to the device associated with Sarah. As discussed with reference to FIGS. 6P and 6R, device 600 displays an affordance to edit the access rights that were re-shared by Dave with Tom. In some embodiments, in response to detecting an input directed at affordance 678d at device 600, device 600 displays individual user management interface 677 associated with Sarah, similar to the techniques described with references to FIGS. 6P-6R. As such, in some embodiments, device 600 can modify the access rights that device 800 shared with the device associated with Sarah. In some embodiments, device 600 receives an indication that device 800 has shared the key based on a communication received from device 600, a server associated with the hotel that issued the electronic hotel key, and/or the device associated with Sarah.

At FIG. 8L, device 800 displays management user interface 676 which is similar to management user interface 676 displayed at device 600, but is from the perspective of device 800. As illustrated, management user interface 676 displayed by device 800 includes affordances 678a-678c. In some embodiments, while affordances 678a-678c are displayed, only the access rights shared by device 800 can be modified by device (e.g., device 800 cannot modify the access rights that were shared by David with Tom and/or cannot modify the access rights that first user 606 shared with David). In some embodiments, affordances 678a-678c allow device 800 to modify the access rights that were not shared by device 800 (e.g., device 800 can modify the access rights that were shared by David with Tom and/or can modify the access rights that first user 606 shared with David). In some embodiments, management user interface 676 displayed by device 800 includes affordance 678a. In some embodiments, management user interface 676 displayed by device 800 does not include affordances 678b-678c. In such embodiments, management user interface 676 displayed by device 800 includes (e.g., only) affordances for users with whom second user 806 has shared the electronic hotel key.

At FIG. 8L, in some embodiments, a recipient of the electronic hotel key (e.g., Jane) can view an access level and/or rights that the sender (e.g., Amy) has, optionally including viewing access levels and/or rights that have not been shared with the recipient. In such embodiments, device 800 displays an affordance associated with user 606 (e.g., Amy) that is similar to affordances 678b-678c. In some embodiments, the affordance associated with user 606 includes an indication of an access level and/or a set of access rights granted to device 600 (e.g., Jane can see what rights were granted to Amy). For instance, in some embodiments, device 800 displays an affordance for user 606 that includes an indication of "full access," indicating that user 606 maintains a set of access rights that were granted and/or made available by an entity (e.g., hotel) of the electronic key. In such embodiments, selection of the affordance for user 606 displays an unmodifiable version (e.g., a read-only version) of the set of access rights that are granted. In some embodiments, device 800 does not display an option to modify an access right of the set of access rights. In some embodiments, selection of the affordance optionally displays an access level interface similar to access level interface 814 of FIG. 8L. In such embodiments, the access level interface includes an indication of a set of access rights that were granted to user 606 (e.g., as opposed to access level interface 814 of FIG. 8L, which includes an indication of what set of access rights were granted to user 806). In embodiments where device 800 displays the affordance for user 606, device 800 displays an indication that user 806 received the shared electronic hotel key from user 606.

At FIG. 8L, in some embodiments, device 800 does not receive a right to share the electronic hotel key. In such embodiments, device 600 disables resharing affordance 624 (e.g., as described in reference to FIG. 6J). Additionally or alternatively, device 600 resharing affordance 624 is enabled when the electronic hotel key is initially shared with device 800, and device 600 subsequently disables resharing affordance 624 (e.g., as described in reference to FIG. 6Q).

FIG. 9 is a flow diagram illustrating a method for re-sharing a shared electronic key using a computer system in accordance with some embodiments. Method 900 is performed at a computer system (e.g., 100, 300, 500, 600, and/or 800) (e.g., a smartwatch, a smartphone, a tablet computer, a head mounted device (e.g., a head mounted augmented reality and/or extended reality device), and/or a laptop computer) that is in communication with one or more input devices (e.g., a touch-sensitive surface, a keyboard, a controller, a rotatable input device, microphone, and/or a mouse). In some embodiments, the computer system is in communication with a display generation component (e.g., 601 and/or 801) (e.g., a display controller, a touch-sensitive display system, a head mounted display system, and/or a monitor). Some operations in method 900 are, optionally, combined, the orders of some operations are, optionally, changed, and some operations are, optionally, omitted.

As described below, method 900 provides an intuitive way for re-sharing a shared electronic key. The method reduces the cognitive burden on a user for re-sharing a shared electronic key, thereby creating a more efficient human-machine interface. For battery-operated computing devices, enabling a user to re-share a shared electronic key faster and more efficiently conserves power and increases the time between battery charges.

While the first computer system is associated with (e.g., corresponds to, is being used by, and/or is logged into by a first account of) a first user (e.g., 606 and/or 806), the computer system receives (902), from a second user (e.g., 606 and/or 806) of a second computer system (e.g., 100, 300, 500, 600, and/or 800) (e.g., a remote computer system, an external computer system, a computer system associated with a second user different from the first user, a smartphone, a tablet computer, a laptop computer, and/or desktop computer) different from the first user of the first computer system, first information about an electronic key (e.g., the electronic hotel key of FIGS. 6A-6R and/or FIGS. 8A-8L) (e.g., credentials for an electronic card key and/or credentials for an access key account) (e.g., a shared electronic key and/or an electronic key that is shared between at least two different users) to be provisioned onto (or, optionally, that is stored at) an electronic wallet (e.g., 602 and/or 818) (e.g., the electronic wallet includes credentials for one or multiple accounts (e.g., transit account, payment account, loyalty account, electronic key, and/or airline ticket), an electronic key that is accessible using the wallet and/or an electronic key that is stored and/or saved in the wallet) of the first computer system that is associated with the first user, wherein the electronic key provides a first set of access rights (e.g., access rights associated with affordances (e.g., 634 and/or 636) in access level editing user interface 632 and/or time limits associated with affordances (e.g., 642, 644, 646, and/or 648) of time limit user interface 640) to one or more physical locations (e.g., 610, and/or physical location associated with affordances 634 in access level editing user interface 632) (e.g., the electronic key unlocks a physical lock and/or door). In some embodiments, a physical location is a secured area (e.g., that is in a building (e.g., a room, an elevator, and/or a washing machine), an outdoor area (e.g., a gated area, an outdoor pool, and/or a driveway), and/or a vehicle (e.g., car or truck)). In some embodiments, the one or more access rights includes a temporal access right (e.g., one or more access rights are valid for a respective time frame). In some embodiments, after provisioning the electronic key onto the electronic wallet, the electronic wallet includes a visual representation of the electronic key. In some embodiments, the electronic wallet includes credentials for one or multiple accounts (e.g., transit account, payment account, loyalty account, electronic key, and/or airline ticket), one or more electronic cards (e.g., an electronic credit card and/or an electronic ticket) different from the electronic key. In some embodiments, the electronic wallet includes one or more visual representations of the one or more accounts.

In some embodiments, the computer system provisions (904), using the first information about the electronic key, the electronic key to the electronic wallet of the first computer system. In some embodiments, after provisioning the electronic key to the electronic wallet of the first computer system, the computer system detects (906), via the one or more input devices, a request to share the electronic key with a third user (e.g., user associated with affordance 820*a* and/or affordance 620*a*) that is different from the first user and the second user, wherein the request to share the electronic key with the third user specifies a second set of access rights (e.g., access rights associated with affordances (e.g., 634 and/or 636) in access level editing user interface 632 and/or time limits associated with affordances (e.g., 642, 644, 646, and/or 648) of time limit user interface 640) (e.g., the same as the first set of access rights or different from the first set of access rights) for the shared electronic key. In some embodiments, the second set of access rights is a sub-set (includes a first access right and does not include a second access right) of the first set of access rights. In some embodiments, the first set of access rights includes an access right that is not included in the second set of access rights. In some embodiments, the second set of access rights does not include an access right that is not included in the first set of access rights (e.g., a user cannot re-share an access right that was not originally shared with the user).

In some embodiments, in response to detecting the request to share the electronic key with the third user, the computer system initiates (908) (e.g., starts, causes and/or executes a command to transmit) a process to share the electronic key with the second set of access rights with the third user of a third computer system (e.g., 100, 300, 500, and/or a computer associated with the users associated with affordance 820*a* and/or affordance 620*a*) (e.g., a remote computer system, an external computer system, a computer system associated with a user different from a user associated with the first computer system, a smartphone, a tablet computer, a laptop computer, and/or desktop computer) that is different from the first computer system and the second computer system. Initiating a process to share the received electronic key in response to a request to share the electronic key with a third user where the request specifies a second set of access rights improves the computer system because it allows the first user to reshare an electronic key that was received from a second user, which improves the electronic key sharing process (e.g., how the computer system reshares a shared electronic key) and how the computer systems provides access to physical locations.

In some embodiments, after sharing the electronic key (and/or while the shared electronic key is provisioned onto an electronic wallet of the third computer system), the computer system maintains the provisioning of the electronic key on the electronic wallet of the first computer system (e.g., the electronic wallet of device 600 and/or device 800 store the electronic hotel key after sharing) (e.g., such that the first user of the first computer system maintains the first set of access rights to the one or more physical locations). In some embodiments, subsequent to sharing the electronic key, the first computer system receives a user input to access credentials of the electronic key and, after authenticating the first user (e.g., through a passcode and/or through biometric authentication), the computer system releases the credentials of the electronic key from a secure element of the first computer system. In some embodiments, the first computer system transmits the credentials to a contactless terminal (e.g., via NFC). In some embodiments, the credentials of the electronic key are stored in the secure element because the electronic key is provisioned onto the electronic wallet of the first computer system. Continuing to retain the electronic key in the electronic wallet of the first computer system improves the computer system because it allows the first user to retain access rights to the one or more physical locations while still allowing the first user to share those rights with the third user, which improves the electronic key sharing process (e.g., how the computer system reshares a shared electronic key) and how computer systems provide access to physical locations.

In some embodiments, the second set of access rights includes a subset of access rights that is less than the first set of access rights (e.g., device 800 disables access right associated with room affordance 634*b*) (e.g., the second set of access rights does not include an access right that is included in the first set of access rights) (e.g., where the second set of access rights includes at least one access right that has a range of time that is less than a range of time of a respective access right of the first set of access rights, for instance, when the first user further restricted a range of time in which an access right that is included in the first set of access rights). Sharing the shared electronic key with a subset of access rights than the access rights received from the second user improves the computer system because it allows the first user to further restrict an access right to the one or more physical locations while still allowing the first user to share other rights with the third user, which improves the electronic key sharing process (e.g., how the computer system reshares a shared electronic key) and how computer systems provide access to physical locations.

In some embodiments, the request to share the electronic key with the third user specifies a first range of time (e.g., a range of particular days, a range particular hours, and/or a range particular minutes) during which at least one access rights of second set of access rights is activated and a second range of time (e.g., 642, 644, 646, 648, 654*a*-654*b*, and/or 652), different from the first range of time, during which the at least one access rights of second set of access rights is deactivated. In some embodiments, the at least one access rights was included in the first set of access rights and did not have a range of time in which the at least one access right was deactivated when it was received (e.g., the second user did not restrict the time frame in which the at least one access right was active when the second user shared the at least one access right with the first user). Sharing the electronic key with an access right that is restricted to a specific range of time received from the second user improves the computer system because it allows the first user to further restrict an access right by restricted the range of time that it is active while still allowing the first user to share other rights with the third user, which improves the electronic key sharing process (e.g., how the computer system reshares a shared electronic key) and how computer systems provide access to physical locations.

In some embodiments, the second user received information about the electronic key from a fourth user (e.g., first user 606 receives the electronic hotel key from another user) of a fourth computer system (e.g., 100, 300, and/or 500) that is different from the first user, the second user, and the third user (e.g., the first user received the electronic key because the second user re-shared a key that the second user received from the fourth user). In some embodiments, the fourth user has shared the electronic key with the second user and the second user is re-sharing the electronic key with the first user. Allowing the second user to reshare the electronic key received from the fourth user improves the computer system because it allows the second user to share an access right to the one or more physical locations that the second user received from the fourth user, which improves the electronic key sharing process (e.g., how computer system share an electronic key) and how computer systems provide access to physical locations.

In some embodiments, the first user cannot share, as part of sharing the electronic key, an access right that is not included in the first set of access rights (e.g., first user 606 and/or second user 806 cannot share an access right that was not shared with device 600 and/or 800). In some embodiments, the second set of access rights does not include an access right that is not included in the first set of access rights (e.g., the first user cannot share an access right that was not received from the second user). Allowing the first user to reshare only those access rights that were received from second user improves the computer system because it doesn't allow the first user to expand the rights beyond what the second user shared, which improves the security of the electronic key sharing process (e.g., how the computer system reshares a shared electronic key) and how computer systems provide access to physical locations.

In some embodiments, the first computer system uses a first activation code (e.g., 603 in FIG. 8C) (e.g., to provision the electronic key to the electronic wallet of the first computer system), and during the process to share the electronic key with the third user, the computer system displays, via the display generation component, a representation (e.g., image and/or text) of a second activation code (e.g., 603 in FIG. 8H), different from the first activation code, for activating the shared electronic key. In some embodiments, the first user uses a first activation code to provision the electronic key onto the electronic wallet of the first computer system and the first computer system displays a second activation code (different from the first activation code) that the first user should share with the third user to enable the third user to activate the shared electronic key. Displaying the representation of an activation code that is different from the activation code that was used to provision the electronic key to the electronic wallet of the first computer system improves the computer system because it prevents the risk that a bad actor can use and/or save the electronic key using an old activation code, which improves the security of the electronic key sharing process (e.g., how the computer system reshares a shared electronic key) and how computer systems provide access to physical locations.

In some embodiments, prior to provisioning the electronic key to the electronic wallet of the first computer system, the computer system displays (e.g., in response to a request to view the first set of access rights) a unmodifiable (e.g., read-only and/or cannot be edited) representation of the first set of access rights (e.g., the access rights associated with 815, 817, and/or 816 that displayed in access level interface 814) (e.g., the user can view the first set of access rights but cannot modify the first set of access rights prior to provisioning the electronic key to the electronic wallet of the first computer system). Displaying a read-only version of the first set of access rights improves the computer system because it provides visual feedback of rights that are received from the second user, which provides improved visual feedback of receiving access rights and improves how computer systems share an electronic key.

In some embodiments, provisioning the electronic key to the electronic wallet of the first computer system includes: using, by the first computer system, a third activation code (e.g., an access code that is designated by an issuer, vehicle manufacturer, and/or vendor of an electronic key and/or an access code that is not designated by an issuer and/or vendor of the electronic key) (e.g., the same or different as the first activation code and/or an activation code that was entered by the first user) to provision the electronic key to the electronic wallet of the first computer system; and detecting, by the first computer system, that an external device (e.g., a key fob and/or a computer system associated with a vehicle) is within a threshold proximity (e.g., is within a threshold distance and/or is within a threshold communication range) of the first computer system (e.g., in accordance with a determination that one or more wireless communications are detected (e.g., using Bluetooth, NFC, and/or a communication having location information)). In some embodiments, the external device provides an access right (e.g., associated with the first set of access rights and/or not associated with the first set of access rights) to the one or more physical locations. In some embodiments, the electronic key cannot be provisioned onto the electronic wallet of the computer system without the external device being within the threshold proximity of the first computer system and without having access to the third activation code. In some embodiments, the third activation code is a vehicle code and/or a vehicle-specific activation code. Detecting the proximity of the external device improves the computer system because it prevents the risk that a bad actor can use and/or save the electronic key using an old activation code, which improves the security of the electronic key sharing process (e.g., how the computer system reshares a shared electronic key) and how computer systems provide access to physical locations.

In some embodiments, the computer system detects (e.g., before and/or after provisioning the electronic wallet onto the first computer system), via the one or more input devices, a request to view a set of access rights that were not shared by the second user. In some embodiments, in response to the request to view the set of access rights that were not shared by the second user, the computer system displays an unmodifiable (e.g., read-only and/or cannot be edited) representation of the set of access rights not shared by the second user (e.g., 815a and/or 634a in FIG. 8I) (e.g., the user can view the set of access rights but cannot modify and/or share the set of access rights that were not shared by the second user). Displaying an unmodifiable of the set of access rights that were not shared by the improves the computer system because it provides visual feedback of access rights that were not received from the second user, which provides improved visual feedback of what access rights were not received so that the first user can request that the access rights be shared and improves how computer systems share an electronic key.

Note that details of the processes described above with respect to method 900 (e.g., FIG. 9) are also applicable in an analogous manner to the methods described above. For example, method 700 optionally includes one or more of the characteristics of the various methods described above with reference to method 900. For example, method 700 can include displaying the interfaces of method 700 that include techniques for adding an electronic key, techniques to re-share and/or re-configure access rights (including time limits), techniques for enabling and/or disabling an access code, and/or techniques to manage shared access rights. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the process of sharing electronic keys. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to aid in sharing electronic keys. Accordingly, use of such personal information data enables users to have calculated control of sharing electronic keys. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing electronic keys, the present technology can be configured to allow users to select to "opt in" or "opt out" of participation in the collection of personal information data during registration for services or anytime thereafter. In another example, users can select not to provide data for electronic key sharing services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information about sharing electronic keys can be selected and delivered to users by inferring preferences based on non-personal information data or a bare minimum amount of personal information, such as the content being requested by the device associated with a user, other non-personal information available to the content electronic key sharing services, or publicly available information.

What is claimed is:

1. A first computer system configured to communicate with a display generation component and one or more input devices, comprising:
   one or more processors; and
   memory storing one or more programs configured to be executed by the one or more processors, the one or more programs including instructions for:
      while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and
      in response to detecting the set of one or more inputs corresponding to the request to share the electronic key:
         initiating a process to share the electronic key with the second user of a second computer system that is different from the first user of the first computer system, wherein the process to share the electronic key with the second user of the second computer system includes:
            in accordance with a determination that an activation code for the shared electronic key is enabled, displaying, via the display generation component, a first selectable object to initiate a process of communicating the activation code; and
            in accordance with a determination that the activation code for the shared electronic key is disabled, forgoing display of the first selectable object to initiate the process of communicating the activation code.

2. The first computer system of claim 1, the one or more programs further including instructions for:
   detecting, via the one or more input devices, a second set of one or more inputs including an input directed the first selectable object; and
   in response to detecting the second set of one or more inputs, communicating the activation code to the second user.

3. The first computer system of claim 1, the one or more programs further including instructions for:
   detecting, via the one or more input devices, selection of the first selectable object;
   in response to detecting selection of the first selectable object, initiating the process of communicating the activation code, including displaying a conversation between the first user and the second user;
   while displaying the conversation between the first user and the second user, detecting, via the one or more input devices, selection of an option to transmit the activation code to the second user; and
   in response to detecting selection of the option to transmit the activation code to the second user, transmitting, as part of the conversation between the first user and the second user, the activation code to the second user.

4. The first computer system of claim 1, the one or more programs further including instructions for:
   during the process to share the electronic key with the second user of the second computer system:
      in accordance with the determination that the activation code for the shared electronic key is enabled, concurrently displaying with the first selectable object, via the display generation component, a second selectable object to initiate the process of communicating the activation code; and
      in accordance with the determination that the activation code for the shared electronic key is disabled, forgoing display of the second selectable object to initiate the process of communicating the activation code; and
   while concurrently displaying the first selectable object and the second selectable object, detecting, via the one or more input devices, an object selection user input; and
   in response to detecting the object selection user input:
      in accordance with a determination that the object selection user input corresponds to selection of the first selectable object, initiating the process of communicating the activation code using a first communication technique; and
      in accordance with a determination that the object selection user input corresponds to selection of the second selectable object, initiating the process of communicating the activation code using a second communication technique that is different from the first communication technique.

5. The first computer system of claim 1, the one or more programs further including instructions for:
   during the process to share the electronic key with the second user of the second computer system:
      in accordance with the determination that an activation code for the shared electronic key is enabled, concurrently displaying, via the display generation component and with the first selectable object, a third selectable object to copy the activation code; and
      in accordance with a determination that the activation code for the shared electronic key is disabled, forgoing display of the third selectable object to copy the activation code;
   while concurrently displaying the first selectable object and the third selectable object, detecting, via the one or more input devices, an object selection user input; and
   in response to receiving the object selection user input:

in accordance with a determination that the object selection user input corresponds to selection of the first selectable object, initiating the process of communicating the activation code using a first communication technique without copying the activation code; and in accordance with a determination that the object selection user input corresponds to selection of the third selectable object, copying the activation code without initiating the process of communicating the activation code using the first communication technique.

6. The first computer system of claim 1, wherein second computer system uses the activation code to activate the shared electronic key.

7. The first computer system of claim 1, the one or more programs further including instructions for:

during the process to share the electronic key with the second user of the second computer system:
displaying, via the display generation component, a user interface for designating, for the shared electronic key, a range of time during which at least one of the one or more access rights of the shared electronic key to the one or more physical locations are active and outside of which the at least one of the one or more access rights of the shared electronic key to the one or more physical locations are not active;
detecting, while displaying the user interface for designating the range of time, a third set of one or more inputs specifying a first range of time; and
in response to detecting the third set of one or more inputs specifying the range of time, designating the first range of time during which at least one of the one or more access rights of the shared electronic key to the one or more physical locations are active and outside of which the at least one of the one or more access rights of the shared electronic key to the one or more physical locations are not active.

8. The first computer system of claim 1, the one or more programs further including instructions for:

after sharing the electronic key, detecting, via the one or more input devices, a fourth set of one or more inputs corresponding to a request to modify the one or more access rights of the shared electronic key; and
in response to detecting the fourth set of one or more inputs corresponding to the request to modify the one or more access rights of the shared electronic key, modifying a respective access right of the one or more access rights.

9. The first computer system of claim 1, the one or more programs further including instructions for:

during the process to share the electronic key with the second user of the second computer system:
displaying, via the display generation component, a user interface for configuring the shared electronic key to be shareable by the second user;
while displaying the user interface for configuring the shared electronic key to be shareable, detecting, via the one or more input devices, user input to configure the shared electronic key to be shareable by the second user; and
in response to detecting the user input to configure the shared electronic key to be shareable by the second user, configuring the shared electronic key to be sharable by the second user.

10. The first computer system of claim 1, the one or more programs further including instructions for:

after sharing the electronic key, displaying, via the display generation component, a management user interface for the shared electronic key that includes:
in accordance with a determination that an activation code for the shared electronic key is enabled and that the shared electronic key has not been activated using the activation code, displaying, via the display generation component, the activation code; and
in accordance with a determination that an activation code for the shared electronic key is enabled and that the shared electronic key has been activated using the activation code, forgoing display of the activation code.

11. The first computer system of claim 10, the one or more programs further including instructions for:

wherein displaying the management user interface for the shared electronic key that includes displaying, via the display generation component, an option to provide, for the shared electronic key, a new activation code that is different from the activation code;
while displaying the option to provide the new activation code, detecting, via the one or more input devices, selection of the option to provide the new activation code; and
in response to detecting selection of the option to provide the new activation code:
displaying, via the display generation component, the new activation code for the shared electronic key.

12. The first computer system of claim 1, the one or more programs further including instructions for:

during the process to share the electronic key with the second user of the second computer system:
displaying, via the display generation component, an option to change an activation code setting that enables or disables the activation code for the shared electronic key;
while displaying an option to change the activation code setting, detecting, via the one or more input devices, an input directed to the option to change the activation code setting; and
in response to the input directed to the option to change the activation code setting, enabling or disabling the activation code.

13. The first computer system of claim 12, wherein displaying the option to change the activation code setting for the shared electronic key includes:

in accordance with a determination that the request to share the electronic key satisfies a first set of sharing conditions, the option to change the activation code setting for the shared electronic key defaults to the activation code for the shared electronic key being disabled; and
in accordance with a determination that the request to share the electronic key does not satisfy the first set of sharing conditions, the option to change the activation code setting for the shared electronic key defaults to the activation code for the shared electronic key being enabled.

14. The first computer system of claim 13, wherein:

the first set of sharing conditions includes a first sharing condition that is satisfied when the second user is a known user; and
the second user is a known user when the second user is associated with stored contact information.

15. The first computer system of claim 14, wherein:
the first set of sharing conditions includes a first sharing condition that is satisfied when the second user is a known user; and
the second user is a known user when the second user corresponds to a respective user account of a trusted service.

16. The first computer system of claim 13, wherein the first set of sharing conditions includes a second sharing condition that is satisfied when a respective communication application is selected to share the electronic key.

17. The first computer system of claim 1, the one or more programs further including instructions for:
after sharing the electronic key, receiving an indication that a second user shared the shared electronic key with a third user different from the second user and the first user; and
in response to receiving the indication that the second user shared the shared electronic key with the third user, displaying, via the display generation component, an indication that the second user shared the shared electronic key.

18. The first computer system of claim 17, the one or more programs further including instructions for:
while displaying the indication that the second user shared the shared electronic key, detecting, via the one or more input devices, selection of the indication that the second user shared the shared electronic key; and
in response to detecting selection of the indication that the second user shared the shared electronic key, displaying, via the display generation component, a management user interface for the shared electronic key that includes options that, when selected, modify one or more access rights that the second user shared with the third user.

19. A non-transitory computer-readable storage medium storing one or more programs configured to be executed by one or more processors of a first computer system that is in communication with a display generation component and one or more input devices, the one or more programs including instructions for:
while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and
in response to detecting the set of one or more inputs corresponding to the request to share the electronic key:
initiating a process to share the electronic key with the second user of a second computer system that is different from the first user of the first computer system, wherein the process to share the electronic key with the second user of the second computer system includes:
in accordance with a determination that an activation code for the shared electronic key is enabled, displaying, via the display generation component, a first selectable object to initiate a process of communicating the activation code; and
in accordance with a determination that the activation code for the shared electronic key is disabled, forgoing display of the first selectable object to initiate the process of communicating the activation code.

20. A method, comprising:
at a first computer system that is in communication with a display generation component and one or more input devices:
while the first computer system is associated with a first user, detecting, via the one or more input devices, a set of one or more inputs corresponding to a request to share an electronic key of an electronic wallet with a second user that is different from the first user, wherein the electronic key provides one or more access rights to one or more physical locations; and
in response to detecting the set of one or more inputs corresponding to the request to share the electronic key:
initiating a process to share the electronic key with the second user of a second computer system that is different from the first user of the first computer system, wherein the process to share the electronic key with the second user of the second computer system includes:
in accordance with a determination that an activation code for the shared electronic key is enabled, displaying, via the display generation component, a first selectable object to initiate a process of communicating the activation code; and
in accordance with a determination that the activation code for the shared electronic key is disabled, forgoing display of the first selectable object to initiate the process of communicating the activation code.

21. The non-transitory computer-readable storage medium of claim 19, the one or more programs further including instructions for:
detecting, via the one or more input devices, a second set of one or more inputs including an input directed the first selectable object; and
in response to detecting the second set of one or more inputs, communicating the activation code to the second user.

22. The non-transitory computer-readable storage medium of claim 19, the one or more programs further including instructions for:
detecting, via the one or more input devices, selection of the first selectable object;
in response to detecting selection of the first selectable object, initiating the process of communicating the activation code, including displaying a conversation between the first user and the second user;
while displaying the conversation between the first user and the second user, detecting, via the one or more input devices, selection of an option to transmit the activation code to the second user; and
in response to detecting selection of the option to transmit the activation code to the second user, transmitting, as part of the conversation between the first user and the second user, the activation code to the second user.

23. The non-transitory computer-readable storage medium of claim 19, the one or more programs further including instructions for:
during the process to share the electronic key with the second user of the second computer system:
in accordance with the determination that the activation code for the shared electronic key is enabled, concurrently displaying with the first selectable object, via the display generation component, a second selectable object to initiate the process of communicating the activation code; and in accordance with the determination that the activation code for the shared electronic key is disabled, forgoing display of the second selectable object to initiate the process of communicating the activation code; and while concurrently displaying the first selectable object and the second selectable object, detecting, via the one or more input devices, an object selection user input; and in response to detecting the object selection user input:
in accordance with a determination that the object selection user input corresponds to selection of the first selectable object, initiating the process of communicating the activation code using a first communication technique; and
in accordance with a determination that the object selection user input corresponds to selection of the second selectable object, initiating the process of communicating the activation code using a second communication technique that is different from the first communication technique.

24. The non-transitory computer-readable storage medium of claim 19, the one or more programs further including instructions for:
during the process to share the electronic key with the second user of the second computer system:
in accordance with the determination that an activation code for the shared electronic key is enabled, concurrently displaying, via the display generation component and with the first selectable object, a third selectable object to copy the activation code; and
in accordance with a determination that the activation code for the shared electronic key is disabled, forgoing display of the third selectable object to copy the activation code;
while concurrently displaying the first selectable object and the third selectable object, detecting, via the one or more input devices, an object selection user input; and
in response to receiving the object selection user input:
in accordance with a determination that the object selection user input corresponds to selection of the first selectable object, initiating the process of communicating the activation code using a first communication technique without copying the activation code; and
in accordance with a determination that the object selection user input corresponds to selection of the third selectable object, copying the activation code without initiating the process of communicating the activation code using the first communication technique.

25. The non-transitory computer-readable storage medium of claim 19, wherein second computer system uses the activation code to activate the shared electronic key.

26. The non-transitory computer-readable storage medium of claim 19, the one or more programs further including instructions for:
during the process to share the electronic key with the second user of the second computer system:
displaying, via the display generation component, a user interface for designating, for the shared electronic key, a range of time during which at least one of the one or more access rights of the shared electronic key to the one or more physical locations are active and outside of which the at least one of the one or more access rights of the shared electronic key to the one or more physical locations are not active;
detecting, while displaying the user interface for designating the range of time, a third set of one or more inputs specifying a first range of time; and
in response to detecting the third set of one or more inputs specifying the range of time, designating the first range of time during which at least one of the one or more access rights of the shared electronic key to the one or more physical locations are active and outside of which the at least one of the one or more access rights of the shared electronic key to the one or more physical locations are not active.

27. The non-transitory computer-readable storage medium of claim 19, the one or more programs further including instructions for:
after sharing the electronic key, detecting, via the one or more input devices, a fourth set of one or more inputs corresponding to a request to modify the one or more access rights of the shared electronic key; and
in response to detecting the fourth set of one or more inputs corresponding to the request to modify the one or more access rights of the shared electronic key, modifying a respective access right of the one or more access rights.

28. The non-transitory computer-readable storage medium of claim 19, the one or more programs further including instructions for:
during the process to share the electronic key with the second user of the second computer system:
displaying, via the display generation component, a user interface for configuring the shared electronic key to be shareable by the second user;
while displaying the user interface for configuring the shared electronic key to be shareable, detecting, via the one or more input devices, user input to configure the shared electronic key to be shareable by the second user; and
in response to detecting the user input to configure the shared electronic key to be shareable by the second user, configuring the shared electronic key to be sharable by the second user.

29. The non-transitory computer-readable storage medium of claim 19, the one or more programs further including instructions for:
after sharing the electronic key, displaying, via the display generation component, a management user interface for the shared electronic key that includes:
in accordance with a determination that an activation code for the shared electronic key is enabled and that the shared electronic key has not been activated using the activation code, displaying, via the display generation component, the activation code; and
in accordance with a determination that an activation code for the shared electronic key is enabled and that the shared electronic key has been activated using the activation code, forgoing display of the activation code.

30. The non-transitory computer-readable storage medium of claim 29, the one or more programs further including instructions for:
wherein displaying the management user interface for the shared electronic key that includes displaying, via the display generation component, an option to provide, for the shared electronic key, a new activation code that is different from the activation code;

while displaying the option to provide the new activation code, detecting, via the one or more input devices, selection of the option to provide the new activation code; and in response to detecting selection of the option to provide the new activation code:
displaying, via the display generation component, the new activation code for the shared electronic key.

31. The non-transitory computer-readable storage medium of claim 19, the one or more programs further including instructions for:
during the process to share the electronic key with the second user of the second computer system:
displaying, via the display generation component, an option to change an activation code setting that enables or disables the activation code for the shared electronic key;
while displaying an option to change the activation code setting, detecting, via the one or more input devices, an input directed to the option to change the activation code setting; and
in response to the input directed to the option to change the activation code setting, enabling or disabling the activation code.

32. The non-transitory computer-readable storage medium of claim 31, wherein displaying the option to change the activation code setting for the shared electronic key includes:
in accordance with a determination that the request to share the electronic key satisfies a first set of sharing conditions, the option to change the activation code setting for the shared electronic key defaults to the activation code for the shared electronic key being disabled; and
in accordance with a determination that the request to share the electronic key does not satisfy the first set of sharing conditions, the option to change the activation code setting for the shared electronic key defaults to the activation code for the shared electronic key being enabled.

33. The non-transitory computer-readable storage medium of claim 32:
the first set of sharing conditions includes a first sharing condition that is satisfied when the second user is a known user; and
the second user is a known user when the second user is associated with stored contact information.

34. The non-transitory computer-readable storage medium of claim 32, wherein:
the first set of sharing conditions includes a first sharing condition that is satisfied when the second user is a known user; and
the second user is a known user when the second user corresponds to a respective user account of a trusted service.

35. The non-transitory computer-readable storage medium of claim 32, wherein the first set of sharing conditions includes a second sharing condition that is satisfied when a respective communication application is selected to share the electronic key.

36. The non-transitory computer-readable storage medium of claim 19, the one or more programs further including instructions for:
after sharing the electronic key, receiving an indication that a second user shared the shared electronic key with a third user different from the second user and the first user; and in response to receiving the indication that the second user shared the shared electronic key with the third user, displaying, via the display generation component, an indication that the second user shared the shared electronic key.

37. The non-transitory computer-readable storage medium of claim 36, the one or more programs further including instructions for:
while displaying the indication that the second user shared the shared electronic key, detecting, via the one or more input devices, selection of the indication that the second user shared the shared electronic key; and
in response to detecting selection of the indication that the second user shared the shared electronic key, displaying, via the display generation component, a management user interface for the shared electronic key that includes options that, when selected, modify one or more access rights that the second user shared with the third user.

38. The method of claim 20, further comprising:
detecting, via the one or more input devices, a second set of one or more inputs including an input directed the first selectable object; and
in response to detecting the second set of one or more inputs, communicating the activation code to the second user.

39. The method of claim 20, further comprising:
detecting, via the one or more input devices, selection of the first selectable object;
in response to detecting selection of the first selectable object, initiating the process of communicating the activation code, including displaying a conversation between the first user and the second user;
while displaying the conversation between the first user and the second user, detecting, via the one or more input devices, selection of an option to transmit the activation code to the second user; and
in response to detecting selection of the option to transmit the activation code to the second user, transmitting, as part of the conversation between the first user and the second user, the activation code to the second user.

40. The method of claim 20, further comprising:
during the process to share the electronic key with the second user of the second computer system:
in accordance with the determination that the activation code for the shared electronic key is enabled, concurrently displaying with the first selectable object, via the display generation component, a second selectable object to initiate the process of communicating the activation code; and
in accordance with the determination that the activation code for the shared electronic key is disabled, forgoing display of the second selectable object to initiate the process of communicating the activation code; and
while concurrently displaying the first selectable object and the second selectable object, detecting, via the one or more input devices, an object selection user input; and
in response to detecting the object selection user input:
in accordance with a determination that the object selection user input corresponds to selection of the first selectable object, initiating the process of communicating the activation code using a first communication technique; and
in accordance with a determination that the object selection user input corresponds to selection of the second selectable object, initiating the process of communicating the activation code using a second communication technique that is different from the first communication technique.

41. The method of claim 20, further comprising:
during the process to share the electronic key with the second user of the second computer system:
in accordance with the determination that an activation code for the shared electronic key is enabled, concurrently displaying, via the display generation component and with the first selectable object, a third selectable object to copy the activation code; and
in accordance with a determination that the activation code for the shared electronic key is disabled, forgoing display of the third selectable object to copy the activation code;
while concurrently displaying the first selectable object and the third selectable object, detecting, via the one or more input devices, an object selection user input; and
in response to receiving the object selection user input:
in accordance with a determination that the object selection user input corresponds to selection of the first selectable object, initiating the process of communicating the activation code using a first communication technique without copying the activation code; and
in accordance with a determination that the object selection user input corresponds to selection of the third selectable object, copying the activation code without initiating the process of communicating the activation code using the first communication technique.

42. The method of claim 20, wherein second computer system uses the activation code to activate the shared electronic key.

43. The method of claim 20, further comprising:
during the process to share the electronic key with the second user of the second computer system:
displaying, via the display generation component, a user interface for designating, for the shared electronic key, a range of time during which at least one of the one or more access rights of the shared electronic key to the one or more physical locations are active and outside of which the at least one of the one or more access rights of the shared electronic key to the one or more physical locations are not active;
detecting, while displaying the user interface for designating the range of time, a third set of one or more inputs specifying a first range of time; and
in response to detecting the third set of one or more inputs specifying the range of time, designating the first range of time during which at least one of the one or more access rights of the shared electronic key to the one or more physical locations are active and outside of which the at least one of the one or more access rights of the shared electronic key to the one or more physical locations are not active.

44. The method of claim 20, further comprising:
after sharing the electronic key, detecting, via the one or more input devices, a fourth set of one or more inputs corresponding to a request to modify the one or more access rights of the shared electronic key; and
in response to detecting the fourth set of one or more inputs corresponding to the request to modify the one or more access rights of the shared electronic key, modifying a respective access right of the one or more access rights.

45. The method of claim 20, further comprising:
during the process to share the electronic key with the second user of the second computer system:
displaying, via the display generation component, a user interface for configuring the shared electronic key to be shareable by the second user;
while displaying the user interface for configuring the shared electronic key to be shareable, detecting, via the one or more input devices, user input to configure the shared electronic key to be shareable by the second user; and
in response to detecting the user input to configure the shared electronic key to be shareable by the second user, configuring the shared electronic key to be sharable by the second user.

46. The method of claim 20, further comprising:
after sharing the electronic key, displaying, via the display generation component, a management user interface for the shared electronic key that includes:
in accordance with a determination that an activation code for the shared electronic key is enabled and that the shared electronic key has not been activated using the activation code, displaying, via the display generation component, the activation code; and
in accordance with a determination that an activation code for the shared electronic key is enabled and that the shared electronic key has been activated using the activation code, forgoing display of the activation code.

47. The method of claim 46, further comprising:
wherein displaying the management user interface for the shared electronic key that includes displaying, via the display generation component, an option to provide, for the shared electronic key, a new activation code that is different from the activation code;
while displaying the option to provide the new activation code, detecting, via the one or more input devices, selection of the option to provide the new activation code; and
in response to detecting selection of the option to provide the new activation code:
displaying, via the display generation component, the new activation code for the shared electronic key.

48. The method of claim 20, further comprising:
during the process to share the electronic key with the second user of the second computer system:
displaying, via the display generation component, an option to change an activation code setting that enables or disables the activation code for the shared electronic key;
while displaying an option to change the activation code setting, detecting, via the one or more input devices, an input directed to the option to change the activation code setting; and
in response to the input directed to the option to change the activation code setting, enabling or disabling the activation code.

49. The method of claim 48, wherein displaying the option to change the activation code setting for the shared electronic key includes:
in accordance with a determination that the request to share the electronic key satisfies a first set of sharing conditions, the option to change the activation code setting for the shared electronic key defaults to the activation code for the shared electronic key being disabled; and in accordance with a determination that the request to share the electronic key does not satisfy the first set of sharing conditions, the option to change the activation code setting for the shared electronic key defaults to the activation code for the shared electronic key being enabled.

50. The method of claim 49, wherein:

the first set of sharing conditions includes a first sharing condition that is satisfied when the second user is a known user; and the second user is a known user when the second user is associated with stored contact information.

51. The method of claim 49, wherein:

the first set of sharing conditions includes a first sharing condition that is satisfied when the second user is a known user; and the second user is a known user when the second user corresponds to a respective user account of a trusted service.

52. The method of claim 49, wherein the first set of sharing conditions includes a second sharing condition that is satisfied when a respective communication application is selected to share the electronic key.

53. The method of claim 20, further comprising:

after sharing the electronic key, receiving an indication that a second user shared the shared electronic key with a third user different from the second user and the first user; and in response to receiving the indication that the second user shared the shared electronic key with the third user, displaying, via the display generation component, an indication that the second user shared the shared electronic key.

54. The method of claim 53, further comprising:

while displaying the indication that the second user shared the shared electronic key, detecting, via the one or more input devices, selection of the indication that the second user shared the shared electronic key; and in response to detecting selection of the indication that the second user shared the shared electronic key, displaying, via the display generation component, a management user interface for the shared electronic key that includes options that, when selected, modify one or more access rights that the second user shared with the third user.

* * * * *

UNITED STATES PATENT AND TRADEMARK OFFICE
CERTIFICATE OF CORRECTION

PATENT NO. : 12,400,503 B2
APPLICATION NO. : 17/949042
DATED : August 26, 2025
INVENTOR(S) : Trevor W. Young Page 1 of 1

It is certified that error appears in the above-identified patent and that said Letters Patent is hereby corrected as shown below:

In the Claims

In Column 71, Line 1, Claim 15, delete "14," and insert -- 13, --, therefor.

Signed and Sealed this
Twenty-eighth Day of October, 2025

John A. Squires
*Director of the United States Patent and Trademark Office*